(12) United States Patent
Kondo et al.

(10) Patent No.: US 8,590,513 B2
(45) Date of Patent: Nov. 26, 2013

(54) FUEL INJECTION VALVE AND FUEL INJECTION DEVICE

(75) Inventors: Jun Kondo, Nagoya (JP); Tooru Taguchi, Handa (JP); Fumiaki Arikawa, Okazaki (JP); Akitoshi Yamanaka, Hekinan (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 791 days.

(21) Appl. No.: 12/741,084

(22) PCT Filed: Oct. 27, 2008

(86) PCT No.: PCT/JP2008/069419
§ 371 (c)(1),
(2), (4) Date: Jul. 27, 2010

(87) PCT Pub. No.: WO2009/057540
PCT Pub. Date: May 7, 2009

(65) Prior Publication Data
US 2010/0294242 A1    Nov. 25, 2010

(30) Foreign Application Priority Data

Nov. 2, 2007   (JP) ................. 2007-286520
Nov. 6, 2007   (JP) ................. 2007-289072
Feb. 19, 2008  (JP) ................. 2008-037846
Sep. 24, 2008  (JP) ................. 2008-243807

(51) Int. Cl.
*F02M 51/00*     (2006.01)
*G01M 15/00*     (2006.01)

(52) U.S. Cl.
USPC ..................... 123/494; 73/114.51

(58) Field of Classification Search
USPC .......... 123/458, 470, 494; 73/114.43, 114.45, 73/114.51
See application file for complete search history.

(56) References Cited

U.S. PATENT DOCUMENTS 4,295,115 A * 10/1981 Takahashi et al. ............... 338/4
4,438,496 A    3/1984 Ohie
(Continued)

FOREIGN PATENT DOCUMENTS

CN    1355870    6/2002
CN    1749719    3/2006
(Continued)

OTHER PUBLICATIONS

Extended European search report dated Dec. 7, 2011, issued in corresponding European Application No. 11181533.
(Continued)

*Primary Examiner* — Thomas Moulis
(74) *Attorney, Agent, or Firm* — Nixon & Vanderhye PC

(57) ABSTRACT

It is equipped with an injector body $4z$ which has formed therein high-pressure paths $6az$, $6bz$, and $6cz$ through which high-pressure fuel flows to a spray hole and stores therein a piezo-actuator $2z$ (i.e., an opening/closing mechanism) and a back-pressure control mechanism $3z$ (i.e., an opening/closing mechanism) which open or close the spray hole, a stem $51z$ (i.e., an elastic body) which is installed in said body $4z$ and elastically deformed when subjected to pressure of the high-pressure fluid, and a strain gauge $52z$ (i.e., a sensing device) which converts the degree of strain occurring at the stem $51z$ into an electric signal and outputs it as a measured-pressure signal. Specifically, the stain gauge $52z$ is installed on the stem $51z$ that is constructed as being separate from the body $4z$.

25 Claims, 23 Drawing Sheets

(56) References Cited

U.S. PATENT DOCUMENTS

| | | | | |
|---|---|---|---|---|
| 4,775,816 | A | * | 10/1988 | White et al. .................. 310/338 |
| 4,817,568 | A | * | 4/1989 | Bedford ........................ 123/431 |
| 5,803,369 | A | | 9/1998 | Toyao et al. |
| 5,988,142 | A | | 11/1999 | Klopfer |
| 7,140,353 | B1 | | 11/2006 | Rauznitz et al. |
| 7,228,745 | B2 | | 6/2007 | Kunda et al. |
| 7,340,118 | B2 | | 3/2008 | Wlodarczyk et al. |
| 7,552,717 | B2 | * | 6/2009 | Dingle .......................... 123/480 |
| 7,900,605 | B2 | * | 3/2011 | Dingle .......................... 123/480 |
| 7,918,128 | B2 | * | 4/2011 | Kondo et al. ............. 73/114.43 |
| 7,931,009 | B2 | * | 4/2011 | Kondo et al. ................. 123/490 |
| 8,297,259 | B2 | * | 10/2012 | Kondo et al. ................. 123/494 |
| 8,342,155 | B2 | * | 1/2013 | Fujino et al. ................. 123/472 |
| 8,365,705 | B2 | * | 2/2013 | Kondo et al. ................. 123/494 |
| 8,375,924 | B2 | * | 2/2013 | Kondo et al. ................. 123/494 |
| 8,402,949 | B2 | * | 3/2013 | Kondo et al. ................. 123/490 |
| 2003/0233998 | A1 | | 12/2003 | Futonagane et al. |
| 2006/0053894 | A1 | | 3/2006 | Kunda et al. |
| 2006/0170909 | A1 | | 8/2006 | Wlodarczyk et al. |
| 2008/0228374 | A1 | | 9/2008 | Ishizuka et al. |
| 2010/0050991 | A1 | * | 3/2010 | Cooke ........................... 123/470 |
| 2010/0251998 | A1 | * | 10/2010 | Kondo et al. ................. 123/470 |
| 2010/0263629 | A1 | * | 10/2010 | Kondo et al. ................. 123/445 |
| 2011/0006130 | A1 | * | 1/2011 | Kondo et al. .................... 239/71 |

FOREIGN PATENT DOCUMENTS

| | | |
|---|---|---|
| CN | 101248265 | 8/2008 |
| DE | 21 43 476 | 4/1972 |
| DE | 10 2005 032086 | 1/2007 |
| EP | 1 118 849 | 7/2001 |
| JP | 56-118553 | 9/1981 |
| JP | 57-005526 | 1/1982 |
| JP | 60-108558 | 6/1985 |
| JP | 03-043661 | 2/1991 |
| JP | 9-42106 | 2/1997 |
| JP | 2000-241273 | 9/2000 |
| JP | 2000-265892 | 9/2000 |
| JP | 2000-275128 | 10/2000 |
| JP | 2001-512564 | 8/2001 |
| JP | P2001-272292 A | 10/2001 |
| JP | 2001-324402 | 11/2001 |
| JP | 2002-013994 | 1/2002 |
| JP | 2002-013997 | 1/2002 |
| JP | 2003-97378 | 4/2003 |
| JP | 2003-166457 | 6/2003 |
| JP | 2003-343329 | 12/2003 |
| JP | P2004-027910 A | 1/2004 |
| JP | P2005-076618 A | 3/2005 |
| JP | 2006-113041 | 4/2006 |
| JP | 2007-016678 | 1/2007 |
| JP | 2007-218249 | 8/2007 |
| JP | 2007-231770 | 9/2007 |
| JP | 2007-270822 | 10/2007 |
| JP | 2008-144749 | 6/2008 |
| WO | WO 99/32783 | 7/1999 |
| WO | WO 2009/019663 | 2/2009 |

OTHER PUBLICATIONS

Extended European Search Report dated Feb. 17, 2011, issued in corresponding European Application No. 08844634.9-2311.
Chinese Office Action dated Mar. 19, 2012, issued in corresponding Chinese Application No. 200880114360.7 with English Translation.
International Search Report for PCT/JP2008/069419, mailed Jan. 20, 2009.
Chinese Office Action dated Aug. 23, 2011, issued in corresponding Chinese Application No. 200880114360.7 with English Translation.
International Preliminary Report on Patentability for PCT/JP2008/069419, dated Jun. 17, 2010, 8 pages.
Chinese Office Action dated Aug. 14, 2012, issued in corresponding Chinese Application No. 200880114360.7 with English Translation.
Japanese Office Action dated May 1, 2012, issued in corresponding Japanese Application No. 2008-243807 with English Translation.

* cited by examiner (a)

(b)

FUEL INJECTION VALVE AND FUEL INJECTION DEVICE

This application is the U.S. national phase of International Application No. PCT/JP2008/069419 filed 27 Oct. 2008 which designated the U.S. and claims priority to JP Patent Application Nos. 2007-286520 filed 2 Nov. 2007, 2007-289072 filed 6 Nov. 2007, 2008-037846 filed 19 Feb. 2008 and 2008-243807 filed 24 Sep. 2008, the entire contents of each of which are hereby incorporated by reference.

TECHNICAL FIELD

The present invention relates generally to a fuel injection valve which is installed in an internal combustion engine to spray fuel from a spray hole and a fuel injection device.

BACKGROUND ART

In order to ensure the accuracy in controlling output torque of internal combustion engines and the quantity of exhaust emissions therefrom, it is essential to control a fuel injection mode such as the quantity of fuel to be sprayed from a fuel injection valve or the injection timing at which the fuel injection valve starts to spray the fuel. Accordingly, there have been proposed techniques for monitoring a change in pressure of the fuel upon spraying thereof from the fuel injection valve to determine an actual fuel injection mode.

For example, the time when the pressure of the fuel begins to drop due to the spraying thereof is monitored to determine an actual injection timing. The amount of drop in pressure of the fuel arising from the spraying thereof may be measured to determine the quantity of fuel sprayed actually from the fuel injection valve. Such actual measurement of the fuel injection mode ensures the desired accuracy in controlling the fuel injection mode based on such a measured value.

A fuel pressure sensor (i.e., a rail pressure sensor) installed directly in a common rail (i.e., an accumulator vessel) to measure the above change in pressure of the fuel has a difficulty in measuring the pressure of the fuel accurately because the change in pressure of fuel arising from the spraying of the fuel is absorbed within the common rail. Accordingly, in the invention of Patent Document 1, the fuel pressure sensor is installed in a joint between the common rail and a high-pressure pipe through which the fuel is delivered from the common rail to the fuel injection valve to measure the fuel pressure change before it is absorbed within the common rail.

Patent Document 1: Japanese Patent First Publication No. 2000-265892
Patent Document 2: Japanese Patent First Publication No. 2007-231770
Patent Document 3: Japanese Patent First Publication No. 2007-270822
Patent Document 4: Japanese Patent First Publication No. 2007-218249
Patent Document 5: Japanese Patent First Publication No. 57-5526

DISCLOSURE OF THE INVENTION

Problems to be Solved by the Invention

The fuel pressure change, as produced at a spray hole by the fuel spraying, will, however, surely attenuates within the high-pressure pipe. The use of the pressure sensor, as disclosed in Patent Document 1, installed in the joint to the common rail, therefore, does not ensure the desired accuracy in determining the fuel pressure change. The inventors have studied the installation of the pressure sensor in the fuel injection valve which is located downstream of the high-pressure pipe. Such study, however, showed that the installation of the fuel pressure sensor in the fuel injection valve poses a problem, as discussed below.

Typical fuel injection valves have formed therein a high-pressure path through which high-pressure fuel flows to the spray hole and are equipped with a body in which an opening/closing mechanism is disposed to open or close the spray hole. The body is usually strained by thermal expansion or contraction thereof arising from a sudden change in temperature. Particularly, in the case where the fuel injection valve is installed in a cylinder head of diesel engines or direct-injection gasoline engines, the temperature of the body will rise up to 140°, thus resulting in a greatly increased degree of strain. The fuel injection valves are usually equipped with a sensing device to measure the distortion (i.e., the amount of strain) of the body.

The installation of the fuel pressure sensor in the fuel injection valve with the sensing device disposed in the body which is, as described above, to be distorted will cause the sensing device to be affected by the distortion of the body, thus resulting in a decrease in accuracy in measuring the fuel pressure.

The invention was made to solve the above problem. It is the first object of the invention is to provide a fuel injection valve which is designed to suppress the influence of the distortion of the body on the sensing device to achieve the installation of a fuel pressure sensor therein which measures a variation in pressure of fuel arising from spraying of the fuel.

There is a common rail system, as taught in, for example, the patent document 2, which is equipped with a pressure sensor to measure the pressure of fuel to be sprayed. The common rail system has the single pressure sensor installed in an end of a common rail to measure the pressure of fuel within the common rail. Injectors for use in such a common rail system are disclosed in, for example, the patent document 3 or 4.

The patent document 5 proposes an injector as a fuel injection device which has built in a pressure sensor which measures the pressure of fuel to be sprayed. Specifically, in the patent document 5, a recess is formed near a fuel path in the injector. A strain gauge is disposed inside the recess to measure a change in pressure in the fuel path arising from spraying of the fuel.

The conventional techniques in the patent documents 2 to 4 enables the measurement of pressure of fuel in the common rail in itself, but has the problem in that it is impossible to measure the pressure of fuel on each injector.

In the technique of the patent document 5, a recess is formed directly in an outer wall of an injector near a fuel path located in a lower portion of the injector to form a pressure detecting portion. Usually, the fuel path is formed as a through hole extending in an axial direction of an injector body. When the recess is formed in the outer wall of the injector body, it is difficult to control the thickness of a bottom portion (i.e., a diaphragm) of the recess. This results in a problem of a variation in the thickness, which leads to a decreased accuracy in measuring the pressure or a variation in the pressure. Particularly, in the injectors, as taught in the patent documents 2 to 4, which handle high-pressure fuel, the injector body is made of a relatively high hardness metal or have an increased thickness of a wall of the high-pressure fuel path in terms of enhancing the strength thereof and thus has suffered from the above problem greatly.

It is, thus, the second object of the invention to provide a fuel injection device designed to facilitate ease of machining a diaphragm defining a pressure detecting portion.

In the technique of the patent document 2, the recess is formed directly in the outer wall of the injector near the fuel path located in the lower portion of the injector. A pressure measuring means (i.e., a strain gauge) is disposed in the recess from the outside. In general, most of the injector body is disposed inside the engine and fixed, thus resulting in a difficulty in making wire connections from the pressure measuring means disposed in the recess formed in the outer wall.

It is, thus, the third object of the invention to provide a fuel injection device in which a pressure measuring portion is disposed.

When the pressure measuring portion is disposed inside the fuel injection device, it may result in an increase in diameter of the injector body.

It is, thus, the fourth object of the invention to provide a fuel injection device designed to eliminate the need for increasing the diameter of the injector body and have the pressure measuring portion disposed therein.

Means for Solving the Problem

Means for solving the problem, operations thereof, and effects, as provided thereby will be described below.

An example embodiment of the invention is a fuel injection valve which is to be installed in an internal combustion engine to spray fuel from a spray hole, characterized in that it comprises:

a body in which a high-pressure path is formed through which high-pressure fuel flows to said spray hole and has disposed therein an opening/closing mechanism for opening or closing said spray hole;

an elastic body which is installed in said body and subjected to pressure of the high-pressure fuel to elastically deform; and a sensing device which is installed on said elastic body and works to convert a degree of stain occurring at said elastic body into an electric signal and output it as a measured pressure value.

This permits a loss of propagation of inner stress in the body resulting from thermal expansion/contraction to the elastic body to be increased because the elastic body is constructed to be separate from the body. Specifically, the elastic body is made to be separate from the body, thus reducing the adverse effects of the distortion of the body on the elastic body. Therefore, the invention in which the sensing device is installed on the elastic body constructed to be separate from the body reduces the adverse effects of the distortion of the body on the elastic body as compared with when the elastic body is attached directly to the body. This enables the fuel pressure sensor to be installed in the fuel injection valve while avoiding a decrease in accuracy in measuring the pressure of fuel.

An example embodiment of the invention characterized in that material of said elastic body is material whose coefficient of thermal expansion is smaller than that of said body, thus avoiding the strain of the elastic body arising from the thermal expansion thereof. Only the elastic body may be made of material whose coefficient of thermal expansion is smaller, thus resulting in a decrease in material cost as compared with when the whole of the body is made of material whose coefficient of thermal expansion is smaller.

An example embodiment of the invention is characterized in that a portion of said elastic body on which said sensing device is installed is made axisymmetrically. When subjected to the high-pressure fuel, the elastic member is deformed axisymmetrically. Therefore, when the sensing device measure the degree of deformation (strain) of the elastic body, it is possible to improve the measurement accuracy. In contrast to this invention, when the sensing device is installed directly to the body, it is very difficult to form the whole of the body axisymmetrically in order to improve the measurement accuracy of the sensing device. In contrast to this, the invention has the sensing device installed on the elastic body constructed to be separate from the body, thus facilitating the ease of machining the portion of the elastic body on which the sensing device is installed to be formed axisymmetrically.

As a specific example where the elastic body is formed axisymmetrically, it may be characterized that said elastic body includes a cylindrical portion which has formed in one end thereof an inlet through which the high-pressure fuel is introduced into the cylindrical portion and a disc-shaped diaphragm which closes another end of said cylindrical portion.

An example embodiment of the invention is characterized in that said body is formed to be substantially cylindrical, and said elastic body is installed on an axis of a portion of said high-pressure path which extends in a radial direction of said body or an axis of a portion of said high-pressure path which extends in an axial direction of said body. This results in good workability to machine the body for mounting the elastic body on the body.

An example embodiment of the invention is characterized in that said body is formed to be substantially cylindrical, a recess is formed in an outer surface of said body in which said elastic body is to be inserted and disposed, and said body is so constructed as that said elastic body is insertable into said recess from outside an axial direction or a radial direction of said body. This improves the workability to install the elastic body in the body.

An example embodiment of the invention is characterized in that said elastic body is formed to have one end built in said body and another end located outside said body, and said sensing device is installed on the another end of said elastic body. The another end of the elastic body is so formed as to be located outside the body, thus resulting in a decrease in effect of the strain of the body arising from the thermal expansion and contraction. The example embodiment of the invention, in which the sensing device is installed on the another end where the effect of the strain is small prevents the sensing device from undergoing the effect of the strain of the body, thus resulting in an improved accuracy in measuring the pressure of fuel.

An example embodiment of the invention is characterized in that it further comprises an insulating substrate connected to said sensing device through a wire and on which a circuit part is mounted which amplifies an electric signal outputted from said sensing device, and a mount surface on which said sensing device is disposed, and wherein said insulating substrate lies in flush with said mount surface. This improves the workability to join the sensing device and the circuit parts through the wire. In case where the connection is made by wire-bonding techniques, the joining workability is improved effectively.

An example embodiment of the invention is characterized in that materials of said body and said elastic body are both metallic, said body has an annular sealing surface formed thereon, said elastic body has an annular sealing surface formed thereon, and said body and said elastic body are metal-touch sealed at the sealing surfaces. This facilitates the ease of sealing high-pressure fuel as compared with when a gasket is disposed between the body and the elastic body to seal them. Particularly, in modern diesel engines, the fuel is highly pressurized (e.g., about 200 MPa). The use of the metal-tough seal develops easy sealing against the high-pressure fuel.

An example embodiment of the invention is characterized in that it comprises: a fluid path to which high-pressure fluid is supplied externally; a spray hole which connects with said fluid path and sprays at least a portion of the high-pressure fluid; a branch path which diverges from said fluid path; a diaphragm which connects with said branch path and has at least a portion which strains and deforms when subjected to pressure of said high-pressure fluid; displacement sensing means for sensing a displacement of said diaphragm; an injector body which has said fluid path and said spray hole formed therein; and a separate member which is formed to be separate from said injector body and disposed inside said injector body, and in that said separate member has formed therein a hole or a groove which communicates with said fluid path to form at least a portion of said branch path and a thin-walled portion which communicates with said hole or said groove to form said diaphragm.

The diaphragm and the hole or the groove are in the separate member formed to be separate from the injector body, thus facilitating the ease of machining or forming the diaphragm. This results in ease of controlling the thickness of the diaphragm and improves the pressure-measuring accuracy. This also permits the pressure sensing portion to be disposed inside the separate member. The diaphragm is disposed in the branch path diverging from the fluid path, thus facilitating the ease of forming the diaphragm as compared with when the diaphragm is provided directly in the injector outer wall near the fluid path. This facilitates the ease of controlling the thickness of the diaphragm and improves the pressure measuring accuracy.

An example embodiment of the invention is characterized in that said separate member is a plate member disposed substantially perpendicular to an axial direction of the injector body.

The separate member is made of the plate member disposed perpendicular to the axial direction of the injector body, thereby avoiding an increase in diameter of the injector body when the pressure sensing portion is disposed inside the separate member.

An example embodiment of the invention is characterized in that it further comprises; a nozzle needle which opens or closes said spray hole; an actuator which controls movement of said nozzle needle in an axial direction of the injector body; a pressure control chamber which is supplied with a portion of said high-pressure fluid from said fluid path, the high-pressure fluid being loaded into or discharged from said pressure control chamber by action of said actuator, pressure of the high-pressure fluid loaded in said pressure control chamber acting on said nozzle needle to urge it to a valve-closing direction, and in that said branch path connects at a portion thereof with a path from said fluid path to said pressure control chamber or with said pressure control chamber and at another portion thereof with said diaphragm.

The branch path diverges from the path from said fluid path to said pressure control chamber or from said pressure control chamber, thus eliminating the need for a special tributary for connecting the branch path to the fluid path, which avoids an increase in dimension in the radial direction of the injector body when the pressure sensing portion is installed inside the injector body.

An example embodiment of the invention is characterized in that it further comprises a spring member which urges said nozzle needle in the valve-closing direction, and in that said pressure control chamber works to urge said nozzle needle in the valve-closing direction along with an urging force of said spring member.

The nozzle needle is urged in the valve-closing direction by the pressure, as produced by the high-pressure fuel in the pressure control chamber, and the spring member, thus ensuring the stability in keeping the nozzle needle in a valve-closing position.

An example embodiment of the invention is characterized in that said separate member includes an inner orifice into which said high-pressure fluid is introduced, a pressure control chamber space which communicates with the inner orifice and forms a portion of said pressure control chamber, an outer orifice which communicates with said pressure control chamber space and discharges the high-pressure fluid to a low-pressure path, and a connection path which connects between said fluid path and the inner orifice, and in that said branch path diverges from said connection path in said separate member, and said diaphragm connects with said branch path at a portion other than said connection path and is formed in said separate member.

An example embodiment or the invention is characterized in that said separate member include a first member which has said inner orifice, said pressure control chamber space, and the outer orifice and a second member which is stacked directly or indirectly on the first member within the injector body, has said connection path and said branch path, and establishes a connection of the branch path with a portion of the diaphragm which is other than the connection path.

The diaphragm and the hole or the groove are in the second member formed to be separate from the injector body, thus facilitating the ease of machining or forming the diaphragm. This results in improved accuracy in measuring the pressure. This also permits the pressure sensing portion to be disposed inside the second member. The second member including the diaphragm is stacked on the first member constituting a portion of the pressure control chamber, thus avoiding an increase in dimension in the radial direction of the injector body.

An example embodiment of the invention is characterized in that said second member is made of a plate member having a given thickness, said displacement sensing means has a strain sensing device disposed on one of surfaces of the diaphragm of said second member which is opposite the other surface to which the high-pressure fluid is introduced, and in that said diaphragm is located at a depth of at least a thickness of said strain sensing device beneath an outer surface of said second member.

The diaphragm is located at a depth of at least the thickness of said strain sensing device beneath the outer surface of said second member, thus avoiding the exertion of stress on the strain sensing device when the second member is disposed in the injector body, thus facilitating the ease of installation of the pressure sensing portion in the injector body.

An example embodiment of the invention is characterized in that it further comprises a nozzle needle which opens or closes the spray hole and a control piston which transmits force to said nozzle needle to urge said nozzle needle in the valve-closing direction, and in that said injector body includes a nozzle body in which said nozzle needle is disposed and a lower body in which said control piston is disposed, and said separate member is stacked between said lower body and said nozzle body to measure the pressure of the high-pressure fluid near said nozzle body.

The diaphragm and the hole or the groove are in the separate member formed to be separate from the injector body, thus facilitating the ease of machining or forming the diaphragm. This results in ease of controlling the thickness of the diaphragm and improvement on the pressure sensing accuracy. This also permits the pressure sensing portion to be disposed inside the separate member. The separate member is stacked between the lower body and the nozzle body, thus avoiding an increase in dimension in the radial direction of the injector body. Additionally, the pressure of the high-pressure fuel near the nozzle body can be measured, thus enabling a change in pressure of the fuel sprayed actually to be measured without any time loss.

An example embodiment of the invention is characterized in that said separate member is made of a metallic member stacked between said lower body and said nozzle body and is equipped with the connection path connecting between said fluid path and said spray hole, said branch path diverging from said connection path, and a metallic diaphragm that is the diaphragm which connects with said branch path and is disposed in an area different from said connection path.

The branch path is formed in the metallic member stacked between the lower body and the nozzle body, thus eliminating the need for a special tributary for connecting the branch path to the fluid path, which avoids an increase in dimension in the radial direction of the injector body when the pressure sensing portion is installed inside the injector body.

An example, embodiment of the invention, as recited above, is characterized in that said separate member is made of a plate member having a given thickness, and said displacement sensing means has a strain sensing device disposed on one of surfaces of the diaphragm of said separate member which is opposite the other surface to which the high-pressure fluid is introduced, and in that said diaphragm is located at a depth of at least a thickness of said strain sensing device beneath an outer surface of said separate member.

The diaphragm is located at a depth of at least the thickness of said strain sensing device beneath the outer surface of the separate member, thus avoiding the exertion of stress on the strain sensing device when the separate member is disposed in the injector body, thus facilitating the ease of installation of the pressure sensing portion in the injector body.

An example embodiment of the invention is characterized in that said injector body has a wire path which extends from a portion where said separate member is disposed to a portion where said actuator is disposed and stores therein a wire for said displacement sensing means. The wire path is in the injector body, thus facilitating the ease of layout of the wire.

An example embodiment of the invention is characterized in that said branch path connects with said fluid path at a turned angle of 90° or more to a flow of the fluid in said fluid path.

Upon and after the fuel injection, the amount of high-pressure fuel corresponding to that having been sprayed or discharged from the pressure control chamber is supplied from the fluid path. The pressure in the fluid path is high, so that in the case where the branch path is oriented at an angle smaller than 90° toward the direction of flow of the fluid in the fluid path, that is, the branch path is connected in a forward direction, it will cause the high-pressure to be always exerted into the branch path during the delivery of the fluid into the fluid path, thus resulting in a small difference in pressure of the fluid between when being sprayed and when not sprayed. However, the turned angle greater than or equal to 90° causes the movement of the high-pressure fluid in the fluid path during supply of the fluid to create an attraction force which is exerted on the high-pressure fluid in the branch path and oriented toward a branch point to the branch path. This also causes an additional attraction to be added to a drop in pressure in the high-pressure fluid in the same direction as such a pressure drop, thus resulting in an increased difference in pressure of the fluid between when the fluid is being sprayed and when the fluid is not being sprayed.

An example embodiment of the invention is characterized in that it further comprises an opening connecting with said branch path and a cylindrical stem with another end closed to constitute said diaphragm, and in that said branch path has an orifice which is disposed between said fluid path and said cylindrical stem and whose diameter is smaller than said opening. The presence of the orifice results in an increase in displacement of the diaphragm relative to a pressure change, which leads to a greater difference in pressure of fluid when being sprayed or when not being sprayed.

An example embodiment of the invention is characterized in that said injector body has an injector main body which has formed therein a first fluid path to which the high-pressure fluid is supplied externally and a coupling which protrudes from said injector main body at a given angle to an axial direction of said injector main body and a second fluid path connecting between an fluid inlet port and said first fluid path, and in that said branch path is equipped with a path which diverges from said second fluid path and extends parallel to an axial direction of said injector.

The branch path has in the coupling the path which extends parallel to the axial direction of said injector, thus avoiding the protrusion of the diaphragm and the displacement sensing means from the coupling in the radial direction of the injector body, that is, avoiding an increase in diameter thereof.

It is, as described in an example embodiment of the invention, preferable that said diaphragm is the thinnest portion of the path wall forming said branch path, thus resulting in an increase in displacement of the diaphragm arising from the pressure change.

It is, as described in an example embodiment of the invention, preferable that said displacement sensing means has a semiconductor type pressure sensor affixed integrally to one of surfaces of said diaphragm which is farther from said branch path.

The invention, as recited in an example embodiment of the invention, is characterized in that it comprises a second diaphragm which connects with said branch path and is at least partially to strain and deform when subjected to pressure of the high-pressure fluid, and second displacement sensing means for sensing a displacement of said second diaphragm.

The second diaphragm defined by the thin-walled portion is disposed in the branch path diverging from the fluid path, thus resulting in ease of formation of the second diaphragm as compared with when the diaphragm is disposed directly in the injector wall near the fluid path. This also results in ease of controlling the thickness of the second diaphragm, which improves the pressure sensing accuracy. It also possible to measure the pressure in a plurality of channels, which enables an output signal from the pressure sensing portion, as described in an example embodiment of the invention, to be outputted redundantly.

EXPLANATION OF REFERENCE NUMBER

Figure 1:
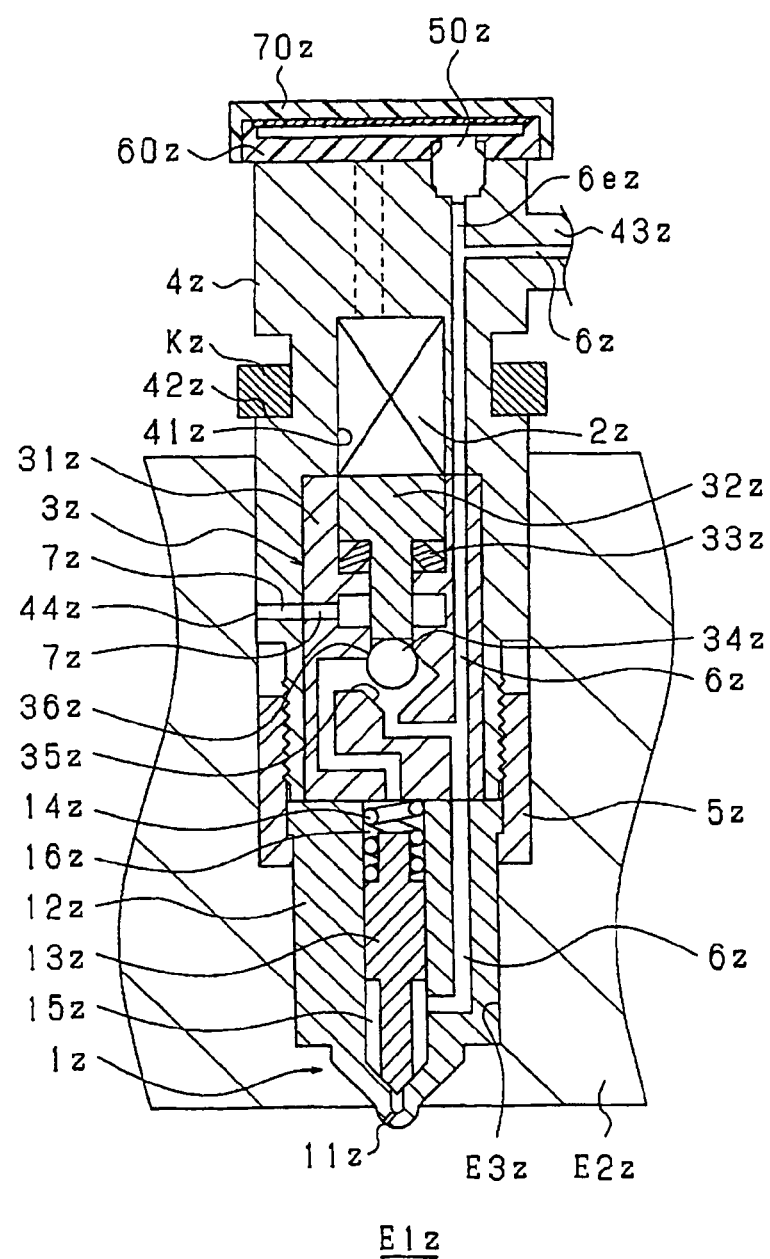
FIG. 1 is a schematic sectional view which shows an outline of internal structure of an injector according to the first embodiment of the invention.

2z—piezo-actuator (opening/closing mechanism)
3z—back pressure control mechanism (opening/closing mechanism)
4z—injector body
6z, 6az, 6bz, 6cz—high-pressure path
11z—spray hoe
50z—fuel pressure sensor
51z—stem (elastic body)
52z—strain gauge (sensing device)
11—lower body
11b—fuel supply path (first fluid path (high-pressure path))
11c—fuel induction path (second fluid path (high-pressure path))

11d—storage hole
11f—coupling (inlet)
11g—fuel supply branch path
12—nozzle body
12a—valve seat
12b—spray hole
12c—high-pressure chamber (fuel sump)
12d—fuel feeding path
12e—storage hole
13—bar filter
14—retaining nut (retainer)
16—orifice member
161—valve body-side end surface
162—plat surface
16a—communication path (outlet side orifice, outer orifice)
16b—communication path (inlet side orifice, inner orifice)
16c—communication path (pressure control chamber)
16d—valve seat
16e—fuel release path
16g—guide hole
16h—inlet
16k—gap
16p—through hole
16r—fuel leakage groove
17—valve body
17a, 17b—through hole
17c—valve chamber
17d—low-pressure path (communication path)
18a—groove (branch path)
18b—pressure sensing chamber
18c—communication path (pressure control chamber)
18d—processing substrate
18e—electric wire
18f—pressure sensor
18g—lower body
18h—sensing portion communication path
18k—glass layer
18m—gauge
18n—diaphragm
18p—through hole
18q—other surface
18r—single-crystal semiconductor chip
18s—through hole
18t—positioning member
19c—wire, pad,
19d—oxide film
102—fuel tank
103—high-pressure fuel pump
104—common rail
105—high-pressure fuel path
106—low-pressure fuel path
107—electronic control device (ECU)
108—fuel pressure sensor
109—crank angle sensor
110—accelerator sensor
2—injector
20—nozzle needle
21—fluid induction portion
22—injector
30—control piston
30c—needle
30p—outer end wall
31—annular member
32—injector
35—spring
37—fuel path
301—nozzle
302—piezo-actuator (actuator)
303—back pressure control mechanism
308—holding member
321—housing
322—piezoelectric device
323—lead wire
331—valve body
335—high-pressure seat surface
336—low-pressure seat surface
341, 341a to 341c—storage hole
41—valve member
41a—spherical portion
42—valve armature
50—connector
51a, 51b—terminal pin
52—upper body
53—upper housing
54—intermediate housing
59—urging member (spring)
61—coil
62—spool
63—stationary core
64—stopper
7—solenoid valve device
8—back pressure chamber (pressure control chamber)
80, 85, 87—pressure sensing portion
81, 86—pressure sensing member (fuel pressure sensor)
82—plate surface
92—positioning member

BEST MODE FOR CARRYING OUT THE INVENTION

Each embodiment embodying the invention will be described below based on drawings. In the following embodiments, the same reference numbers are appended to the same or like parts in the drawings.

First Embodiment

Figure 2:
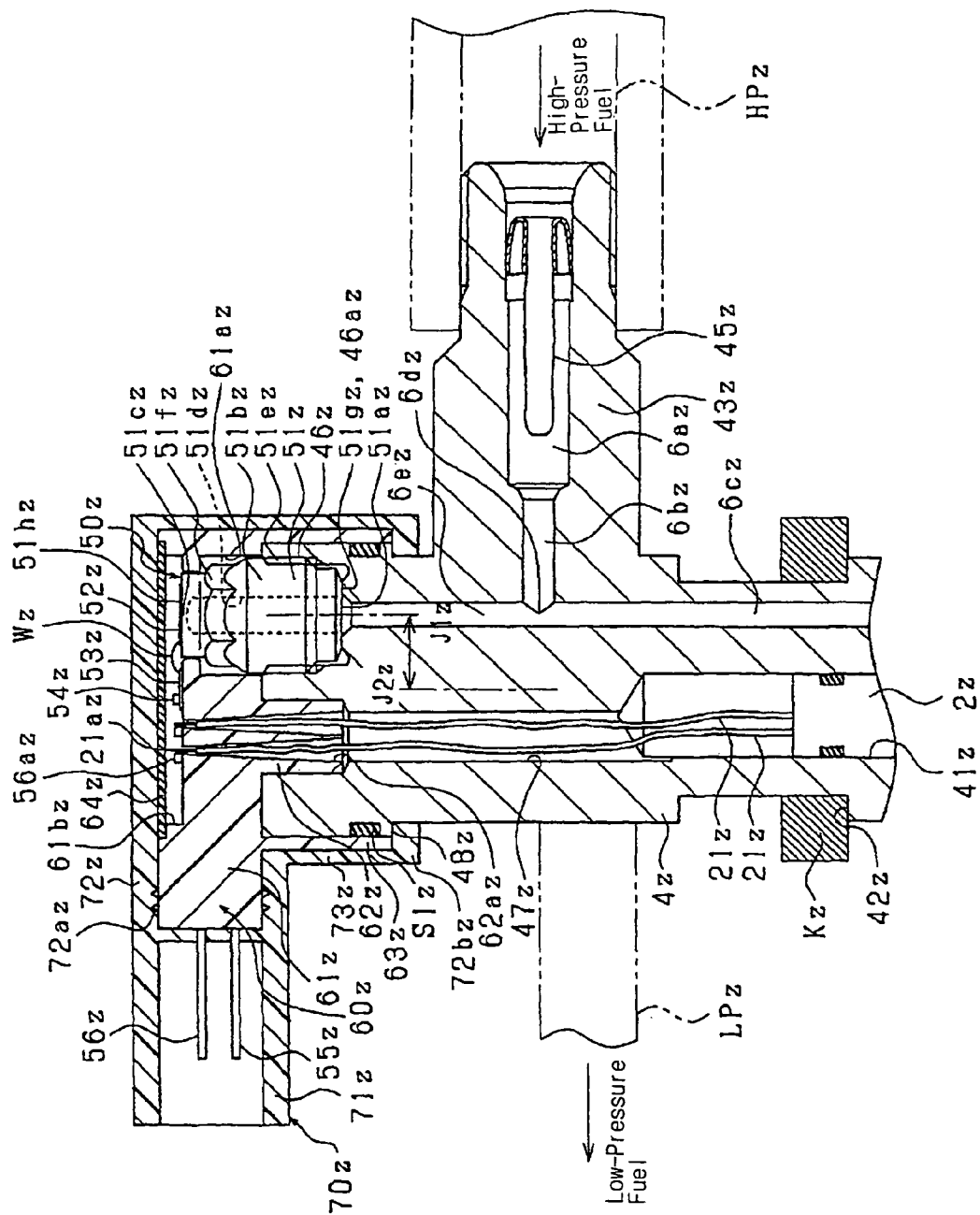
FIG. 2 is an enlarged view to explain FIG. 1 in detail as to the structure of a fuel pressure sensor and installation of the fuel pressure sensor in an injector body.

The first embodiment of the invention will be described using FIGS. 1 and 2. FIG. 1 is a schematic sectional view which shows an outline of inner structure of an injector (i.e., a fuel injection valve) according to this embodiment. FIG. 2 is an enlarged view for explaining FIG. 1 in detail.

First, a basic structure and operation of the injector will be described based on FIG. 1. The injector is to spray high-pressure fuel, as stored in a common rail (not shown), into a combustion chamber E1z formed in a cylinder of an internal combustion diesel engine and includes a nozzle 1z for spraying the fuel when the valve is opened, a piezo actuator 2z (opening/closing mechanism) which expands or contracts when charged or discharged electrically, and a back pressure control mechanism 3z (opening/closing mechanism) which is driven by the piezo actuator 2z to control the back pressure acting on the nozzle 1z.

The nozzle 1z is made up of a nozzle body 12z in which spray holes 11z are formed, a needle 13z which is placed on or moved away from a valve seat of the nozzle body 12 to open or close the spray hole 11z, and a spring 14z urging the needle 13z in a valve-closing direction.

The piezo actuator 2z is made of a stack of piezoelectric devices (i.e., a piezo stack). The piezoelectric devices are capacitive loads which selectively expand or contact through the piezoelectric effect. Specifically, the piezo stack functions as an actuator to move the needle 13z.

Within a valve body 31z of the back pressure control mechanism 3z, a piston 32z which is to be moved following the contraction and expansion of the piezo actuator 2z, a disc spring 33z urging the piston 32z toward the piezo actuator 2z, and a spherical valve body 34z to be driven by the piston 32z are disposed. In FIG. 1, the valve body 31z is illustrated as being made of a single member, but actually formed by a plurality of blocks.

The cylindrical injector body 4z has formed therein a stepped cylindrical storage hole 41z extending substantially in an injector axial direction (i.e., a vertical direction, as viewed in FIG. 1) at the radial center thereof. Within the storage hole 41z, the piezo actuator 2z and the back pressure control mechanism 3z are disposed. A cylindrical retainer 5z is threadably fitted to the injector body 4z to secure the nozzle 1z to the end of the injector body 4z.

The nozzle body 12z, the injector body 4z, the valve body 31z have formed therein high-pressure fuel paths 6z (corresponding to fluid paths) into which the fuel is delivered at a high pressure from the common rail at all times. The injector body 4z and the valve body 31z have formed therein a low-pressure fuel path 7z leading to the fuel tank (not shown). The bodies 12z, 4z, and 31z are made of metal and inserted into and disposed in an insertion hole E3z formed in a cylinder head E2z of the engine. The injector body 4z has an engaging portion 42z (press surface) which engages an end of a clamp Kz. The other end of the clamp Kz is fastened to the cylinder head E2z to press the engaging portion 42z into the insertion hole E3z at the end of the clamp Kz, thereby securing the injector in the insertion hole E3z while being pressed.

A high-pressure chamber 15z is formed between an outer peripheral surface of a spray hole 11z side of the needle 13z and an inner peripheral surface of the nozzle body 12z. When the needle 13z is moved in a valve-opening direction, the high-pressure chamber 15z communicates with the spray holes 11z. The high-pressure chamber 15z is supplied with the high-pressure fuel at all the time through the high-pressure fuel path 6. A back-pressure chamber 16z is formed on a spray hole-far side of the needle 13z. The spring 14z is disposed within the back-pressure chamber 16z.

The valve body 31z has a high-pressure seat 35z formed in a path communicating between the high-pressure path 6z in the valve body 31z and the back pressure chamber 16z. The valve body 31z has a low-pressure seat 36z formed in a path communicating between the low-pressure fuel path 7z in the valve body 31z and the back-pressure chamber 16z in the nozzle 1z. The above described valve body 34z is disposed between the high-pressure seat 35z and the low-pressure seat 36z.

The injector body 4z, as illustrated in FIG. 2, has a high-pressure port 43z (a high-pressure joint) connecting with the high-pressure pipe HPz and a low-pressure port 44z (a leakage pipe joint) connecting with a low-pressure pipe LPz (a leakage pipe). The low-pressure port 44z, as illustrated in FIG. 1, may be disposed on a spray hole side of the clamp Kz or alternatively, as illustrated in FIG. Kz, be disposed a spray hole-far side of the clamp Kz. Similarly, the high-pressure port 43z may be disposed on either of the spray hole side or the spray hole-far side of the clamp Kz.

In this embodiment, the fuel, as is delivered from the common rail to the high-pressure port 43z through the high-pressure pipe HPz, is supplied from an outer peripheral side of the cylindrical injector body 4z. The fuel supplied to the injector passes through portions 6az and 6bz (see FIG. 2) in the high-pressure port 43z of the high-pressure path 6z which extends perpendicular to the injector axial direction (i.e., a vertical direction in FIG. 1), enters a portion 6cz (see FIG. 2) extending in the injector axial direction (i.e., the vertical direction in FIG. 1), and then flows into the high-pressure chamber 15z and the back pressure chamber 16z.

The high-pressure path 6cz (i.e., a first path) and the high-pressure path 6bz (i.e., a second path) intersect perpendicular to each other in the form of an elbow. From the intersection 6dz, a branch path 6ez extends in the spray hole-opposite direction of the injector body 4z coaxially with the high-pressure path 6cz. The branch path 6ez works to deliver the fuel within the high-pressure paths 6bz and 6cz to the fuel pressure sensor 50z, as will be described later.

In the high-pressure paths 6az and 6bz within the high-pressure port 43, the large-diameter portion 6az which is greater in diameter than the small-diameter portion 6bz. In the large-diameter portion 6az, the filter 45z (see FIG. 2) is disposed to trap foreign objects contained in the high-pressure fuel.

In the above arrangements, when the piezo actuator 2z is contracted, it will cause the valve body 34z, as illustrated in FIG. 1, to be placed in contact with the low-pressure seat 36z to establish communication of the back pressure chamber 16z with the high-pressure path 6z, so that the high-pressure fuel flows into the back pressure chamber 16z. The needle 13z is urged in the valve-closing direction by the fuel pressure of the back pressure chamber 16z and the spring 14z to close the spray holes 11z.

Alternatively, when the piezoelectric actuator 2z is charged so that it expands, the valve body 34z is pushed into abutment with the high-pressure seat 35z to establish the fluid communication between the back-pressure chamber 16z and the low-pressure fuel path 7z, so that the pressure in the back-pressure chamber 16z drops, thereby causing the needle 13z to be urged by the pressure of fuel in the high-pressure chamber 15z in the valve-opening direction to open the spray holes 11z to spray the fuel into the combustion chamber E1z of the engine.

The spraying of the fuel from the spray holes 11z will result in a variation in pressure of the high-pressure fuel in the high-pressure path 6z. The fuel pressure sensor 50z (corresponding to a diaphragm portion and a displacement sensing means) working to monitor such a fuel variation are installed in the injector body 4z. The time when the fuel has started to be sprayed actually may be found by sampling the time when the pressure of fuel has started to drop following the start of injection of fuel from the spray holes 11z from the waveform of a variation in pressure as measured by the pressure sensor 50z. The time when the fuel has stopped from being sprayed actually may be found by sampling the time when the pressure of fuel has started to rise following the termination of the fuel injection. In addition to the injection start time and the injection termination time, the quantity of fuel having been sprayed may be found by sampling the amount by which the fuel has dropped actually which arises from the spraying of the fuel.

The structure of the fuel pressure sensor 50z and installation of the fuel pressure sensor 50z in the injector body 4z will be described using FIG. 2.

The fuel pressure sensor 50z is equipped with a stem 51z (an elastic body) which is sensitive to the pressure of high-pressure fuel in the branch path 6ez to deform elastically and a strain gauge 52z (corresponding to a sensing device or a displacement sensing means) working to convert the degree of deformation of the stem 51z into an electric signal and output it as a measured-pressure value. The material of the metallic stem 51z is required to have a mechanical strength great enough to withstand a ultrahigh pressure and to hardly undergo thermal expansion (i.e., a low coefficient of thermal expansion) to keep adverse effects on the strain gauge 52z low. Specifically, the stem 51z may be made by selecting material containing main components of Fe, Ni, and Co or Fe and Ni and additional components of Ti, Nb, and Al or Ti and Nb as precipitation reinforcing material and pressing, cutting, or cold forging it.

The stem 51z includes a cylindrical portion 61bz and a disc-shaped diaphragm 51cz (corresponding to a thin-wall portion). The cylindrical portion 51bz has formed in an end thereof a inlet port 51az into which the high-pressure fuel is introduced. The diaphragm 51cz closes the other end of the cylindrical portion 51bz. The pressure of the high-pressure fuel entering the cylindrical portion 51bz at the inlet port 51az is exerted on the diaphragm 51cz and an inner wall of the cylindrical portion 51bz, so that the stem 51z is deformed elastically as a whole.

The cylindrical portion 51bz and the diaphragm 51cz are axial-symmetrical with respect to an axial line J1z, as indicated by a dashed line in FIG. 2, so that the diaphragm 51cz will deform axisymmetrically when subjected to the high-pressure fuel. The axial line J1z of the stem 51z is parallel to the axial line j2z of the injector body 4z. The fuel pressure sensor 50z is offset-disposed, so that the axial line J1z of the stem 51z is offset from the axial line j2z of the injector body 4z.

The end surface of the cylindrical injector body 4z on the spray hole-far side thereof has formed therein a recess 46z into which the cylindrical portion 51bz of the stem 51z is inserted. The recess 46z has an internal thread formed in an inner peripheral surface thereof. The cylindrical portion 51bz has an external thread 51ez formed on an outer peripheral surface thereof. After the stem 51z is inserted into the recess 46z from outside the axial line J2z of the injector body 4z, a chamfered portion 51fz formed on the outer peripheral surface of the cylindrical portion 51bz is fastened by a tool to establish engagement of the external thread 51bz with the internal thread of the recess 46z.

A sealing surface 46az is formed on the bottom surface of the recess 46z which extends in the form of an annular shape so as to surround the inlet port 51az. On one end (i.e., the diaphragm-far side) of the cylindrical portion 51bz, an annular sealing surface 51gz is formed which is to be placed in close abutment with the sealing surface 46az. The sealing surface 51gz of the cylindrical portion 51bz is, therefore, pressed against the sealing surface 46az of the recess 46z by fastening force produced by threadable engagement of the external thread 51ez of the cylindrical portion 51bz with the internal thread of the recess 46z. This creates metal-to-metal tough sealing between the injector body 4z and the stem 51z at the sealing surfaces 46az and 51gz. The metal-to-metal tough sealing avoids the leakage of the high-pressure fuel in the branch path 6ez outside the injector body 4z through a surface of contact between the injector body 4z and the stem 51z. The sealing surfaces 46az and 51gz are so shaped as to expand vertically to the axial line J1z and have a flat sealing structure.

The strain gauge 52z is affixed to a mount surface 51hz of the diaphragm 51cz (i.e., a surface opposite the inlet port 51az) through an insulating film (not shown). When the pressure of the high-pressure fuel enters the cylindrical portion 51bz, so that the stem 51z elastically expands, the diaphragm 51cz will deform. This causes the strain gauge 52z to produce an electrical output as a function of the amount of deformation of the diaphragm 51cz. The diaphragm 51cz and a portion of the cylindrical portion 51bz are located outside the recess 46z. The diaphragm 51cz is so shaped as to expand vertically to the axial line J1z.

An insulating substrate 53z is placed in flush with the mount surface 51hz. On the insulating substrate 53z, circuit component parts 54z constituting a voltage applying circuit and an amplifier are mounted. These circuits are joined to the strain gauge 52z by wire bonds Wz. The strain gauge 52z to which the voltage is applied to the voltage applying circuit constitutes a bridge circuit along with other resistance devices (not shown) and a resistance value which varies as a function of the degree of strain of the diaphragm 51cz. This causes an output voltage of the bridge circuit to change as a function of the strain of the diaphragm 51cz. The output voltage is outputted to the amplifier as the measured pressure value of the high-pressure fuel. The amplifier amplifies the measured pressure value, as outputted from the stain gauge 52z (i.e., the bridge circuit) and output the amplified signal to the sensor terminal 55z.

The drive terminals 56z are terminals which are joined to positive and negative lead wires 21z (i.e., drive lines) connecting with the piezo actuator 2z and supply the electric power to the piezo actuator 2z. The drive electric power for the piezo actuator 2z is at a high voltage (e.g., 160V to 170V) and is on or off each time the piezo actuator 2z is charged or discharged.

The sensor terminals 55z and the drive terminals 56z are disposed integrally in a molded resin 60z. The molded resin 60z is made up of a body 61z, a boss 62z, and a cylindrical portion 63z. The body 61z is placed on the spray hole-far side of the substantially cylindrical injector body 4z. The boss 62z extends from the body 61z to the spray hole side. The cylindrical portion 63z extends from the body 61 toward the spray hole side.

The body 61z has formed therein a through hole 61az within which the fuel pressure sensor 50z is disposed. The mount surface 51hz of the diaphragm 51cz is exposed on the spray hole-far side of the body 61z. The insulating substrate 53z is affixed to the surface of the body 61z which is on the spray hole-far side, so that the mount surface 51hz lies in the same plane as the insulating substrate 53z. The strain gauge 52z on the mount surface 51hz, the circuit component parts 54z, and the insulating substrate 53z are disposed within a recess 61bz formed on the spray hole-far side of the body 61z. The recess 61bz is closed by a resinous cover 64z.

The boss 62z is inserted into in a lead wire hole 47z for the lead wires 21z is formed in the injector body 4z, thereby positioning the molded resin 60z radially of the injector body 4z. The boss 62z has formed therein a through hole 62az which extends substantially parallel to the axial line J2z. The lead wires 21z are inserted into and disposed in the through hole 62az. The ends of the lead wires 21z and ends 56az of the drive terminals 56 are exposed to the spray hole-far side of the body 61z and are welded electrically to each other.

The cylindrical portion 63z is so shaped as to extend along the outer periphery of the injector body 4z. An O-ring (i.e., a sealing member) S1z is fit in between the circumference of the injector body 4z and the inner peripheral surface of the cylindrical portion 63z to establish a hermetical seal therebetween, which avoids the intrusion of water from outside the injector body 4z to the strain gauge 52z and the lead wires 21z through a contact between the injector body 4z and the molded resin 60z. When adhered to the lead wires 21z, drops of water may flow along the lead wires 21z to wet the drive terminals 56z and the circuit component parts 54z undesirably.

The sensor terminals 55z and the drive terminals 56z which are unified by the molded resin 60z are disposed within a resinous connector housing 70z. Specifically, the sensor terminals 55z, the drive terminals 56z, and the connector housing 70z constitute a single connector. The connector housing 70z includes a connector connecting portion 71z for establishing a connector-connection with external lead wires, a body 72z in which the molded resin 60z is retained, and a cylindrical portion 73z which extends from the body 72z to the spray hole side.

The body 72z and the cylindrical portion 73z are contoured to conform with the contours of the body 61z, the cover 64z, and the cylindrical portion 63z of the molded resin 60z. The connector housing 70z and the molded resin 60z are joined together using welding techniques. Specifically, the body 72z has annular welding portions 72az which avoids the intrusion of water from outside the injector body 4z through a contact between the inner peripheral surface of the cylindrical portion 73z of the connector housing 70z and the outer peripheral surface of the cylindrical portion 73z of the molded resin 60z into the sensor terminals 55z and the drive terminals 56z exposed inside the connector connecting portion 71z.

The cylindrical portion 73z has an engaging portion 72bz formed on a spray hole side end thereof. The engaging portion 72bz engages an engaging portion 48z formed on the injector body 4z, thereby securing the orientation of the connector housing 70z and the molded resin 60z to the axial line J1z with respect to the injector body 4z.

Next, a sequence of steps of installing the fuel pressure sensor 50z and the connector housing 70z in and on the injector body 4z will be described below in brief.

First, the piezo-actuator 2z and the fuel pressure sensor 50z are installed in the storage hole 41z and the recess 46z of the injector body 4z, respectively. The installation of the fuel pressure sensor 50z is, as already described above, achieved by inserting the fuel pressure sensor 50z into the recess 46z from outside the axial line J2z, and turning the chamfered surface 51fz using the tool to establish the metal-touch-seal between the injector body 4z and the stem 51z at the sealing surface 46az and 51gz. The sensor terminals 55z and the drive terminals 56z are united by the molded resin 60z. The insulating substrate 53z on which the circuit component parts 54z are fabricated is mounted on the molded resin 60z.

Next, the molded resin 60z in and on which the sensor output terminals 55z, the drive terminals 56z, and the insulating substrate 53z are mounted is fitted in the injector body 4z in which the piezo-actuator 2z and the fuel pressure sensor 50z are already installed. Specifically, the boss 62z of the molded resin 60z is fitted into the lead wire hole 47z. Simultaneously, the lead wires 21z are inserted into the through hole 62az and the insertion holes 82az. The fuel pressure sensor 50z is fitted into the through hole 61az of the body 61z, so that the mount surface 51hz lies flush with the insulating substrate 53z.

Subsequently, the strain gauge 52z placed on the mount surface 51hz is joined electrically to lands not shown on the insulating substrate 53z through the wire bonds Wz using a wire-bonding machine The ends 21az of the lead wires 21z exposed inside the recess 61bz are welded to the ends 56az of the drive terminals 56z.

The cover 54z is welded or glued to the recess 61bz of the molded resin 60z to hermetically cover the strain gauge 52z, the circuit component parts 54z, and the insulating substrate 53z within the recess 61bz. Subsequently, the connector housing 70z is installed in the molded resin 60z. Specifically, the sensor terminals 55z and the drive terminals 56z which are disposed integrally in the molded resin 60z are placed inside the connector connecting portion 71z. Simultaneously, the body 61z of the molded resin 60z is placed inside the body 72z of the connector housing 70z. The engaging portion 72bz of the connector housing 70z is placed in engagement with the engaging portion 48z of the injector body 4z.

The above steps complete the installation of the fuel pressure sensor 50z and the connector housing 70z in and on the injector body 4z. In this complete assembly, the molded resin 60z is located between the injector body 4z and the circuit component parts 54z and also between the stem 51z and the circuit component parts 54z. In use, the injector is disposed in the insertion hole E3z of the cylinder head E2z, so that it is exposed to a high-temperature of, for example, 140° C., which leads to a concern about the thermal breakage of the circuit component parts 54z.

In contrast to this, the circuit component parts 54z and the insulating substrate 53z of this embodiment are disposed adjacent the molded resin 60z without direct contact with the metallic injector body 4z and the metallic stem 51z. Specifically, the molded resin 60z works as a thermal shield to the circuit component parts 54z thermally from the metallic injector body 4z and the stem 51z, thereby eliminating the concern about the thermal breakage of the circuit component parts 54z.

The above described embodiment offers the following advantages.

1) The installation of the fuel pressure sensor 50z working to measure the pressure of the high-pressure fuel in the injector body 4z is achieved by making the fuel pressure sensor 50z of the stain gauge 52z and the stem 51z and attaching the strain gauge 52z to the stem 51z installed in the injector body 4z. The stem 51z is made independently from the injector body 4z, thus permitting a loss of propagation of inner stress in the injector body 4z resulting from thermal expansion/contraction to the stem 51z to be increased. Specifically, the stem 51z is made to be separate from the injector body 4z, thus reducing the adverse effects of the distortion of the injector body 4z on the stem 51z on which the strain gauge 52z is disposed as compared with when the strain gauge 52z is attached directly to the injector body 4z. This results in improved accuracy of the fuel pressure sensor 50z in measuring the pressure of fuel and enables the installation of the fuel pressure sensor 50z in the injector.

2) The stem 51zs made of material whose coefficient of thermal expansion is low, thereby resulting in a decrease in thermal distortion of the stem 51z. Only the stem 51z may be made by the material whose coefficient of thermal expansion is low, thus resulting in a decrease in material cost as compared with the whole of the body 4z is made of material whose coefficient in thermal expansion is low.

3) The stem 51z is axisymmetrical in configuration thereof, thus resulting in axisymmetrical deformation thereof when the diaphragm 51cz is subjected to the pressure of the fuel, thus causing the diaphragm 51cz to deform elastically as a function of the pressure of the fuel exerted thereon accurately. This ensures the accuracy in determining the pressure of the fuel.

4) The diaphragm 51cz is located outside the recess 46z of the injector body 4z, so that it will be insensitive to the thermal distortion of the injector body 4z. This minimizes effects of the distortion of the body 4z to which the strain gauge 52z is subjected, thus improving the accuracy in measuring the pressure of fuel through the fuel pressure sensor 50z.

5) The mount surface 51hz on which the strain gauge 52z is mounted is placed flush with the insulating substrate 53z on which the circuit component parts 54z are fabricated, thus facilitating ease of bonding the strain gauge 52z electrically to the circuit component parts 54z through the wire bonds Wz using the wire bonding machine.

6) The sealing surface 51gz of the stem 51z is pressed against the sealing surface 46az of the body 4z by a fastening force as produced by engaging the external thread 51ez of the stem 51z with the internal thread of the body 4z, thereby creating the metal-touch-seal between the stem 51z and the injector body 4z at the sealing surfaces 46az and 51gz, thus facilitating ease of sealing the clearance between the body 4z and the stem 51z against the high-pressure fuel.

7) The formation of the branch path 6ez which diverges from the high-pressure paths 6bz and 6cz to deliver the high-pressure fuel to the fuel pressure sensor 50z almost eliminates a flow of fuel in the branch path 6ez as compared with the high-pressure paths 6bz and 6cz. The pressure sensor 50z measures the high-pressure fuel in the branch path 6ez in which the flow of fuel is hardly created, thus avoiding a decrease in measurement accuracy of the fuel pressure sensor 50z arising from the flow of the fuel.

8) The diverging of the branch path 6ez from the high-pressure path 6z will facilitate the ease with which the stress concentrates on an intersection (i.e., a branched portion) between the paths 6z and 6ez in the body 4z, thus requiring the need for ensuring the strength of the body 4z. In this embodiment, the branch path 6ez diverges from the intersection 6dz at which the two high-pressure paths 6cz and 6bz intersect with each other. The branch path 6ez is formed so as to extend coaxially with the high-pressure path 6cz. This results in a decrease in number of intersections at which the stress will appear.

9) External force is exerted by the clamp Kz, the high-pressure pipe HPz, and the low-pressure pipe LPz on the body 4z. Specifically, the force (i.e., the external force) is exerted by the clamp Kz on the body 4z, which presses body 42z against the insertion hole E3z of the cylinder head E2z. Additionally, when the high-pressure pipe HPz and the low-pressure path LPz are shifted from correct positions and joined to the high-pressure port 43z and the low-pressure port 44z, the force (i.e., external force) will be exerted by the pipes HPz and LPz to return the ports 43z and 44z back to the correct positions. The exertion of the external force on the body 4z from the external members Kz, HPz, and LPz results in an increase in internal stress on the body 4z between a portion of the body 4z which is retained by the cylinder head E2z and portions 42z, 43z, and 44z of the body 4z. This leads to a concern about the decrease in accuracy of the fuel pressure sensor 50z in measuring the pressure of fuel.

In contrast to the above problem, in this embodiment, the location where the fuel pressure sensor 50z is installed in the body 4z is far from the cylinder head E2z across the high-pressure port 43z, the low-pressure port 44z, and the engaging portion 42z of the body 4z. The fuel pressure sensor 50z is located away from a portion of the body 4z where the internal stress will be increased (i.e., a portion of the body 4z between a portion of the body 4z retained in the cylinder head E2z and the external force-exerted portions 42z, 43z, and 44z of the body 4z). This minimizes the effects of the internal stress appearing in the body 4z on the fuel pressure sensor 50z and improves the measurement accuracy of the fuel pressure sensor 50z. In this embodiment, the stem 51z is made of material which is smaller in coefficient of thermal expansion than the body 4z, but they may be made of metals having the same coefficient of thermal expansion. In this case, a good metal touch seal is also created between the stem 51z and the body 4z.

Second Embodiment

Figure 3:
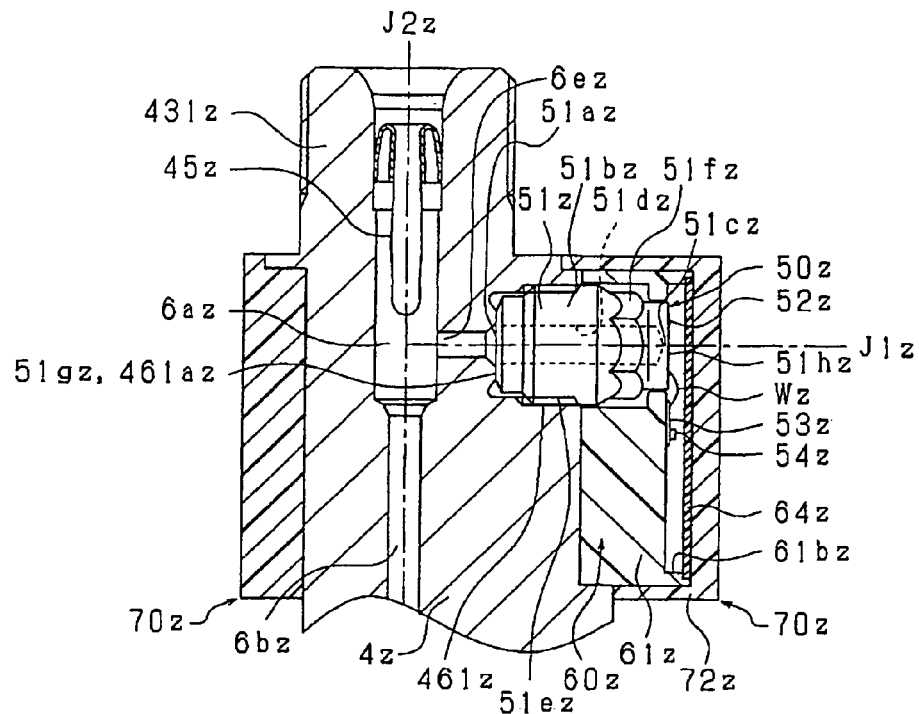
FIG. 3 is a schematic sectional view which shows an outline of internal structure of an injector according to the second embodiment of the invention.

The first embodiment is so designed that the installation of the fuel pressure sensor 50z in the injector body 4z is achieved by fitting it into the injector body 4z from outside the axial line J2z of the cylindrical injector body 4z. In contrast to this, the embodiment of FIG. 3 is designed to achieve the installation from radially outside the cylindrical body 4z. Specifically, the cylindrical injector body 4z has formed in an outer circumferential surface a recess 461z into which the cylinder 51bz of the stem 51z of the fuel pressure sensor 50z is to be fitted. Therefore, a sealing surface 461az of the body 4z which creates the metal-to-metal touch seal between itself and the stem 51z is oriented so as to expand in parallel to the axial line J2z.

The high-pressure port 43z of the injector of the first embodiment is so oriented as to join the high-pressure pipe HPz in the radial direction of the injector. The high-pressure port 431z of this embodiment is so oriented as to join the high-pressure pipe HPz in axial line J2z of the injector. Specifically, the high-pressure port 431z is formed in the spray hole-opposite end surface of the cylindrical body 4z.

The branch path 6ez diverges from the large-diameter portion 6az in which the filter 45z is disposed, thereby producing an accumulating effect in the large-diameter portion 6az having a great volume, and the ability of measuring the fuel pressure in which a pulsation of pressure as a noise is suppressed.

The diverging of the branch path 6ez from the high-pressure paths 6az and 6bz will facilitate the ease with which the stress concentrates on an intersection (i.e., a branched portion) between the paths 6az and 6bz in the body 4z, thus requiring the need for ensuring the strength of the body 4z. In view of this, the branch path 6ez may diverge from the small-diameter portion 6bz to ensure the strength of the body 4z.

Third Embodiment

The second embodiment has the branch path 6ez which diverges from the high-pressure path 6az to deliver the high-pressure fuel to the fuel pressure sensor 50z. In this embodiment of FIG. 4, the branch path 6ez is omitted, while the fuel pressure sensor 50z is installed directly in the high-pressure path 6az through which the fuel flows to the spray hole 11z.

Specifically, the structure in which the stem 51z is made up of the cylindrical portion 51bz and the diaphragm 51cz is omitted. Instead, the top end portion 511az of the stem 51z protrudes into the high-pressure path 6az, so that the tope end portion 511az is positioned inside the high-pressure path 6az. The strain gauge 52z is affixed to the inside of the top end portion 511az (i.e., inside the stem 51z) and converts the degree of strain occurring in the top end portion 511az into an electric signal to output it as a measured pressure signal.

In the above embodiments, the sealing surface 46az of the injector body 4z and the sealing surface 51gz of the stem 51z expand perpendicular to the axial line J1z of the stem 51z to have a flat seal structure. In this embodiment, the sealing surface 462az of the body 4z and the sealing surface 511gz of the stem 51z are inclined perpendicular to the axial line J1 to have a tapered sealing structure.

It is advisable that either of the sealing surfaces 462az and 511gz be curved in the form of a concave, and other be formed to be flat. However, it is easier to machine the stem 51z to be curved than the body 4z. It is, preferable that the sealing surface 462az of the body 4z is formed to be flat, while the sealing surface 511gz of the stem 51z is curved.

Fourth Embodiment

Figure 4:
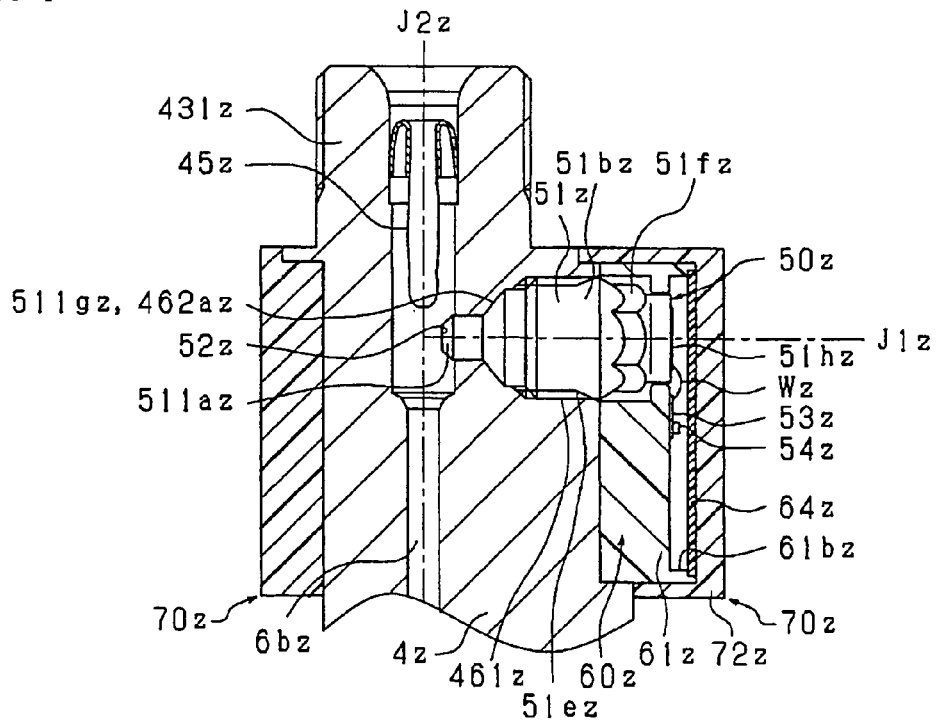
FIG. 4 is a schematic sectional view which shows an outline of internal structure of an injector according to the third embodiment of the invention.
Figure 5:
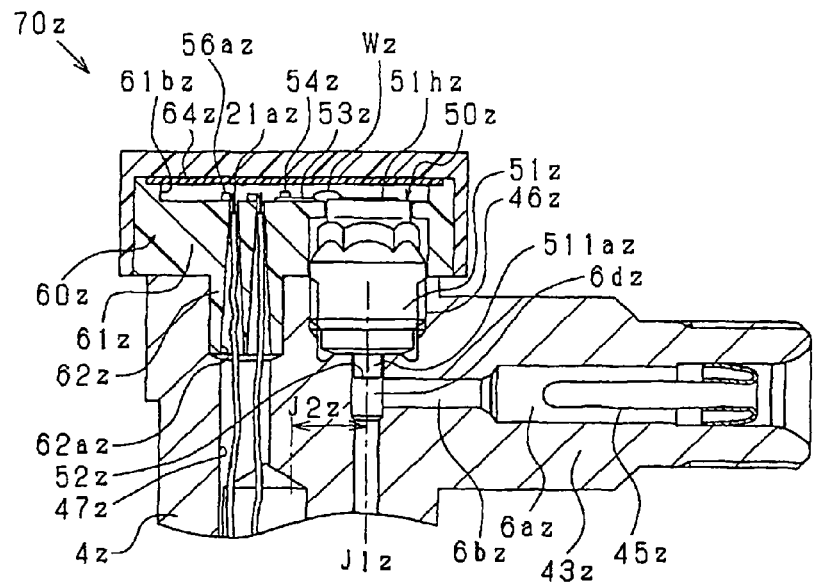
FIG. 5 is a schematic sectional view which shows an outline of internal structure of an injector according to the fourth embodiment of the invention.

In the third embodiment, the structure from which the branch path 6ez is omitted, as illustrated in FIG. 4, is used with an injector of a type wherein the high-pressure port 431z is formed in a spray hole-far side end surface of the cylindrical body 4z. In this embodiment of FIG. 5, the structure from which the branch path 6ez is omitted is used with an injector of a type wherein the high-pressure port 43z is formed in an outer peripheral surface of the cylindrical body 4z.

Fifth Embodiment

The lead wires 21z of the piezo-actuator 2z and the fuel pressure sensor 50z are disposed inside the connector housing 70z. It is necessary to seal the lead wires 21z and the fuel pressure sensor 50z externally. This sealing structure of the first embodiment is so designed that the O-ring S1z (i.e., a sealing member) is interposed between the inner peripheral surface of the cylinder 63z of the molded resin 60z and the outer peripheral surface of the body 4z. Specifically, the single O-ring S1z seals both the lead wires 21z and the fuel pressure sensor 50z hermetically.

Figure 6:
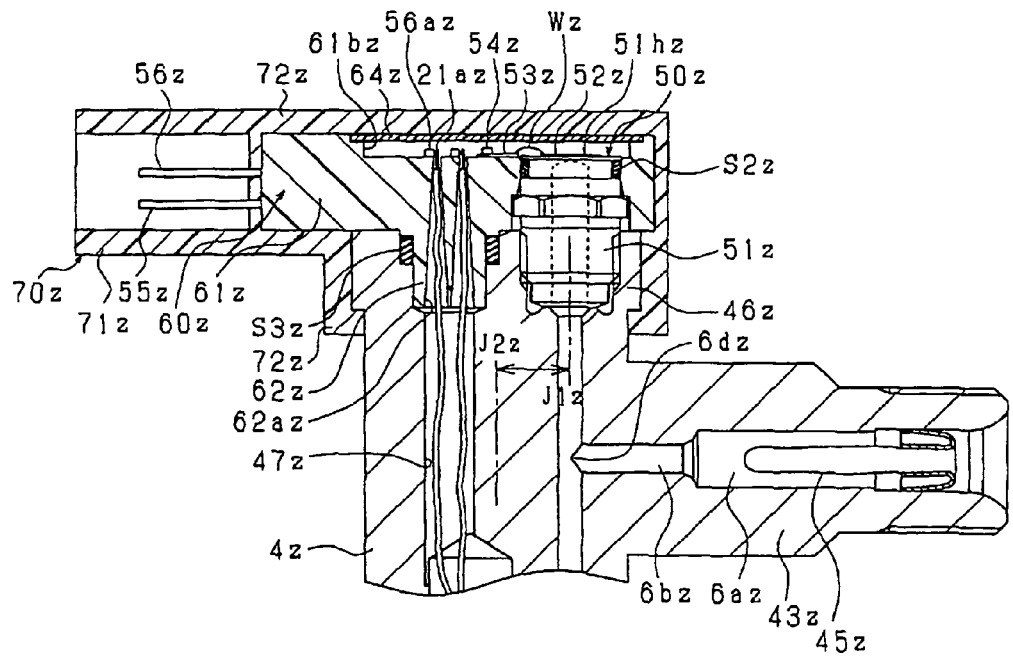
FIG. 6 is a schematic sectional view which shows an outline of internal structure of an injector according to the fifth embodiment of the invention.

In contrast to this, the embodiment, as illustrated in FIG. 6, is designed to have O-rings S2z and S3z (i.e., sealing members) for the lead wires 21z and the fuel pressure sensor 50z. Specifically, the O-ring S2z is interposed between the cylinder body 51bz of the fuel pressure sensor 50z and the recess 46z of the molded resin 60z. The O-ring S3z is interposed between the lead wire hole 47z of the injector body 4z and the boss 62z of the molded resin 60z.

Sixth Embodiment

Figure 7:
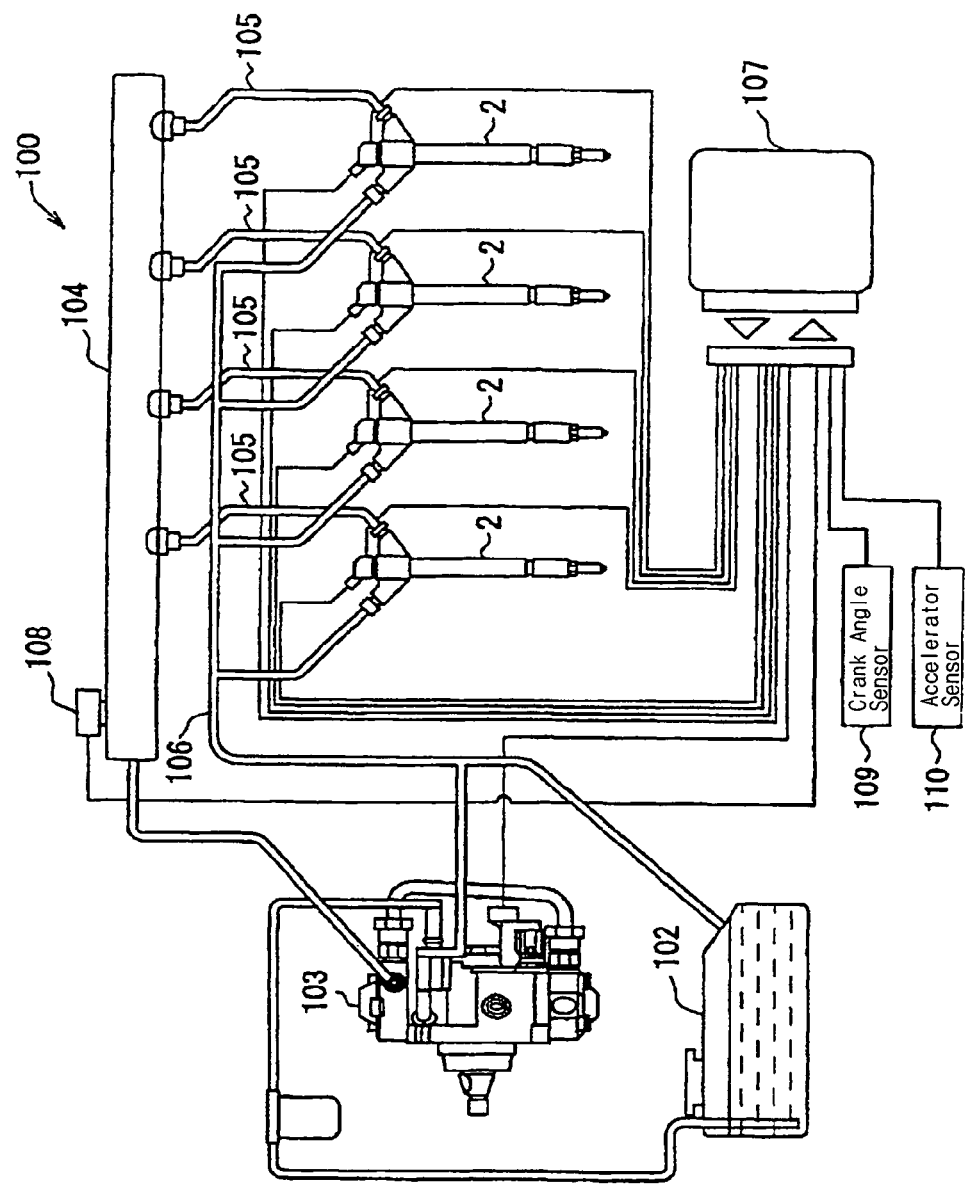
FIG. 7 is a schematic view of a structure in which an injector for a fuel injection device of the sixth embodiment of the invention is installed in a common rail system.
Figure 8:
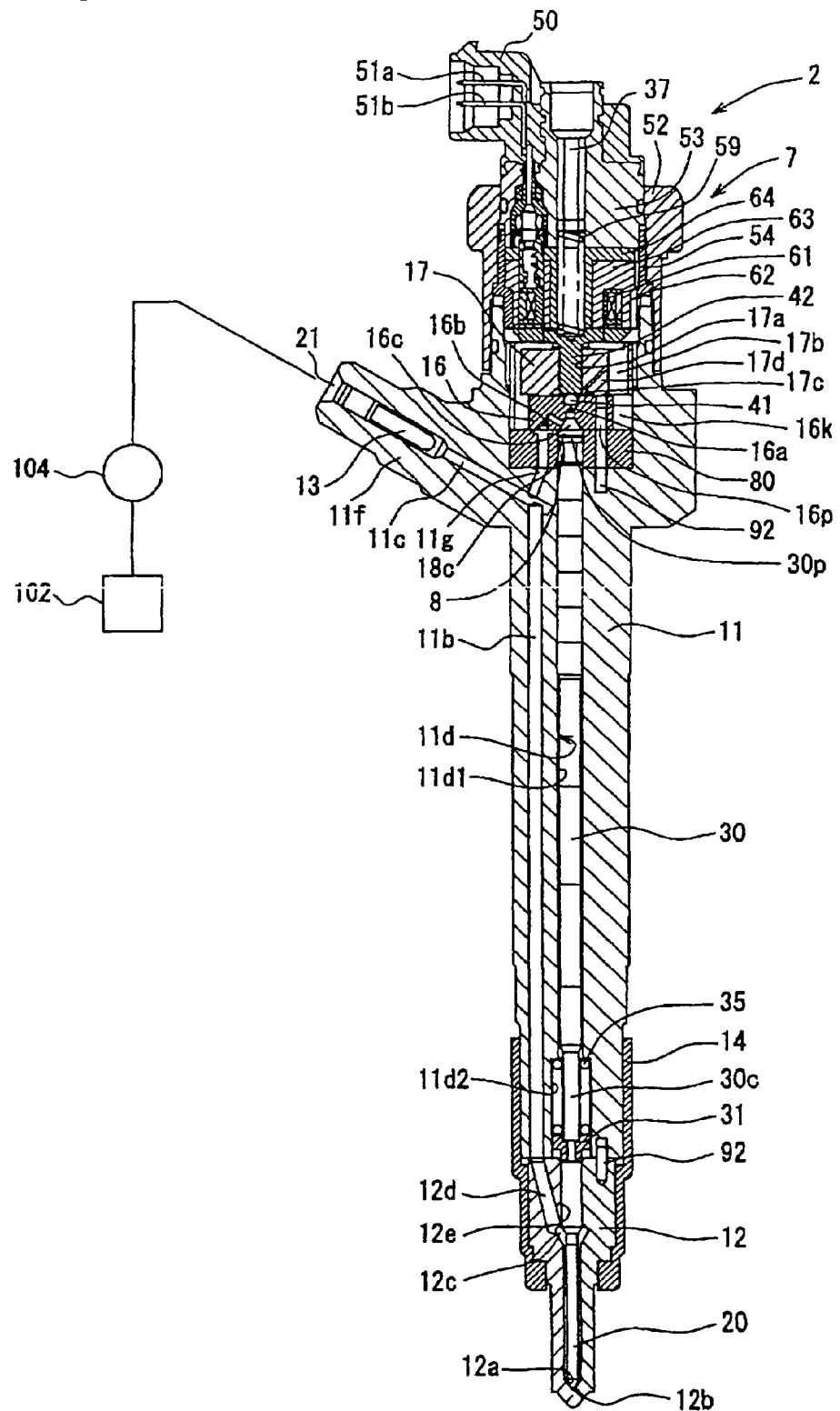
FIG. 8 is a sectional view of an injector for a fuel injection device according to the sixth embodiment.

FIG. 7 is a whole structure view of an accumulator fuel injection system 100 including the above diesel engine. FIG. 8 is a sectional view which shows the injector 2 according to this embodiment. FIGS. 9(a) and 9(b) are partial sectional view and a plane view which illustrate highlights of a fluid control valve in this embodiment. FIGS. 9(c) to 9(e) are partially sectional views and a plane view which show highlights of a pressure sensing member. FIGS. 10(a) and 10(b) are a sectional view and a plane view which illustrate highlights of the pressure sensing member. FIGS. 11(a) to 11(c) are sectional views which illustrate a production method of the pressure sensor. The fuel injection system 100 of this embodiment will be described below with reference to the drawings.

The fuel pumped out of the fuel tank 102 is, as illustrated in FIG. 7, pressurized by the high-pressure supply pump (which will be referred to as a supply pump below) 103 and delivered to the common rail 104. The common rail 104 stores the fuel, as supplied from the supply pump 103, at a high pressure and supplies it to the injectors 2 through high-pressure fuel pipes 105, respectively. The injectors 2 are installed one in each of cylinders of a multi-cylinder diesel engine (which will be referred to as an engine below) mounted in an automotive vehicle and work to inject the high-pressure fuel (i.e., high-pressure fluid), as accumulated in the common rail 104, directly into a combustion chamber. The injectors 2 are also connected to a low-pressure fuel path 106 to return the fuel back to the fuel tank 102.

An electronic control unit (ECU) 107 is equipped with a typical microcomputer and memories and works to control an output from the diesel engine. Specifically, the ECU 107 samples results of measurement by a fuel pressure sensor 108 measuring the pressure of fuel in the common rail 104, a crank angle sensor 109 measuring a rotation angle of a crankshaft of the diesel engine, an accelerator position sensor 110 measuring the amount of effort on an accelerator pedal by a user, and pressure measuring portions 80 installed in the respective injectors 2 to measure the pressures of fuel in the injectors 2 and analyzes them.

The injector 2, as illustrated in FIG. 8, includes a nozzle body 12 retaining therein a nozzle needle 20 to be movable in an axial direction, a lower body 11 retaining therein a spring 35 working as urging means to urge the nozzle needle 20 in a valve-closing direction, a retaining nut 14 working as a fastening member to fastening the nozzle body 12 and the lower body 11 through an axial fastening pressure, a solenoid valve device 7, and the pressure sensing portion 80. The nozzle body 12, the lower body 11, and the retaining nut 14 form a nozzle body of the injector with the nozzle body 12 and the lower body 11 fastened by the retaining nut 14. In this embodiment, the lower body 11 and the nozzle body 12 form an injector body. The nozzle needle 20 and the nozzle body 12 forms a nozzle.

The nozzle body 12 is substantially of a cylindrical shape and has at least one spray hole 12b formed in a head thereof (i.e., a lower end, as viewed in FIG. 8) for spraying a jet of fuel into the combustion chamber.

The nozzle body 12 has formed therein a storage hole 12e (which will also be referred to as a first needle storage hole below) within which the solid-core nozzle needle 20 is retained to be slidable in the axial direction thereof. The first needle storage hole 12e has formed in a middle portion thereof, as viewed vertically in the drawing, a fuel sump 12c which increases in a hole diameter. Specifically, the inner periphery of the nozzle body 12 defines the first needle storage hole 12e, the fuel sump 12c, and a valve seat 12a in that order in a direction of flow of the fuel. The spray hole 12b is located downstream of the valve seat 12a and extends from inside to outside the nozzle body 12.

The valve seat 12a has a conical surface and continues at a large diameter side to the first needle storage hole 12e and at a small diameter side to the spray hole 12b. The nozzle needle 20 is seated on or away from the valve seat 12a to close or open the nozzle needle 20.

The nozzle body 12 also has a fuel feeding path 12d extending from an upper mating end surface thereof to the fuel sump 12c. The fuel feeding path 12d communicates with a fuel supply path 11b, as will be described later in detail, formed in the lower body 11 to deliver the high-pressure fuel, as stored in the common rail 104, to the valve seat 12a through the fuel sump 12c. The fuel feeding path 12d and the fuel supply path 11b define a high-pressure fuel path.

The lower body 11 is substantially of a cylindrical shape and has formed therein a storage hole 11d (which will also be referred to as a second needle storage hole below) within which the spring 35 and a control piston 30 which works to move the nozzle needle 20 are disposed to be slidable in the axial direction of the lower body 11. An inner circumference 11d2 is formed in a lower mating end surface of the second needle storage hole 11d. The inner circumference 11d2 is expanded more than a middle inner circumference 11d1.

Specifically, the inner circumference 11d2 (which will also be referred to as a spring chamber below) defines a spring chamber within which the spring 35, an annular member 31, and a needle 30c of the control piston 30 are disposed. The annular member 31 is interposed between the spring 35 and the nozzle needle 20 and serves as a spring holder on which the spring 35 is held to urge the nozzle needle 20 in the valve-closing direction. The needle 30c is disposed in direct or indirect contact with the nozzle needle 20 through the annular member 31.

The lower body 11 has a coupling 11f (which will be referred to as an inlet below) to which the high-pressure pipe, as illustrated in FIG. 7, connecting with a branch pipe of the common rail 104 is joined in an air-tight fashion. The coupling 11f is made up of a fluid induction portion 21 at which the high-pressure fuel, as supplied from the common rail 104, enters and a fuel inlet path 11c (will also be referred to as a second fluid path corresponding to a high-pressure path) through which the fuel is delivered to the fuel supply path 11b (will also be referred to as a first fluid path corresponding to a high-pressure path). The fuel inlet path 11c has a bar filter 13 installed therein. The fuel supply path 11b extends in the inlet 11f and around the spring chamber 11d2.

Figure 10:
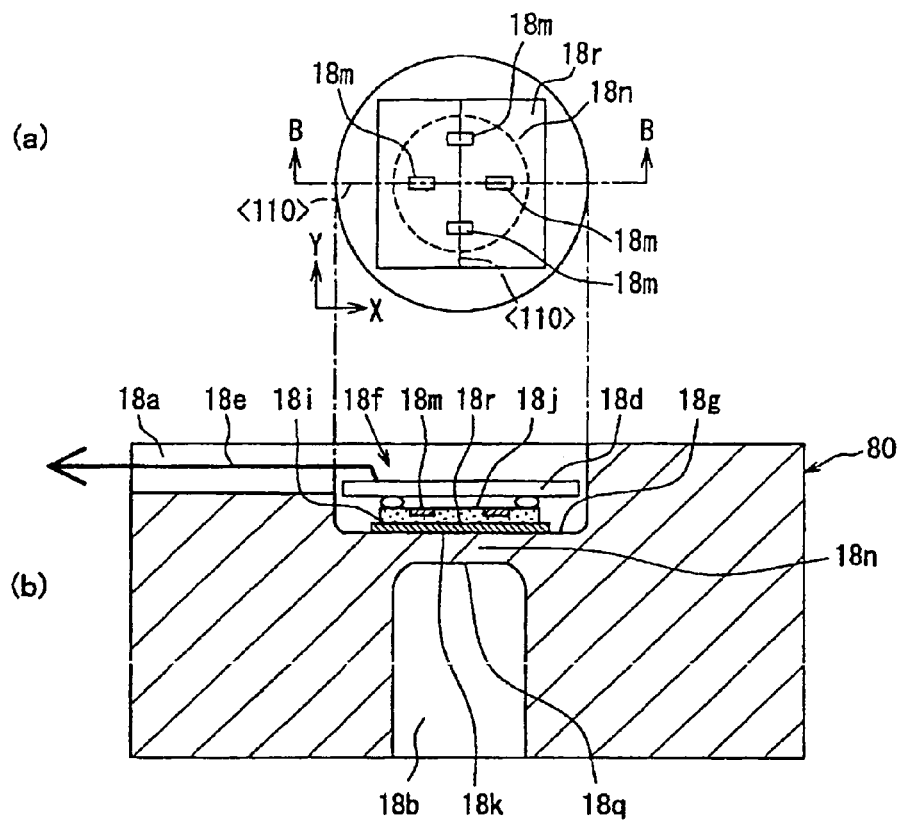
FIG. 10(a) is an enlarged plan view near a diaphragm of a pressure sensing member in the sixth embodiment.
FIG. 10(b) is an A-A sectional view of FIG. 10(a)

The lower body 11 also has a fuel drain path (which is not shown and also referred to as a leakage collecting path) through which the fuel in the spring chamber 11d2 is returned to a low-pressure fuel path such as the fuel tank 102, as illustrated in FIG. 10. The fuel drain path and the spring chamber 11d2 form the low-pressure fuel path.

As illustrated in FIG. 8, on the other end side of the control piston 30, pressure control chambers 8 and 16c (which will be referred to as hydraulic control chambers) are defined to which the hydraulic pressure is supplied by the solenoid-operated valve device 7.

The hydraulic pressure in the hydraulic pressure control chambers 8 and 16c is increased or decreased to close or open the nozzle needle 20. Specifically, when the hydraulic pressure is drained from the hydraulic pressure control chambers 8 and 16c, it will cause the nozzle needle 20 and the control piston 30 to move upward, as viewed in FIG. 8, in the axial direction against the pressure of the spring 35 to open the spray hole 12b. Alternatively, when the hydraulic pressure is supplied to the hydraulic pressure control chambers 8 and 16c so that it rises, it will cause the nozzle needle 20 and the control piston 30 to move downward, as viewed in FIG. 9, in the axial direction by the pressure of the spring 35 to close the spray hole 12b.

The pressure control chambers 8, 16c, and 18c are defined by an outer end wall (i.e., an upper end) 30p of the control piston 30, the second needle storage hole 11d, an orifice member 16, and a pressure sensing member 81. When the spray hole 12b is opened, the upper end wall 30p lies flush with a flat surface 82 of the pressure sensing member 81 placed in surface contact with the orifice block 16 or is located closer to the spray hole 12b than the flat surface 82. In other words, when the spray hole 12b is opened, the upper end wall 30p is disposed inside the pressure control chamber 18c of the pressure sensing member 81.

Next, the solenoid-operated valve 7 will be described in detail. The solenoid-operated valve 7 is an electromagnetic two-way valve which establishes or blocks fluid communication of the pressure control chambers 8, 16c, and 18c with a low-pressure path 17d (which will also be referred to as a communication path below). The solenoid-operated valve 7 is installed on a spray hole-opposite end of the lower body 11. The solenoid-operated valve 7 is secured to the lower body 11 through an upper body 52. The orifice member 16 is disposed on the spray hole-opposite end of the second needle storage hole 11d as a valve body.

The orifice member 16 is preferably made of a metallic plate (a first member) extending substantially perpendicular to an axial direction of the fuel injector 2, that is, a length of the control piston 30. The orifice member 16 is machined independently (i.e., in a separate process or as a separate member) from the lower body 11 and the nozzle body 12 defining the injector body and then installed and retained in the lower body 11. The orifice member 16, as illustrated in FIGS. 9(a) and 9(b), has communication paths 16a, 16b, and 16c formed therein. FIG. 9(b) is a plan view of the orifice member 16, as viewed from a valve armature 42. The communication paths 16a 16b, and 16c (which will also be referred to as orifices below) work as an outer orifice defining an outlet, an inner orifice defining an inlet, and the control chamber 16c which leads to the second needle chamber 11d.

The outer orifice 16a communicates between the valve seat 16d and the pressure control chamber 16c. The outer orifice 16a is closed or opened by a valve member 41 through the valve armature 42. The inner orifice 16b has an inlet 16h opening at the flat surface 162 of the orifice member 16. The inlet 16h communicates between the pressure control chamber 16c and a fuel supply branch path 11g through a sensing portion communication path 18h formed in the pressure sensing member 81. The fuel supply branch path 11g diverges from the fuel supply path 11b.

The valve seat 16d of the orifice body 16 on which the valve member 41 is to be seated and the structure of the valve armature 42 will be described later in detail.

The valve body 17 serving as a valve housing is disposed on the spray hole-far side of the orifice member 16. The valve body 17 has formed on the periphery thereof an outer thread which meshes with an inner thread formed on a cylindrical threaded portion of the lower body 11 to nip the orifice member 16 between the valve body 17 and the lower body 11. The valve body 17 is substantially of a cylindrical shape and has through holes 17a and 17b (see FIG. 8). The communication path 17d is formed between the through holes 17a and 17b. The hole 17a will also be referred to as a guide hole below.

The valve body-side end surface 161 of the orifice member 16 and the inner wall of the through hole 17a define a valve chamber 17c. The orifice member 16 has formed on an outer wall thereof diametrically opposed flats (not shown). A gap 16k formed between the flats and the inner wall of the lower body 11 communicates with the through holes 17b (see FIG. 8).

The pressure sensing portion 80 is, as illustrated in FIGS. 9(c) and 9(d), equipped with the pressure sensing member 81 which is separate from the injector body (i.e., the lower body 11 and the valve body 17). FIG. 9(d) is a plan view of the pressure sensing member 81, as viewed from the orifice member 16. The pressure sensing member 81 is preferably made of a metallic plate (second member) extending substantially perpendicular to the axial direction of the fuel injector 2, i.e., the length of the control piston 30 and laid to overlap directly or indirectly with the orifice member 16 within the orifice member 16. The pressure sensing member 81 is secured firmly to the lower body 11 and the nozzle body 12. In this embodiment, the pressure sensing member 81 has the flat surface 82 placed in direct surface contact with the flat surface 162 of the orifice member 16 in the liquid-tight fashion. The pressure sensing member 81 and the orifice member 16 are substantially identical in contour thereof and attached to each other so that the inlet 16h, the through hole 16p, and the pressure control chamber 16c of the orifice member 16 may coincide with the sensing portion communication path 18h, the through hole 18p, and the pressure control chamber 18c formed in the pressure sensing member 81, respectively. The orifice member-far side of the sensing portion communication path 18h opens at a location corresponding to the fuel supply branch path 11g diverging from the fuel supply path 11b. The through hole 18h of the pressure sensing member 81 forms a portion of the path from the fuel supply path 11b to the pressure control chamber.

The pressure sensing member 81 (corresponding to a fuel pressure sensor) is also equipped with a pressure sensing chamber 18b defined by a groove formed therein which has a given depth from the orifice member 16 side and inner diameter. The bottom of the groove defines a diaphragm 18n. The diaphragm 18n has a semiconductor sensing device 18f affixed or glued integrally to the surface thereof opposite the pressure sensing chamber 18b.

The diaphragm 18n is located at a depth that is at least greater than the thickness of the pressure sensor 18f below the surface of the pressure sensing member 81 which is opposite the pressure sensing chamber 18b. The surface of the diaphragm 18n to which the pressure sensor 18f is affixed is greater in diameter than the pressure sensing chamber 18b. The thickness of the diaphragm 18n is determined during the production thereof by controlling the depth of both of the grooves sandwiching the diaphragm 18n. The pressure sensing member 81 also has a groove 18a (a branch path below) formed in the flat surface 82 to have a depth smaller than the pressure sensing chamber 18b. The groove 18a communicates between the sensing portion communication path 18h and the pressure sensing chamber 18b. When the pressure sensing member 81 is placed in surface abutment with the orifice member 16, the groove 18a defines a combined path (a branch path below) whose wall is a portion of the flat surface of the orifice member 16. This establishes fluid communications of the groove 18a (i.e., the branch path) at a portion thereof with the inner orifice 16b that is the path extending from the fuel supply path 11b to the hydraulic pressure control chambers 8 and 16c and at another portion thereof with the diaphragm 18n, so that the diaphragm 18n may be deformed by the pressure of high-pressure fuel flowing into the pressure sensing chamber 18b.

The diaphragm 18n is the thinnest in wall thickness among the combined path formed between the groove 18a and the orifice member 16 and the pressure sensing chamber 18b. The thickness of the combined path is expressed by the thickness of the pressure sensing member 81 and the orifice member 16, as viewed from the inner wall of the combined path.

Instead of the groove 18a, a hole, as illustrated in FIG. 9(e), may be formed which extends diagonally between the sensing portion communication path 18h and the pressure sensing chamber 18b. The pressure sensor 18f (displacement sensing means) and the diaphragm 18n function as a pressure sensing portion.

The pressure sensing portion will be described below in detail with reference to FIG. 10.

The pressure sensor 18f is equipped with the circular diaphragm 18n formed in the pressure sensing chamber 18b and a single-crystal semiconductor chip 18r (which will be referred to as a semiconductor chip below) bonded as a displacement sensing means to the bottom of the recess 18g defining at one of surfaces thereof the surface of the diaphragm 18n and designed so that a pressure medium (i.e., gas or liquid) is introduced as a function of the fuel injection pressure in the engine into the other surface 18q side of the diaphragm 18n to sense the pressure based on the deformation of the diaphragm 18n and the semiconductor chip 18r.

The pressure sensing member 81 is formed by cutting and has the hollow cylindrical pressure sensing chamber 18b formed therein. The pressure sensing member 81 is made of Kovar that is Fi—Ni—Co alloy whose coefficient of thermal expansion is substantially equal to that of glass. The pressure sensing member 81 has formed therein the diaphragm 18n subjected at the surface 18q to the high-pressure fuel, as flowing into the pressure sensing chamber 18b.

As an example, the pressure sensing member 81 has the following measurements. The outer diameter of the cylinder is 6.5 mm. The inner diameter of the cylinder is 2.5 mm. The thickness of the diaphragm 18n required under 20 MPa is 0.65 mm, and under 200 MPa is 1.40 mm. The semiconductor chip 18r affixed to the surface of the diaphragm 18n is made of a monocrystal silicon flat substrate which has a plane direction of (100) and an uniform thickness. The semiconductor ship 18r has a surface 18i secured to the surface (i.e., the bottom surface of the recess 18g) through a glass layer 18k made from a low-melting glass material.

Taking an example, the semiconductor chip 18r is of a square shape of 3.56 mm×3.56 mm and has a thickness of 0.2 mm. The glass layer has a thickness of, for example, 0.06 mm. The semiconductor chip 18r is equipped with four rectangular gauges 18m installed in the surface 18j thereof. The gauges 18m is each implemented by a piezoresistor. The semiconductor chip 18r whose plane direction is (100) structurally has orthogonal crystal axes <110>.

The four gauges 18m are disposed two along each of the orthogonal crystal axes <110>. Two of the gauges 18m are so oriented as to have long side thereof extending in the x-direction, while the other two gauges 18m are so oriented as to have short sides extending in the y-direction. The four gauges 18m are arrayed along a circle whose center O lies at the center of the diaphragm 18n.

Although not shown in the drawings, the semiconductor chip 18r also has wires and pads which connect the gauges 18m together to make a typical bridge circuit and make terminals to be connected to an external device. The semiconductor chip 18r also has a protective film formed thereon. The semiconductor chip 18r is substantially manufactured in the following steps, as demonstrated in FIGS. 11(a) to 11(c). First, an n-type sub-wafer 19a is prepared. A given pattern is drawn on the sub-wafer 19a through the photolithography. Subsequently, boron is diffused over the sub-wafer 19a to form p+regions 19b that are piezoresistors working as the gauges 18m. Wires and pads 19c are formed on the sub-wafer 19a. An oxide film 19d is also formed over the surface of the sub-wafer 19a to secure electric insulation of the wires and the pads 19c. Finally, a protective film is also formed. The protective film on the pads is etched to complete the semiconductor chip 18r.

The semiconductor chip 18r thus produced is glued to the diaphragm 18n of the pressure sensing member 81 using a low-melting glass to complete the pressure sensor 18f, as illustrated in FIG. 10. The pressure sensor 18f converts the displacement (flexing) of the diaphragm 18n caused by the pressure of high-pressure fuel into an electric signal (i.e., a difference in potential of the bridge circuit arising from a change in resistance of the piezoresistors). An external processing circuit (not shown) handles the electric signal to determine the pressure.

The processing circuit may be fabricated monolithically on the semiconductor chip 18r. In this embodiment, a processing circuit board 18d is disposed over the semiconductor chip 18r and electrically connected therewith through, for example, the flip chip bonding. A constant current source and a comparator that are parts of the above described bridge circuit is fabricated on the processing circuit board 18d. A non-volatile memory (not shown) which stores data on the sensitivity of the pressure sensor 18f and the injection quantity characteristic of the fuel injector may also be mounted on the processing circuit board 18d. Wires 18e are connected at one end to terminal pads arrayed on the side of the processing circuit board 18d and at the other end to terminal pins 51b mounted in a connector 50 through a wire passage (not shown) formed within the valve body 17 and electrically connected to the ECU 107.

The pressure sensor 18f equipped with the piezoresistors and the low-melting glass work as a strain sensing device. The diaphragm 18n is installed at a depth from the surface of the pressure sensing member 81 which is opposite the pressure sensing chamber 18b. The depth is at least greater than the sum of the thicknesses of the pressure sensor 18f and the low-melting glass. In the case where which the processing circuit board 18d and the wires 18e are disposed on the semiconductor chip 18r in the thickness-wise direction thereof, the surface of the diaphragm 18n opposite the pressure sensing chamber 18b is located at a depth greater than a total thickness of the pressure sensor 18f, the processing circuit board 18d, and the wires 18e.

In this embodiment, the pressure sensor 18f of a semiconductor type affixed as the displacement sensing means to the metallic diaphragm 18n is used, but instead, strain gauges made of metallic films may be affixed to or vapor-deposited on the diaphragm 18n.

Referring back to FIG. 8, a coil 61 is wound directly around a resinous spool 62. The coil 61 and the spool 62 are covered at an outer periphery thereof with a resinous mold (not shown). The coil 61 and the spool 62 may be made by winding wire into the coil 61 using a winding machine, coating the outer periphery of the coil 61 with resin using molding techniques, and resin-molding the coil 61 and the spool 62. The coil 61 is connected electrically at ends thereof to the ECU 107 through terminal pins 51a formed in the connector 50 together with terminal pins 51b.

A stationary core 63 is substantially of a cylindrical shape. The stationary core 63 is made up of an inner peripheral core portion, an outer peripheral core portion, and an upper end connecting the inner and outer peripheral core portions together. The coil 61 is retained between the inner and outer peripheral core portions. The stationary core is made of a magnetic material.

The valve armature 42 is disposed beneath the lower portion of the stationary core 63, as viewed in FIG. 8, and faces the stationary core 63. Specifically, the valve armature 42 has an upper end surface serving as a pole face which is movable to or away from a lower end surface (i.e., a pole face) of the stationary core 63. When the coil 61 is energized, it will cause a magnetic flux to flow from pole faces of the inner and outer peripheral core portions of the stationary core 63 to the pole face of the valve armature 42 to create a magnetic attraction depending upon the magnetic flux density which acts on the valve armature 42.

A substantially cylindrical stopper 64 is disposed inside the stationary core 63 and held firmly between the stationary core 63 and an upper housing 53. An urging member 59 such as a compression spring is disposed in the stopper 64. The pressure, as produced by the urging member 59, acts on the valve armature 42 to bring the valve armature 42 away from the stationary core 63 so as to increase an air gap between the pole faces thereof. The stopper 64 has an armature-side end surface to limit the amount of lift of the valve armature 42 when lifted up.

The stopper 64 and the upper body 52 have formed therein a fuel path 37 from which the fuel flowing out of the valve chamber 17c and a through hole 17b is discharged to the low-pressure side.

The upper body 52 (i.e., an upper housing), an intermediate housing 54, and the valve body 17 (i.e., a lower housing) serve as a valve housing. The intermediate housing 54 is substantially cylindrical and retains the stationary core 63 therein so as to guide it. Specifically, the stationary core 63 is cylindrical in shape and has steps and a bottom. The stationary core 63 is disposed within an inner peripheral side of a lower portion of the intermediate housing 54. The outer periphery of the stationary core 63 decreases in diameter downward from the step thereof. The step engages the step formed on the inner periphery of the intermediate housing 54 to avoid the falling out of the intermediate housing 54 from the stationary core 63.

The valve armature 42 is made up of a substantially flat plate-shaped flat plate portion and a small-diameter shaft portion which is smaller in diameter then the flat plate portion. The upper end surface of the flat plate portion has the pole face opposed to the pole faces of the inner and outer peripheral core portions of the stationary core 63. The valve armature 42 is made of a magnetic material such as permendur. The plate portion has the small-diameter shaft portion formed on a lower portion side thereof.

The valve armature 42 has a substantially ball-shaped valve member 41 on the end surface 42a of the small-diameter shaft portion. The valve armature 42 is to be seated on the valve seat 16d of the orifice member 16 through the valve member 41. The orifice member 16 is positioned by and secured to the lower body 11 through the positioning member 92 such as a pin. The positioning member 92 is inserted into the hole 16p of the orifice member 16 and passes through the hole 18p of the pressure sensing member 81.

The valve structures of the valve armature 42 to be seated on or away from the valve member 41 and the orifice member 16 equipped with the valve seat 16d will also be described below using FIG. 9.

Figure 9:
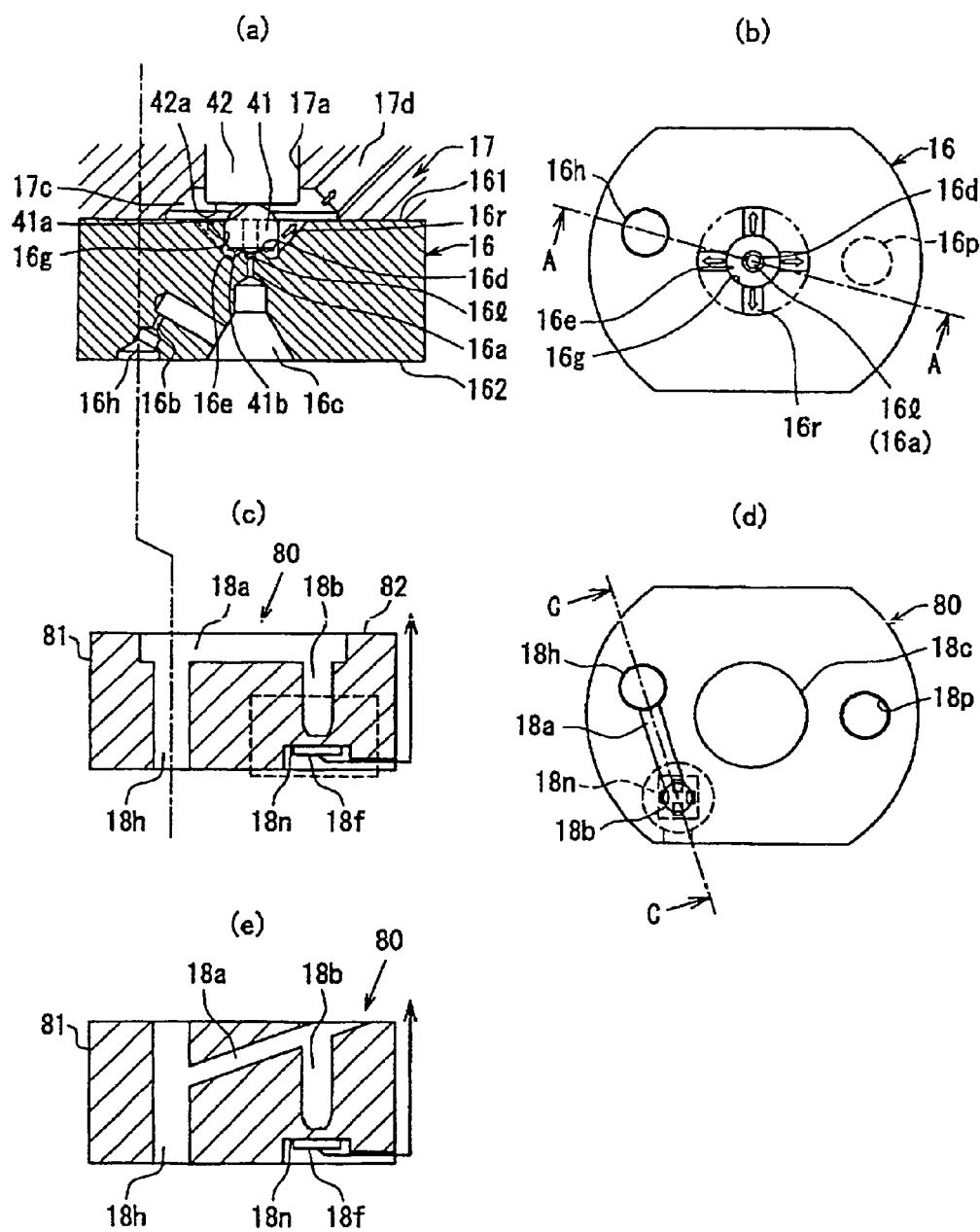
FIG. 9(a) is a sectional view of an orifice member in the sixth embodiment.
FIG. 9(b) is a plan view of FIG. 9(a)
FIG. 9(c) is a sectional view of a pressure sensing member according to the sixth embodiment.
FIG. 9(d) is a plan view of FIG. 9(c)
FIG. 9(e) is a sectional view of a modification of a pressure sensing member of FIG. 9(c)

The end surface 42a of the small-diameter shaft portion of the valve armature 42 is, as illustrated in FIG. 9, flat and placed to be movable into abutment with or away from a spherical portion 41a of the valve member 41. The small-diameter portion of the valve armature 42 is retained by the inner periphery of the through hole 17a of the valve body 17 to be slidable in the axial direction and to be insertable into the valve chamber 17c. The valve armature 42 is seated on or lifted up from the valve seat 16d through the valve member 41, thereby blocking or establishing the flow of fuel from the hydraulic pressure control chambers 8 and 16c to the valve chamber 17c.

Specifically, the valve member 41 is made of a spherical body with a flat face 41b. The flat face 41b is to be seated on or lifted away from the valve seat 16b. When the flat face 41b is seat on the valve seat 16, it closes the outer orifice 16a. The flat face 41b forms the second flat surface.

The orifice member 16 has a bottomed guide hole 16g formed in the valve armature-side end surface 161 to guide slidable movement of the spherical portion 41a of the valve member 41. The valve seat 16d is so formed on the bottom of the inner periphery of the guide hole 16g as to have flat seat surface. The valve seat 16d constitutes a seat portion. The guide hole 16g constitutes a guide portion. The valve seat 16d defines a step portion formed in the orifice member 16. The end of an opening of the guide hole 16b lies flush with the end surface 161 of the orifice member 16.

The outer periphery of the valve seat 16d is smaller in size than the inner periphery of the guide hole 16g. An annular fuel release path 16e is formed between the valve seat 16d and the guide hole 16g. The outer circumference of the valve seat 16d is smaller than that of the flat face 41b of the valve member 41, so that when the flat face 41d is seated on or away from the valve seat 16d, a portion of the bottom of the guide hole 16g other than the valve seat 16d on which the flat face 41b is to be seated does not limit the flow of the fuel.

The fuel release path 16e defines a fluid release path in an area where the valve seat is in close contact with the second flat surface.

The fuel release path 16e is so shaped as to increase in sectional area thereof from the valve seat 16d side to the guide hole 16g side, thereby achieving a smooth flow of the fuel, as emerging from the valve seat 16d when the valve member 41 is lifted away from the valve seat 16d, to the low-pressure side.

The valve member 41 is, as described above, retained by the guide hole 16g to be slidable in the axial direction. The size of a clearance between the inner periphery of the guide hole 16g and the spherical portion 41a of the valve member 41 is, therefore, selected as a guide clearance which permits the sliding motion of the valve member 41. The amount of fuel leaking from the guide clearance is insufficient as the flow rate of fuel flowing from the valve seat 16d to the low-pressure side.

In this embodiment, the guide hole 16g has formed in the inner peripheral wall thereof fuel leakage grooves 16r leading to the valve chamber 17c on the low-pressure side. The fuel leakage grooves 16r serve to increase a sectional area of a flow path through which the fuel flows from the valve seat 16d to the low-pressure side. Specifically, the fuel leakage grooves 16r are formed in the inner wall of the guide hole 16g to increase the sectional area of the flow path through which the fuel flows from the valve seat 16d to the low-pressure side, thereby ensuring the flow rate of fuel to flow into the communication paths 16a, 16b, and 16c without decreasing the flow rate of fuel flowing from the valve seat 16d to the low-pressure side when the valve member 41 is lifted away from the valve seat 16d.

The fuel leakage grooves 16r are so formed in the inner wall of the guide hole 16g as to extend radially from the valve seat 16d (which is not shown), thereby permitting the plurality (six in this embodiment) of the leakage grooves 16r to be provided depending upon the flow rate of fuel to flow out of the communication paths 16a, 16b, and 16c. The radial extension of the leakage grooves 16r avoids the instability of orientation of the valve member 41 arising from fluid pressure of the fuel flowing from the valve seat 16d to the fuel leakage grooves 16r.

The inner periphery of the valve seat 16d has the step. The outlet side inner periphery 16l, the outer orifice 16a, and the pressure control chamber 16c are formed in that order.

The valve armature 42 constitutes a supporting member. The orifice member 16 constitutes the valve body with the valve seat. The valve body 17 constitutes the valve housing.

The operation of the fuel injector 2 having the above structure will be described below. The high-pressure fuel is supplied from the common rail 104 as a high-pressure source to the fuel sump 12c through the high-pressure fuel pipe, the fuel supply path 11b, and the fuel feeding path 12d. The high-pressure fuel is also supplied to the hydraulic pressure control chambers 8 and 16c through the fuel supply path 11b and the inner orifice 16b.

When the coil 61 is in a deenergized state, the valve armature 42 and the valve member 41 are urged by the urging member 59 into abutment with the valve seat 16d (downward in FIG. 8), so that the valve member 41 is seated on the valve seat 16d. This closes the outer orifice 16a to block the flow of fuel from the hydraulic pressure control chambers 8 and 16c to the valve chamber 17c and the low pressure path 17d.

The pressure of fuel in the hydraulic pressure control chambers 8 and 16c (i.e., the back pressure) is kept at the same level as in the common rail 104. The sum of the operating force (which will also be referred to as a first operating force below) that is the back pressure, as accumulated in the hydraulic pressure control chambers 8 and 16c, urging the nozzle needle 20 through the control piston 30 in the spray hole-closing direction and the operating force (which will also be referred to as a second operating force below), as produced by the spring 35, urging the nozzle needle 20 in the spray hole-closing direction is, thus, kept greater than the operating force (which will also be referred to as a third operating force below), as produced by the common rail pressure in the fuel sump 12c and around the valve seat 12a, urging the nozzle needle 20 in the spray hole-opening direction. This causes the nozzle needle 20 to be placed on the valve seat 12a and closes the spray hole 12b not to produce a jet of fuel from the spray holes 12b. The pressure of fuel (back pressure) in the closed outer orifice 16a (i.e., an outlet side inner periphery 16l) is exerted on the valve member 41 seated on the valve seat 16d.

When the coil 61 is energized (i.e., when the fuel injector 2 is opened), it will cause the coil 61 to produce a magnetic force so that a magnetic attraction is created between the pole faces of the stationary core 63 and the valve armature 42, thereby attracting the valve armature 42 toward the stationary core 63. The operating force (which will also be referred to as a fourth operating force below), as produced by the back pressure in the outer orifice 16a is exerted on the valve member 41 to lift the valve member 41 away from the valve seat 16d. The valve member 41 is lifted away from the valve seat 16d along with the valve armature 42, thus causing the valve member 41 to move along the guide hole 16g toward the stationary core 63.

When the valve member 41 is lifted away from the valve seat 16d along with the valve armature 42, it creates the flow of fuel from the hydraulic pressure control chambers 8 and 16c to the valve chamber 17c and to the low-pressure path 17d through the outer orifice 16a, so that the fuel in the hydraulic pressure control chambers 8 and 16c is released to the low-pressure side. This causes the back pressure, as produced by the hydraulic pressure control chambers 8 and 16c, to drop, so that the first operating force decreases gradually. When the third operating force urging the nozzle needle in the spray hole-opening direction exceeds the sum of the first and second operating forces urging the nozzle needle 20 in the spray hole-closing direction, it will cause the nozzle needle 20 to be lifted up from the valve seat 12a (i.e., upward, as viewed in FIG. 8) to open the spray hole 12b, so that the fuel is sprayed from the spray hole 12b.

When the coil 61 is deenergized (i.e., when the injector 2 is closed), it will cause the magnetic force to disappear from the coil 61, so that the valve armature 42 and the valve member 41 are pushed by the urging member 59 to the valve seat 16d. When the flat face 41b of the valve member 41 is seated on the valve seat 16d, it blocks the flow of fuel from the hydraulic pressure control chambers 8 and 16c to the valve chamber 17c and the low-pressure path 17d. This results in a rise in the back pressure in the hydraulic pressure control chambers 8 and 16c. When the first and second operating forces exceeds the third operating force, it will cause the nozzle needle 20 to start to move downward, as viewed in FIG. 8. When the nozzle needle 20 is seated on the valve seat 12a, it terminates the fuel spraying.

The above described structure of the embodiment enables the pressure sensing portion to be disposed inside itself and possesses the following advantages.

The diaphragm 18n made by the thin wall is disposed in the branch path which diverges from the fuel supply path 11b. This facilitates the ease of formation of the diaphragm 18n as compared with when the diaphragm 18n is made directly in a portion of an outer wall of the fuel injector near the fuel flow path, thus resulting the ease of controlling the thickness of the diaphragm 18n to avoid a variation in the thickness and increase in accuracy in measuring the pressure of fuel in the fuel.

The diaphragm 18n is made by a thinnest portion of the branch path, thus resulting in an increase in deformation thereof arising from a change in pressure of the fuel.

The pressure sensing member 81 which is formed to be separate from the injector body (i.e., the lower body 11 and the valve body 17) has the diaphragm 18n, the hole, or the groove, thus facilitating the ease of machining the diaphragm 18n. This also results in ease of controlling the thickness of the diaphragm 18n to improve the accuracy in measuring the pressure of fuel.

The pressure sensing member 81 including the diaphragm 18n is stacked on the orifice member 16 constituting the part of the pressure control chambers 8c and 16c, thereby avoiding an increase in diameter or radial size of the injector body.

The pressure sensing member 81 is made of a plate extending perpendicular to the axial direction of the injector body, thus avoiding an increase in dimension in the radial direction or thickness-wise direction of the injector body when the pressure sensing portion is installed inside the injector body.

The branch path diverges from the path extending from the fuel supply path 11b to the pressure control chambers 8 and 16c, thus eliminating the need for a special tributary for connecting the branch path to the fuel supply path 11b, which avoids an increase in dimension in the radial direction or thickness-wise direction of the injector body when the pressure sensing portion is installed inside the injector body.

The diaphragm 18n is located at a depth that is at least greater than the thickness of the strain sensing device below the surface of the pressure sensing member 81, thereby avoiding the exertion of the stress on the strain sensing device when the pressure sensing member 81 is assembled in the injector body, which enables the pressure sensing portion to be disposed in the injector body.

The injector body has formed therein the wire path, thus facilitating ease of layout of the wires. The connector 50 has installed therein the terminal pins 51a into which the signal to the coil 61 of the solenoid-operated valve device 7 (actuator) is inputted and the terminal pin 51b from which the signal from the pressure sensor 18f (displacement sensing means) is outputted, thus permitting steps for connecting with the external to be performed simultaneously.

Seventh Embodiment

Figure 12:
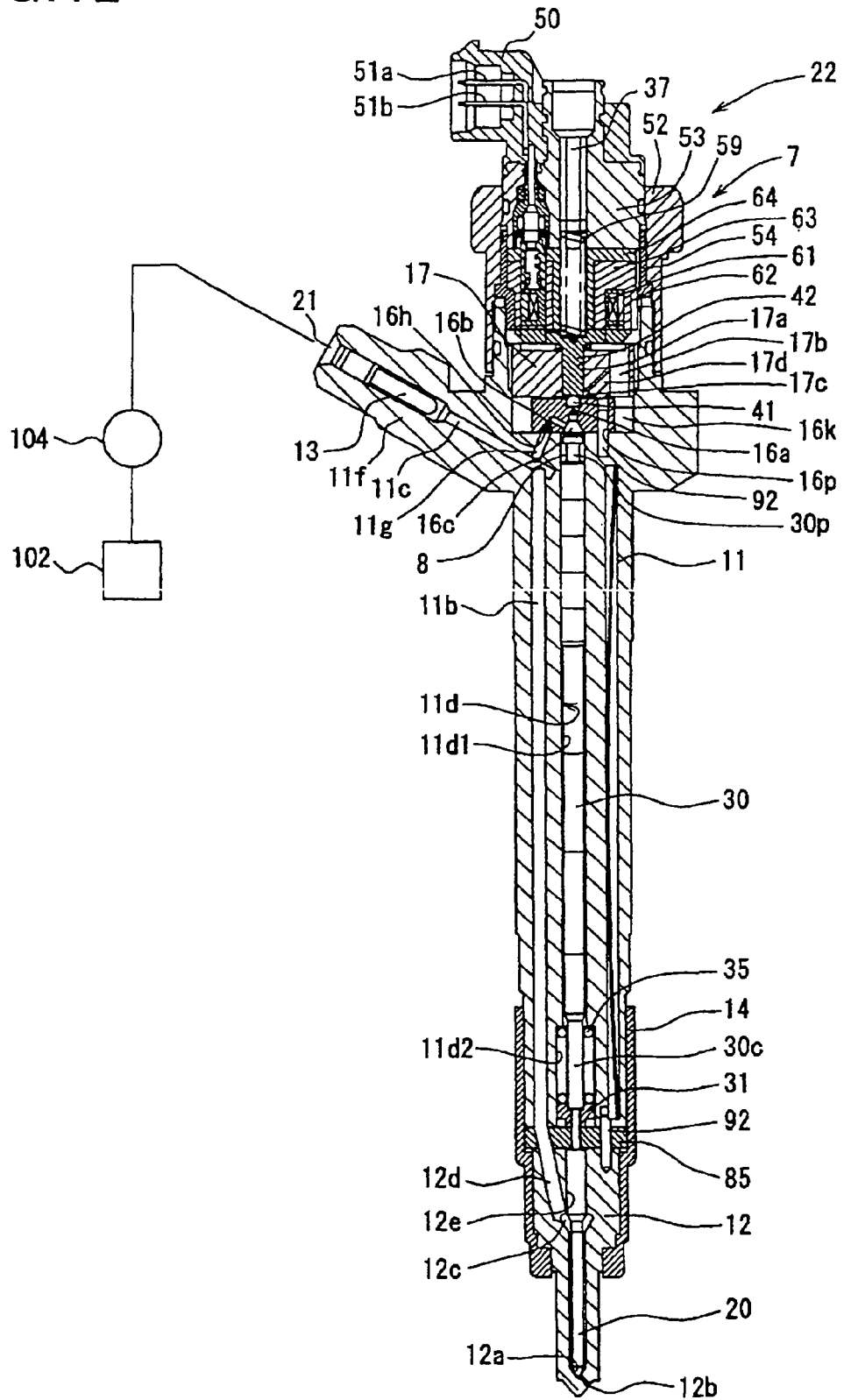
FIG. 12 is a sectional view of an injector for a fuel injection device according to the seventh embodiment.
Figure 13:
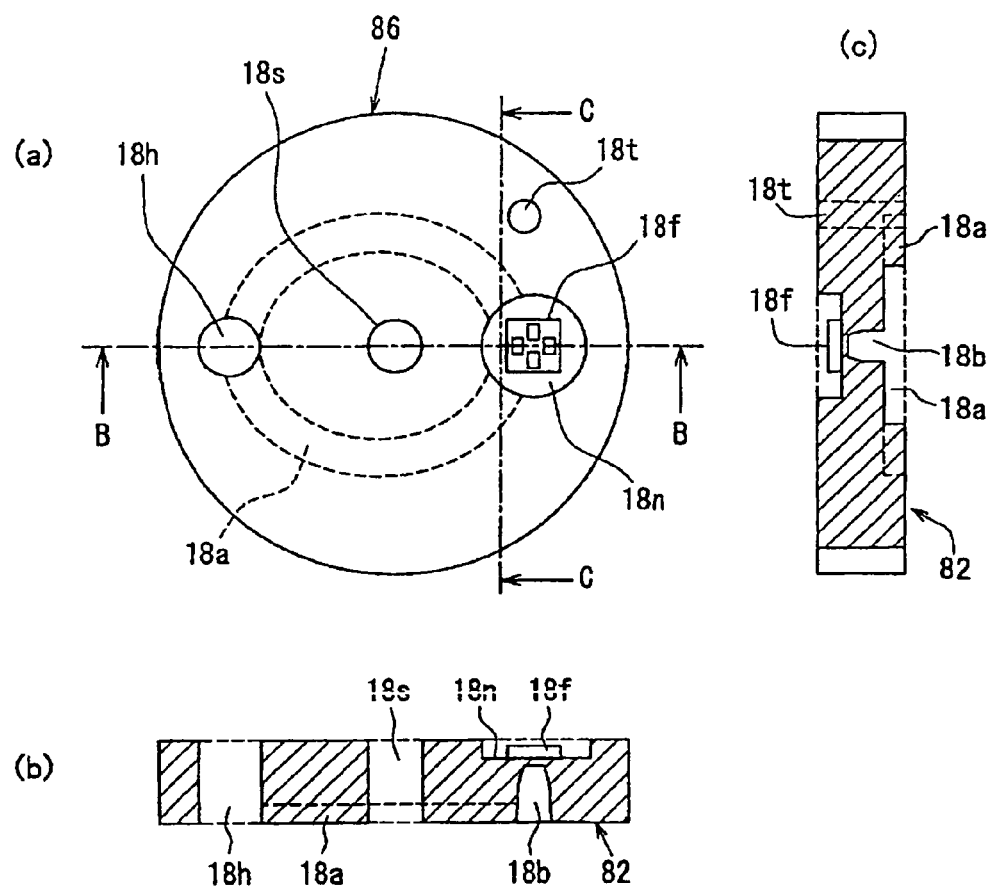
FIG. 13(a) is a plan view of a pressure sensing member of the seventh embodiment.
FIG. 13(b) is a B-B sectional view of FIG. 13(a)
FIG. 13(c) is a C-C sectional view of FIG. 13(a)

FIG. 12 is a sectional view which shows an injector 22 according to the seventh embodiment of the invention. FIGS. 13(a) to 13(c) are partial sectional and plane views which illustrate highlights of the pressure sensing member. The fuel injection device of this embodiment will be described below with reference to the drawings. The same reference numbers are attached to the same or similar parts as in the sixth embodiment, and explanation thereof in detail will be omitted here.

The seventh embodiment is equipped with the pressure sensing portion 85 instead of the pressure sensing portion 80 used in the sixth embodiment.

The injector 22, as can be seen in FIG. 12, includes the nozzle body 12 in which the nozzle needle 20 is disposed to be moveable in the axial direction, the lower body 11 in which the spring 35 working as an urging member to urge the nozzle needle 20 in the valve-closing direction, the pressure sensing portion 85 nipped between the nozzle body 12 and the lower body 11, the retaining nut 14 working as a fastening member to fasten the nozzle body 12 and the pressure sensing portion 85 together with a given degree of fastening force, and the solenoid-operated valve device 7 working as a fluid control valve.

The inlet 16h of the orifice member 16 is disposed at a location which establishes communication between the pressure control chamber 16c and the fuel supply branch path 11g diverging from the fuel supply path 11b. The pressure control chambers 8c and 16c of the orifice member 16 constitute a pressure control chamber.

The pressure sensor 85, as illustrated in FIGS. 13(a) to 13(c), preferably includes a pressure sensing member 86 made of a metallic disc plate (i.e., a second plate member) which extends substantially perpendicular to the axial direction of the fuel injector 2, i.e., the length of the control piston 30 (and the nozzle needle 20) and is nipped between the nozzle body 12 and the lower body 11. In this embodiment, the pressure sensing member 86 has an even or flat surface 82 placed in direct abutment with a flat surface of the nozzle body 12 in a liquid-tight fashion. The pressure sensing member 86 is substantially of a circular shape which is identical in contour with the nozzle body 12 side end surface of the lower body 11. The pressure sensing member 86 is so designed that the fuel supply path 11b of the lower body 11, the tip of the needle 30c of the control piston 30, and a inserted portion of a positioning pin 92b coincide with a sensing portion communication path 18h, a through hole 18s, and a positioning through hole 18t. The sensing portion communication path 18h communicates at a lower body-far side thereof with the fuel feeding path 12d in the nozzle body 12. The sensing portion communication path 18h of the pressure sensing portion 86 forms a portion of a path extending from the fuel supply path 11b to the fuel feeding path 12d.

Figure 11:
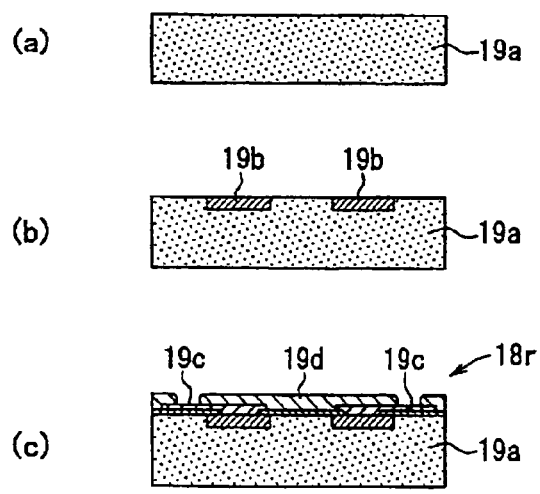
FIGS. 11(a)-11(c) are a sectional views which show a production method of a fuel pressure sensor in the sixth embodiment.

The pressure sensing member 86 has a pressure sensing chamber 18b defined by a groove which has a given depth from the nozzle body 12-side and an inner diameter. The bottom of the groove defines the diaphragm 18n. A semiconductor pressure sensor 18f, as described in FIGS. 10 and 11, is attached to the surface of the diaphragm 18n. The diaphragm 18n is located at a depth that is at least greater than the thickness of the pressure sensing device 18b below the surface of the pressure sensing member 86 which is opposite the surface in which the pressure sensing chamber 18 is formed. The surface to which the pressure sensing device 18f is affixed is greater in area or diameter than the pressure sensing chamber 18b. The thickness of the diaphragm 18n is controlled by controlling depths of both the grooves located on both sides of the diaphragm 18n during the production process. The pressure sensing member 86 also has grooves 18a (branch paths below) formed in the flat surface 82 to have a depth smaller than the pressure sensing chamber 18b. The grooves 18a communicate between the sensing portion communication path 18h and the pressure sensing chamber 18b. In this embodiment, the grooves 18a (preferably, two grooves 18a) are formed on right and left sides of a portion into which the top of the needle 30c of the control piston 30 is inserted, thereby ensuring the efficiency in feeding the fuel from the fuel supply path 11b to the pressure sensing chamber 18b.

Like in the sixth embodiment, the pressure sensor 18f including the piezoresistors and a low-melting point glass constitutes a strain sensing device. The diaphragm 18n is located below the surface of the pressure sensing member 86 which is opposite the pressure sensing chamber 18b at a depth that is at least greater than the sum of thicknesses of the pressure sensing device 18f and the low-melting glass. In the case where the processing substrate 18d and the wires 18e are disposed in the thickness-wise direction, the pressure sensing chamber 18b-opposite surface of the diaphragm 18n is located at a depth greater than a total thickness of the pressure sensing device 18f, the low-melting glass, the processing substrate 18d, and the wires 18e.

This embodiment has the same advantages as in the sixth embodiment. Particularly, the seventh embodiment offers the following additional advantages.

The diaphragm 18n and the holes or the grooves 18a are provided in the pressure sensing member 86 which is separate from the injector body, thus facilitating the ease of formation of the diaphragm 18n. This results in the ease of controlling the thickness of the diaphragm 18n and improvement in measuring the pressure of fuel. The pressure sensing member 86 is stacked between the lower body 11 and the nozzle body 12, thus avoiding an increase in dimension of the injector body in the radius direction thereof. It is possible to measure the pressure of high-pressure fuel near the nozzle body 12, thus resulting in a decrease in time lag in measuring a change in pressure of fuel sprayed actually.

The branch path is provided in the metallic pressure sensing member 86 stacked between the lower body 11 and the nozzle body 12, thus eliminating the need for a special tributary for connecting the branch path to the fuel supply path 11b and the fuel feeding path 12d, which avoids an increase in dimension in the radial direction or thickness-wise direction of the injector body when the pressure sensing portion 85 is installed inside the injector body.

The diaphragm 18n is located at a depth that is at least greater than the thickness of the strain sensing device below the surface of the pressure sensing member 86, thereby avoiding the exertion of the stress on the strain sensing device when the pressure sensing member 86 is assembled in the injector body, which facilitates the installation of the pressure sensing portion in the injector body.

Eighth Embodiment

Figure 14:
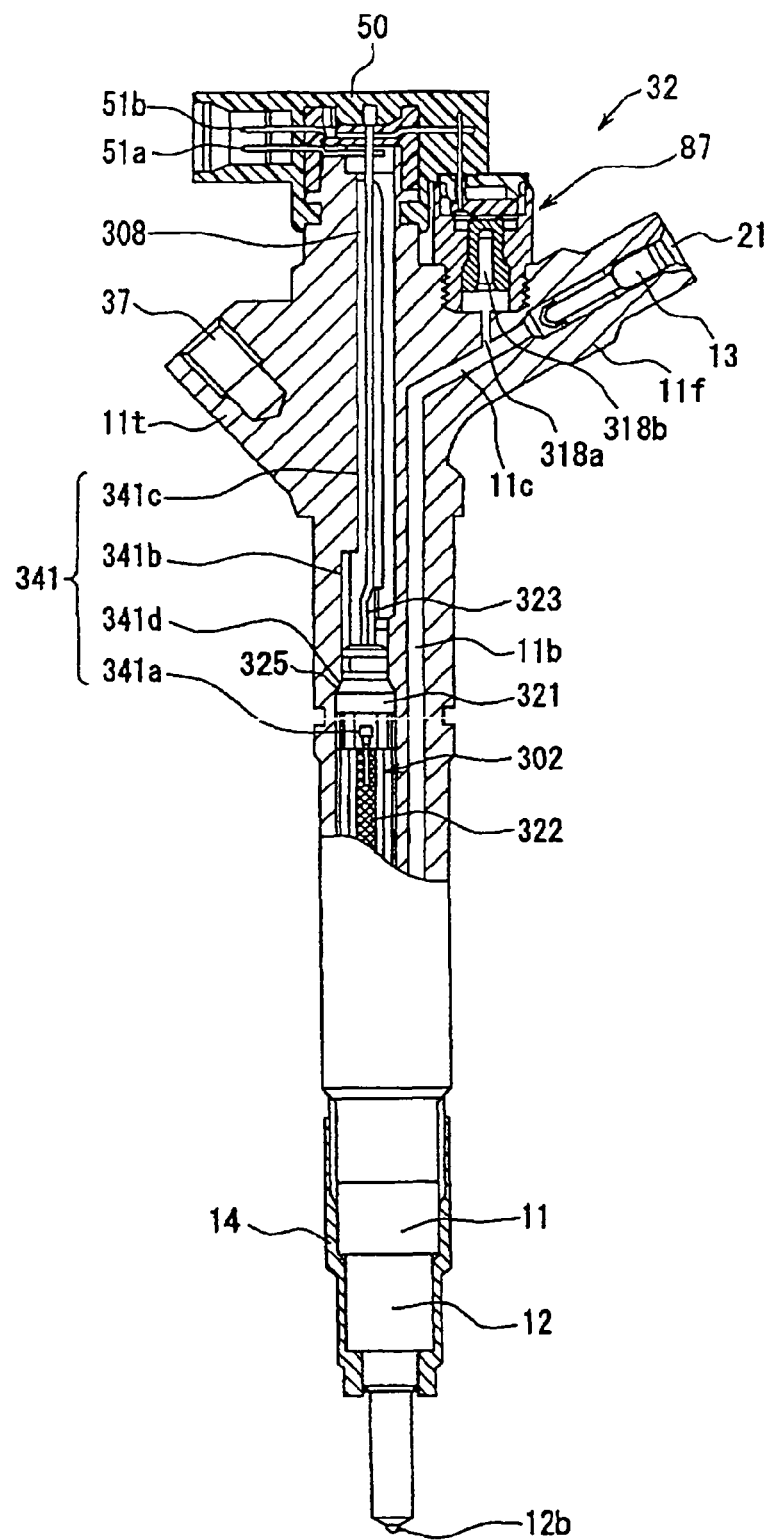
FIG. 14 is a sectional view of an injector for a fuel injection device according to the eighth embodiment.
Figure 15:
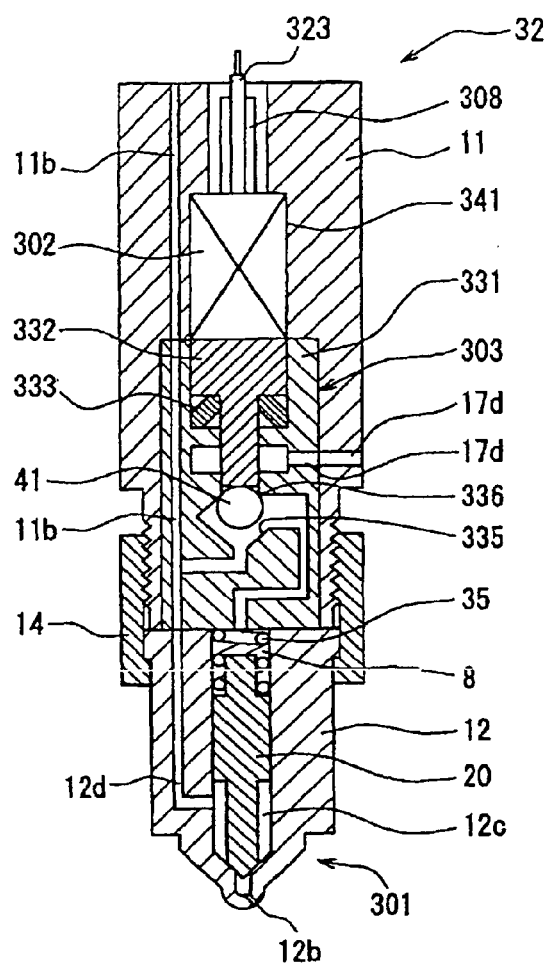
FIG. 15 is a sectional view of an injector for a fuel injection device according to the eighth embodiment.
Figure 16:
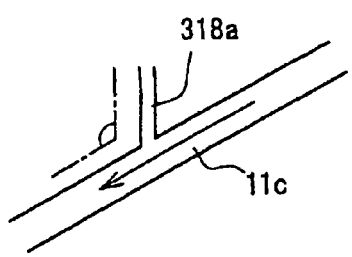
FIG. 16(a) is a schematic view to explain a structure of installation of a branch path according to the eighth embodiment.
FIG. 16(b) is a schematic view showing a comparative example.
Figure 16:
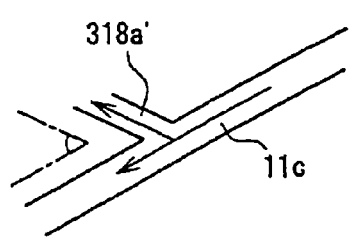
Figure 17:
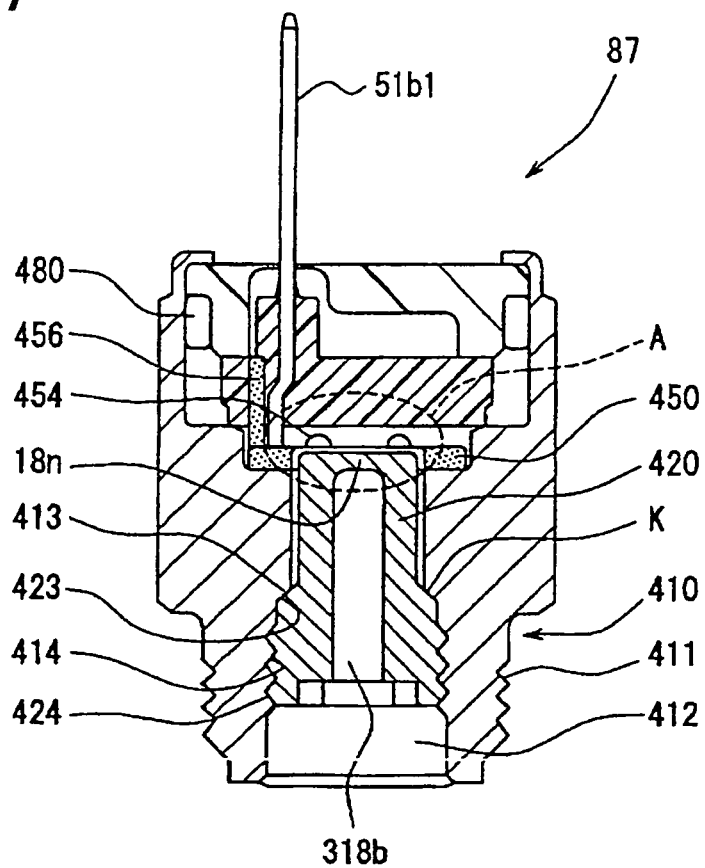
FIG. 17 is an enlarged view of a coupling according to the eighth embodiment.
Figure 18:
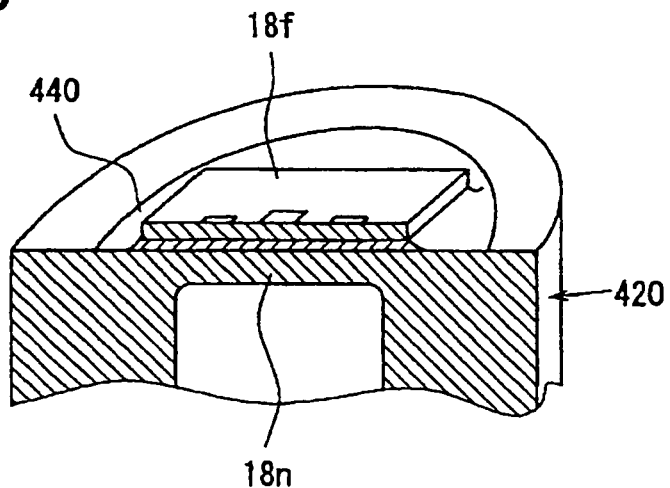
FIG. 18 is a partial sectional view of a diaphragm according to the eighth embodiment.
Figure 19:
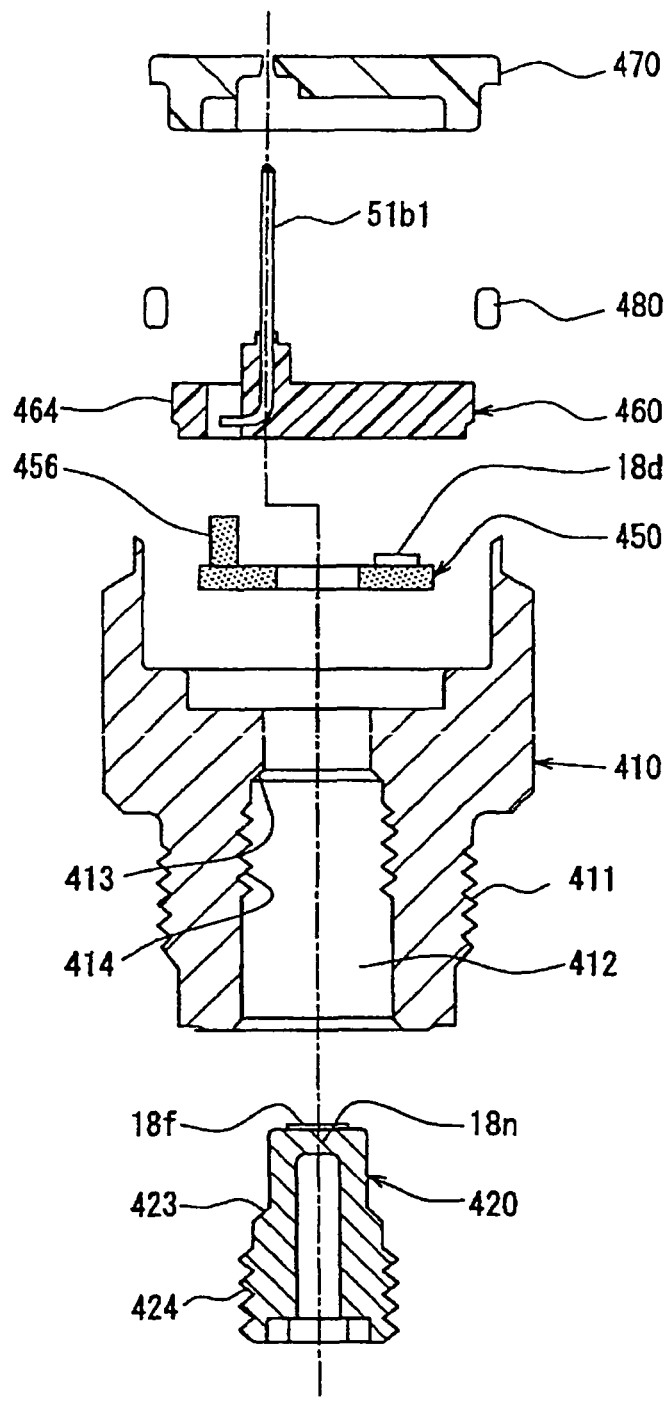
FIG. 19 is a sectional view to explain steps of installing a pressure sensing portion of the eighth embodiment.

The eighth embodiment of the invention will be described below. FIG. 14 is a partial sectional view of an injector for a fuel injection system according to the eighth embodiment of the invention. FIG. 15 is a schematic view which shows an internal structure of the injector of FIG. 14. FIG. 16 is a schematic view for explaining an installation structure for a branch path. FIG. 17 is an enlarged sectional view of a coupling. FIG. 18 is a partial sectional view of a diaphragm. FIG. 19 is a sectional view which shows steps of installing a pressure sensing portion. The same reference numbers are attached to the same or similar parts to those in the sixth or seventh embodiment, and explanation thereof in detail will be omitted here.

The eighth embodiment is different from the sixth embodiment in that the pressure sensing portion 87 is joined threadably to the coupling 11f instead of the pressure sensing portion 80 installed inside the lower body 11 (i.e., the injector body), and a control piston is driven by the piezo-actuator 302 instead of the solenoid-operated valve actuator.

The basic operation and structure of the injector 32 of this embodiment will be described with reference to FIGS. 14 and 15.

The injector 32, like in the sixth embodiment, includes the nozzle body 12 retaining therein the nozzle needle 20 to be movable in an axial direction, the injector body 11 retaining therein the spring 35 working as an urging member to urge the nozzle needle 20 in the valve-closing direction, the retainer (a retaining nut) 14 working as a fastening member to fastening the nozzle body 12 and the injector body 11 through an axial fastening pressure, the piezo-actuator (actuator) 302 constituting the back pressure control mechanism 303, and the pressure sensing portion 87 working to measure the pressure of high-pressure fuel. The nozzle body 12 is fastened to the injector body 11 by the retainer 14 to make a nozzle body of the injector made up of the nozzle body 12, the injector body 11, and the retainer 14. The needle 20 and the nozzle body 12 constitute the nozzle portion 301.

The injector body 11 has installed therein the first coupling 11f (which will be referred to as an inlet below) to which a high-pressure pipe (see FIG. 7) connecting with a branch pipe of the common rail 104 is joined in a liquid-tight fashion, and the second coupling 11t (outlet) which connects with the low-pressure fuel path 106 in a liquid-tight fashion to return the fuel back to the fuel tank 102. The inlet 11f has the fluid induction portion 21 that is an inlet port into which the high-pressure fuel, as supplied from the common rail 104, is introduced, and the fuel induction path 11c (corresponding to the second fluid path (i.e., a high-pressure path) through which the high-pressure fuel, as introduced into the fluid induction portion 21 is directed to the fuel supply path 11b (corresponding to the first fluid path (i.e., a high-pressure path). The bar-filter 13 is installed inside the fuel injection path 11c.

The coupling 11f of the injector body 11 has formed therein the fuel induction path 11c (i.e., the second fluid path) leading to the fuel supply path 11b (i.e., the first fluid path) which extends obliquely to the axial direction of the injector body 11. In terms of ease of installation, it is preferable that the fuel induction path 11c is inclined at 45° to 60° to the axial direction. The first coupling 11f has a branch path 318a which diverges from the fuel induction path 11c and extends substantially parallel to the axial direction of the injector body 11. Specifically, in this embodiment, the branch path 318a, as illustrated in FIG. 16(a), slants at a turned angle of 120° to 135° to a flow of the fuel within the fuel induction path 11c (i.e., an arrow in the drawing), as viewed with reference to the fluid injection path 11c. The branch path 318a extends preferably parallel to the axial direction of the injector body 11, but may be inclined thereto as long as the turned angle is greater than or equal to 90°.

Upon and after the fuel injection, the amount of fuel corresponding to that having been sprayed or discharged from the injector is supplied from the common rail 104 to the fuel induction path 11c. The pressure in the fuel induction path 11c is high, so that in the case, as illustrated in FIG. 16(b), where the branch path 318' is oriented at an angle smaller than 90° toward the direction of flow of the fuel in the fuel induction path 11c, it will cause the high-pressure to be always exerted into the branch path 318a' during the delivery of the fuel into the fuel induction path 11c, thus resulting in a small difference in pressure of the fuel between when the fuel is being sprayed and when the fuel is not sprayed. However, the turned angle greater than or equal to 90° causes the movement of the high-pressure fluid in the fuel induction path 11c during supply of the fuel to create an attraction which is exerted on the high-pressure fuel loaded into the branch path 318a and oriented toward a branch point (i.e., a joint) to the fuel induction path 11c. This also causes an additional attraction to be added to a drop in pressure in the high-pressure fuel in the same direction as such a pressure drop, thus resulting in an increased difference in pressure of the fuel between when the fuel is being sprayed and when the fuel is not being sprayed.

The second coupling 11t of the injector body 11 has a fuel release path (also called a leakage collection path) 37 as a low-pressure fuel path for returning the low-pressure fuel, as discharged from the back pressure control mechanism 303, back to a low-pressure pipe of the fuel tank (see FIG. 7).

The injector 32 is equipped with the nozzle portion 301 which sprays the fuel when being opened, the piezo-actuator 302 which expands or contracts when being charged or discharged, and the back pressure control mechanism 303 which is driven by the piezo-actuator 302 to control the back pressure on the nozzle portion 301.

The piezo-actuator 302 is made of a stainless steel-made cylindrical housing 321 within which a stack of a plurality of piezoelectric devices 322 are disposed. The piezoelectric devices 322 are connected to a power supply not shown through two lead wires 323. The lead wires 323 are retained by a holding member 302 which is higher in rigidity than the lead wires 323.

The holding member 308 is made of resin such as nylon smaller in hardness than metal in order to decrease the wear of a coating of the lead wires 323. The holding member 308 are made to have a shape and a thickness thereof which provide the rigidity higher than the lead wires 323.

Ends of the lead wires 323 extend so as to protrude partially from an upper end of the injector body 11 which is on the nozzle-opposite end side, that is, above the coupling 11f. The connector housing 50 with which the terminal pins 51a and 51b are molded integrally is installed in the upper portion of the injector body 11 to connect with the lead wires 323.

The nozzle portion 301 is, as illustrated in FIG. 15, made up of the nozzle body 12 in which the spray hole 11 is formed, the needle 20 which is moved into or out of abutment with a seat of the nozzle body 12 to close or open the spray hole 11, and the spring 35 urging the needle 13 in the valve-closing direction.

Within the valve body 331 of the back-pressure control mechanism 303, the piston 332, the disc spring 333, and the ball valve 334 are disposed. The piston 332 is moved following the stroke of the piezo-actuator 2. The disc spring 333 urges the piston 332 toward the piezo-actuator 302. The ball valve 434 is moved by the piston 332. The valve body 331 is illustrated in FIG. 15 as being made by a one-piece member, but is actually formed by a plurality of blocks.

The cylindrical metallic injector body 11 has the storage hole 341 extending from one end to the other end thereof in the injector axial direction. The piezo-actuator 302 and the back-pressure control mechanism 303 are disposed in the storage hole 341. The cylindrical retainer 14 is threadably connected to the injector body 11 to retain the nozzle portion 301 on the end of the injector body 11.

The nozzle body 12, the injector body 11, and the valve body 331 have formed therein the fuel supply path 11b and the fuel feeding path 12d to which the high-pressure fuel is supplied from the common rail at all the time. The injector body 11 and the valve body 331 have formed therein the low-pressure path 17d which is connected to the fuel tank (see FIG. 7) through the release path (also called a leakage collection path) 37.

The fuel sump (i.e., a high-pressure chamber) 12c is formed between the outer peripheral surface of the needle 20 on the spray hole 12b-side thereof and the inner peripheral surface of the nozzle body 12. The high-pressure chamber 12c is supplied with the high-pressure fuel through the fuel supply path 11b at all the time. The back pressure chamber 8 is formed as a pressure control chamber in the spray hole-far side of the needle 20. The above described spring 35 is disposed in the back pressure chamber 8.

The valve body 331 has the high-pressure seat 335 formed in a path communicating between the fuel supply path 11b in the valve body 331 and the back pressure chamber 8 of the nozzle portion 301. The low-pressure seat 336 is also formed in a path communicating between the low-pressure path 17d in the valve body 331 and the back pressure chamber 8 of the nozzle portion 301. The above described valve 41 is disposed between the high-pressure seat 335 and the low-pressure seat 336.

The storage hole 341 of the injector body 11 is, as illustrated in FIG. 14, made up of three cylindrical storage holes 341a to 341c. The first storage hole 341a opens at one end thereof into the nozzle side end surface of the injector body 11 and extends from the nozzle side end surface of the injector body 11 to the nozzle-far side of the injector body 11. The second storage hole 341b is smaller in diameter than the first storage hole 341a and extends from the nozzle-far side end portion of the first storage hole 341a to the nozzle-far side of the injector body 11. The first storage hole 341a and the second storage hole 341b are disposed coaxially with each other. The third storage hole 341c is disposed eccentrically from the first storage hole 341a and the second storage hole 341b and opens at one end thereof into the nozzle-far side end surface of the injector body 11 and connects at the other end thereof to the second storage hole 341b.

The piezo-actuator 302 is disposed within the first storage hole 341a. The lead wires 323 and the holding member 308 are disposed in the second storage hole 341b and the third storage hole 341c. The tapered seat surface 325 formed on the housing 323 of the piezo-actuator 302 is placed in abutment with the step 341d between the first and second storage holes 341a and 341b to position the piezo-actuator 302 in the injector body 11.

In the above structure, when the piezo-actuator 302 is in the contracted state, the valve 41 is, as illustrated in FIG. 15, placed in contact with the low-pressure seat 336 to communicate the back pressure chamber 8 with the fuel supply path 11b, so that the high-pressure fuel is introduced into the back pressure chamber 8. The fuel pressure in the back pressure chamber 8 and the spring 35 urge the needle 20 in the valve-closing direction to keep the spray hole 12b closed.

When the voltage is applied to the piezo-actuator 302, so that the piezo-actuator 302 is expanded, the valve 41 is brought into contact with the high-pressure seat 335 to communicate the back pressure chamber 8 to the low-pressure path 17d, so that the back pressure chamber 8 will be at a low pressure level. This causes the needle 20 to be urged in the valve-opening direction by the fuel pressure in the high-pressure chamber 12c to open the spray hole 12b, thereby spraying the fuel from the spray hole 12b into the cylinder of the internal combustion engine.

The structure of the pressure sensing portion 87 will be described in detail below with reference to FIGS. 17 to 19. FIG. 17 is a sectional view of the pressure sensing portion 87 of this embodiment. FIG. 18 is an enlarged perspective view of a portion A of the pressure sensing portion 87 (including sensor chips and a metallic stem), as enclosed by a broken line in FIG. 17.

The housing 410 is secured directly to the branch path 318a. The housing 410 has an external thread 411 formed on an outer periphery thereof for such installation. The housing 410 has formed therein a pressure induction path 412 which establishes fluid communication with the branch path 318a when the housing 410 is joined to the fuel induction path 11c, so that the pressure is introduced from the one end side (i.e., a lower side of the drawing).

The housing 410 may be made of carbon steel such as S15C which is high in corrosion-resistance and mechanical strength and plated with Zn for increasing the corrosion-resistance. The housing 410 may alternatively be made of XM7, SUS430, SUS304, or SUS630 which is high in corrosion-resistance.

The metallic stem 420 is made of a metallic hollow cylinder with steps and has a thin-walled end working as the diaphragm 18n and the pressure-sensing chamber 318b which introduces the pressure to the diaphragm 18n. The metallic stem 420 also has a tapered step 423 formed on an axially middle portion of an outer peripheral surface thereof. The other end side (i.e., the pressure sensing chamber 318b side) of the metallic stem 420 is greater in diameter than the one end side (i.e., the diaphragm 18n side) thereof through the step 432.

The pressure induction path 412 of the housing 410 is defined by a stepped inner hole contoured to conform with the outer contour of the metallic stem 424 and has an inner diameter of one end side thereof (i.e., a pressure induction side) as a large-diameter portion. On the inner surface of the pressure induction path 412, the tapered seat surface 413 is formed which corresponds to the step 432 of the metallic stem 420.

The metallic stem 420 also has an external thread 424 formed on the outer peripheral surface of the large-diameter portion thereof. The housing 410 has an internal thread 414 formed on the inner peripheral surface of the pressure induction path 412 which corresponds to the external thread 424. The metallic stem 420 is inserted into the pressure induction path 412 so that the other end side thereof (i.e., the pressure sensing chamber 318b side) may be located on the one end side of the pressure induction path 412. The external thread 424 engages the internal thread 414 to secure the metallic stem 420 to the housing 410.

The step 423 on the outer peripheral surface of the metallic stem 420 is pressed by the axial force produced by the above thread-to-thread engagement against the seat surface 413 formed on the inner surface of the pressure induction path 412 of the housing 410 from the other end side to the one end side of the metallic stem 420, so that it is sealed. This causes the pressure sensing chamber 318b of the metallic stem 420 to communicate with the pressure induction path 412. The step 432 and the seat surface 413 close to each other establishes the seal K, thereby ensuring the hermetic sealing between the communication portions of the pressure sensing chamber 318b and the pressure induction path 412.

The pressure sensor chip 18f is, as illustrated in FIG. 18, glued to an outer surface of the diaphragm 18n of the metallic stem 420 through a low-melting glass 440. The pressure sensor chip 18f is made from single-crystal silicon and works as a strain gauge to measure the deformation of the diaphragm 18n arising from the pressure of fuel transmitted from the pressure-sensing chamber 318b inside the metallic stem 420.

The material of the metallic stem 420 is required to have a mechanical strength high enough to withstand the super-high pressure of fuel and a coefficient of thermal expansion low enough to secure the joint of the Si-made pressure sensor chip 18f thereto using the glass 440. For instance, the metallic stem 420 is made by pressing, cutting, or cold-forging a mixture of main components Fe, Ni, Co or Fe and Ni and precipitation hardened components Ti, Nb, and Al or Ti and Nb.

The diaphragm 18n of the metallic stem 420 protrudes from the other end side of the pressure induction path 412 of the housing 410. The ceramic substrate 450 is bonded to the housing 410 around the outer periphery of the diaphragm 18n. The ceramic substrate 450 has the amplifier IC chip 18d working to amplify an output of the pressure sensor chip 18f and the characteristic adjustment IC chip 18d glued thereto. The characteristic adjustment IC chip 18d is equipped with a non-volatile memory storing therein pressure detection sensitivity data and data on injection characteristics of the fuel injector.

The IC chips 18d are connected electrically to conductors (wires) printed on the ceramic substrate 450 through aluminum wires 454 formed by the wire bonding. A pin 51b1 is joined to the conductor on the substrate 450 through silver solder. The pin 51b1 is connected electrically with the terminal pin 51b.

A connector terminal 460 that is an assembly made up of resin 464 and the pin 51b1 installed in the resin 464 by the insert molding and the substrate 450 are joined together by laser-welding the pin 51b1 to the pin 456 mounted on the substrate 450. The pin 51b1 is retained between the connector 50 and the housing 410. The pin 51b1 is joined to the terminal pin 51b of the connector 50 and to be connected electrically to an automotive ECU etc., through a harness (a wire member) along with the terminal pins 51a for the injector.

The connector holder 470 defines an outer shape of the terminal pins 51b and unified with the housing 410 secured thereto through the O-ring 480 as a package to protect the pressure sensor chip 18f, ICs, electric joints, etc. from moisture or mechanical impact. The connector holder 470 may be made of PPS (polyphenylene sulfide) which is highly hydrolysable.

The assembling of the pressure sensing portion 87 will be described below with reference to FIG. 19. FIG. 19 is a view which shows exploded parts before being assembled in a cross section corresponding to FIG. 17. Basically, the parts are assembled along a dashed line.

First, the metallic stem 420 to which the pressure sensor chip 18f is already bonded through the glass 440 is inserted into the one end side (i.e., a pressure induction side) of the pressure induction path 421 of the housing 410 from the one end side (i.e., the diaphragm 18n side) thereof. The metallic stem 420 is inserted while being rotated around the axis to achieve engagement between the external thread 424 and the internal thread 414.

The step 423 of the metallic stem 420 is placed close to the seat surface 413 of the housing 410 by the axial force, as produced by the thread-to-thread engagement, so that they are sealed hermetically to ensure the hermetic sealing between the communication portions of the pressure sensing chamber 318b of the metallic stem 420 and the pressure induction path 412 of the housing 410.

The ceramic substrate 450 on which the chips 18d and the pin 456 are fabricated is secured using adhesive to a portion of the housing 420 on other end side of the pressure induction path 412. The pressure sensor chip 18f is connected to the conductors on the substrate 450 through the fine wires 454 using the wire bonding technique.

The terminal pin 51b1 is joined to the pin 456 by laser welding (e.g., the YAG laser welding). Next, the connector holder 470 is fitted in the housing 410 through the O-ring 480. The end of the housing 410 is crimped to retain the connector holder 470 within the housing 410 firmly, thereby completing the pressure sensing portion 87, as illustrated in FIG. 17.

The pressure sensing portion 87 is mounted in the coupling 11f of the injector body by engaging the external thread 411 of the housing 410 with an internal thread formed in the coupling 11f. When the pressure of the fuel (i.e. the pressure of fluid) in the branch path 318a of the metallic stem 420 is introduced from the one end side of the pressure induction path 412 and directed from the pressure sensing chamber 318a of the metallic stem 420 inside the metallic stem 420 (i.e., the pressure sensing chamber 318b), it will cause the diaphragm 18n to deform as a function of such pressure.

The degree of deformation of the diaphragm 18n is converted by the pressure sensor chip 18f into an electric signal which is, in turn, processed by a sensor signal processing circuit on the ceramic substrate 450 to measure the pressure. The ECU 107 controls the fuel injection based on the measured pressure (i.e., the pressure of fuel).

The above structure provides the following beneficial effects, like in the sixth embodiment.

The diaphragm 18n made by the thin wall is disposed in the branch path which diverges from the fuel induction path 11c. This facilitates the ease of formation of the diaphragm 18n as compared with when the diaphragm 18n is made directly in a portion of an outer wall of the fuel injector near the fuel flow path, thus resulting the ease of controlling the thickness of the diaphragm 18n and increase in accuracy in measuring the pressure of fuel in the fuel.

The diaphragm 18n is made by the thinnest portion of the branch path, thus resulting in an increase in deformation thereof arising from a change in pressure of the fuel.

The pressure sensing portion 87 which is formed to be separate from the injector body 11 is used. The pressure sensing portion 87 has the diaphragm 18n, the hole, or the groove provided therein, thus facilitating the ease of machining the diaphragm 18n. This also results in ease of controlling the thickness of the diaphragm 18n to improve the accuracy in measuring the pressure of fuel.

The terminal pins 51a into which the signal to the piezo-actuator is inputted and the terminal pin 51b from which the signal from the pressure sensor 18f (displacement sensing means) is outputted are installed in the common connector 50, thus permitting steps for connecting with the external to be performed simultaneously.

Further, this embodiment has connecting means (i.e., thread means made up of the external thread on the housing side and the internal thread on the coupling 11f side) which extend from the outer wall of the coupling 11f to the fuel induction path 11c and corresponds to the housing of the pressure sensing portion 87, thus facilitating the installation of the pressure sensing portion 87 in the injector 32. The thread means also facilitates the ease of replacing the pressure sensing portion 87.

The branch path 318a, as illustrated in FIG. 16(a), slants at a turned angle of 120° to 135° to a flow of the fuel within the fuel induction path 11c (i.e., an arrow in the drawing), as viewed with reference to the fluid injection path 11c. This causes the movement of the high-pressure fluid in the fuel induction path 11c during supply of the fuel to create an attraction which is exerted on the high-pressure fuel loaded into the branch path 318a' and oriented toward a branch point at the fluid path. This also causes an additional attraction to be added to a drop in pressure in the high-pressure fuel in the same direction as such a pressure drop, thus resulting in an increased difference in pressure of the fuel between when the fuel is being sprayed and when the fuel is not being sprayed.

The branch path 318 extends substantially parallel to the axial direction of the injector body 11, thus avoiding the protrusion of the pressure sensing portion 87 in the radius direction of the injector body 11 over the coupling 11f, that is, an increase in dimension in the radius direction.

Ninth Embodiment

Figure 20:
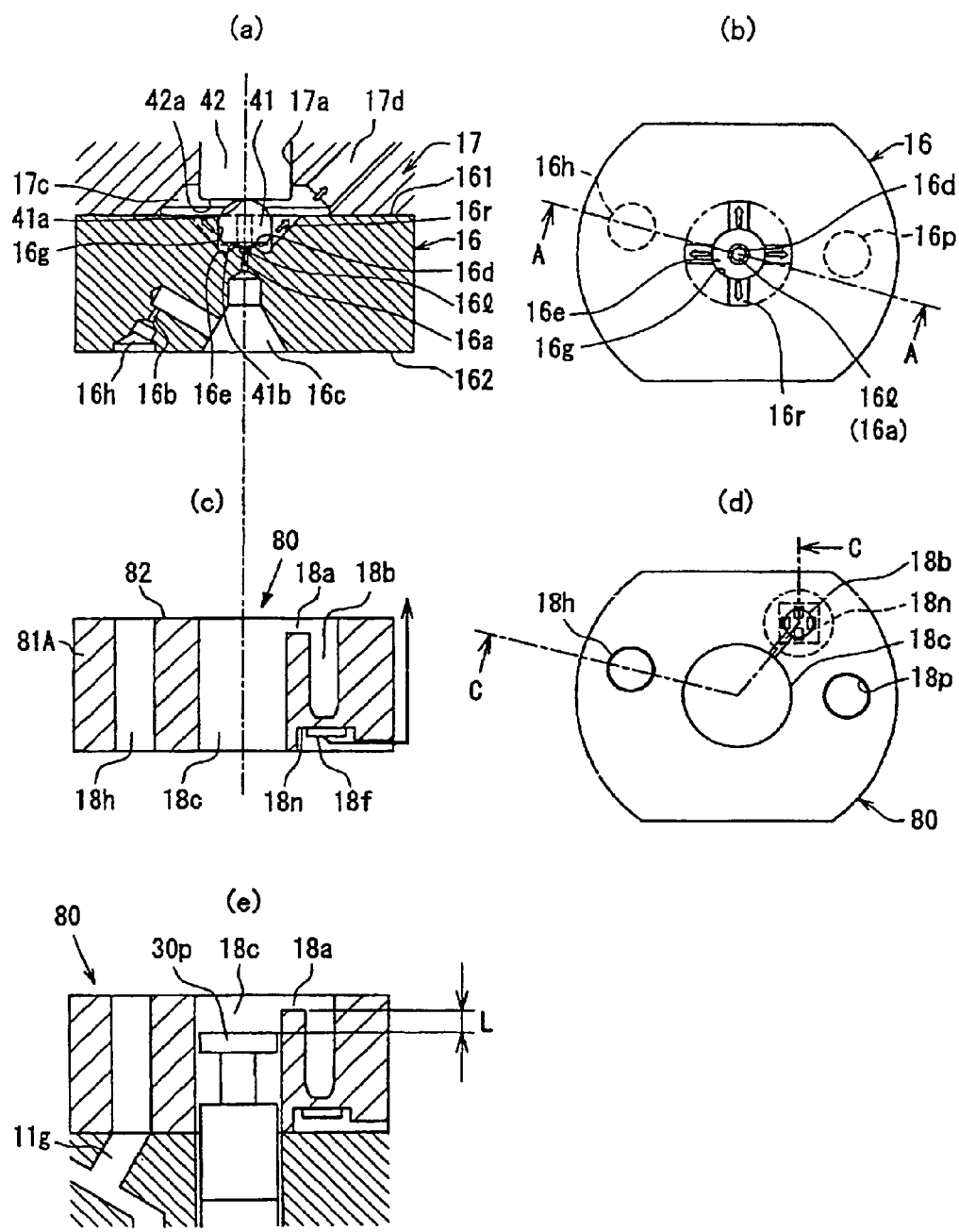
FIG. 20(a) is a partial sectional view which shows highlights of an orifice member according to the ninth embodiment.
FIG. 20(b) is a plan view of FIG. 20(a)
FIG. 20(c) is a partial sectional view which shows highlights of a pressure sensing member of the ninth embodiment.
FIG. 20(d) is a plan view of FIG. 20(c)
FIG. 20(e) is a sectional view which shows a positional relation between a control piston and a pressure sensing member when being installed in an injector body.

The ninth embodiment of the invention will be described below. FIGS. 20(a) and 20(b) are a partial sectional view and a plane view which show highlights of a fluid control valve of this embodiment. FIGS. 20(c) and 20(d) are a partial sectional view and a plane view which show highlights of a pressure sensing member. FIG. 20(e) a sectional view which shows a positional relation between a control piston and the pressure sensing member when being installed in an injector body. The same reference numbers are attached to the same or similar parts to those in the sixth to eighth embodiments, and explanation thereof in detail will be omitted here.

In the ninth embodiment, instead of the pressure sensing member 81 used in the sixth embodiment, the pressure sensing member 81A, as illustrated in FIGS. 20(c) and 20(d), is used. Other arrangements, functions, and beneficial effects including the orifice member 16 of this embodiment, as illustrated in FIGS. 20(a) and 20(b), are the same as those in the sixth embodiment.

The pressure sensing member 81A of this embodiment is, as shown in FIGS. 20(c) and 20(d), made of the pressure sensing member 81A which is separate from the injector body (i.e., the lower body 11 and the valve body 17). The pressure sensing member 81A is preferably made by a metallic plate (second member) disposed substantially perpendicular to the axial direction of the injector 2, that is, the length of the control piston 30 and stacked directly or indirectly on the orifice member 16 in the lower body 11 to be retained integrally with the lower body 11 and the nozzle body 12.

In this embodiment, the pressure sensing member 81A has the flat surface 82 placed in direct surface contact with the flat surface 162 of the orifice member 16 in the liquid-tight fashion. The pressure sensing member 81A and the orifice member 16 are substantially identical in contour thereof and attached to each other so that the inlet 16h, the through hole 16p, and the pressure control chamber 16c of the orifice member 16 may coincide with the sensing portion communication path 18h, the through hole 18p, and the pressure control chamber 18c formed in the pressure sensing member 81, respectively. The orifice member-far side of the sensing portion communication path 18h opens at a location corresponding to the fuel supply branch path 11g diverging from the fuel supply path 11b. The through hole 18h of the pressure sensing member 81 forms a portion of the path from the fuel supply path 11b to the pressure control chambers 16c and 18c.

The pressure sensing member 81A is also equipped with the pressure sensing chamber 18b defined by a groove formed therein which has a given depth from the orifice member 16 side and inner diameter. The bottom of the groove defines the diaphragm 18n. The diaphragm 18n has the semiconductor sensing device 18f, as illustrated in FIG. 10, affixed or glued integrally to the surface thereof opposite the pressure sensing chamber 18b.

The diaphragm 18n is located at a depth that is at least greater than the thickness of the pressure sensor 18f below the surface of the pressure sensing member 81 which is opposite the pressure sensing chamber 18b. The surface of the diaphragm 18n to which the pressure sensor 18f is affixed is greater in diameter than the pressure sensing chamber 18b. The thickness of the diaphragm 18n is determined during the production thereof by controlling the depth of both grooves sandwiching the diaphragm 18n. The pressure sensing member 81 also has the groove 18a (a branch path below) formed in the flat surface 82 to have a depth smaller than the pressure sensing chamber 18b. The groove 18a communicates between the sensing portion communication path 18h and the pressure sensing chamber 18b. When the pressure sensing member 81A is placed in surface abutment with the orifice member 16, the groove 18a defines a combined path (a branch path below) whose wall is a portion of the flat surface of the orifice member 16. This establishes fluid communications of the groove 18a (i.e., the branch path) at a portion thereof with the pressure control chambers 16c and 18c at a location away from the through hole 18h and at another portion thereof with the diaphragm 18n, so that the diaphragm 18n may be deformed by the pressure of high-pressure fuel flowing into the pressure sensing chamber 18b.

The diaphragm 18n is the thinnest in wall thickness among the combined path formed between the groove 18a and the orifice member 16 and the pressure sensing chamber 18b. The thickness of the combined path is expressed by the thickness of the pressure sensing member 81 and the orifice member 16, as viewed from the inner wall of the combined path.

As illustrated in FIG. 20(e), the outer end wall (i.e., an upper end) 30p of the control piston 30, the orifice member 16, and the pressure sensing member 81A define the pressure control chambers 16c and 18c. The outer end wall 30P is so disposed that it lies flush with the lower end of the groove 18a or is located at a distance L away from the lower end of the groove 18a toward the spray hole 12b when the spray hole 12b is opened. Specifically, when the spray hole 12b is opened (i.e., the control piston 30 is lifted up toward the valve member 41), the outer end wall 30p is disposed inside the pressure control chamber 18c of the pressure sensing member 81A.

In the case where the outer end wall 30p of the control piston 30 is located farther from the spray hole 12b than the groove 18a when the spray hole 12b is opened, the control piston 30 may cover the groove 18a. In such an event, it is possible for the pressure sensor to measure a change in pressure in the pressure control chambers 16c and 18c only after the pressure in the pressure control chambers 16c and 18c rises to move the control piston 30 in the valve-closing direction, and the groove 18a is opened. This results in a loss of time required to measure the pressure. However, in this embodiment, the outer end wall 30p is located, as described above, so that the branch path is placed in communication with the pressure control chamber at all the time when the spray hole 12b is opened. Needless to say, the control piston 30 is returned back toward the spray hole side upon the valve opening, the outer end wall 30p will be located closer to the spray hole 12b than the groove 18a by the distance L plus the amount of lift. It is advisable that the outer end wall 30p be disposed inside the pressure control chamber 18c of the pressure sensing member 81A upon the valve closing for avoiding the catch of the outer end wall 30p near a contact surface between the pressure sensing member 81A and the pressure control chamber 18c when passing it.

In the above embodiment, the chamber 16c formed inside the orifice member 16 and the chamber 18c formed inside the pressure sensing member 81A define the pressure control chambers 16c and 18c. In operation, a portion of the high-pressure fuel is supplied to and accumulated in the pressure control chambers 16c and 18c, thereby producing force in the pressure control chambers 16c and 18c which urges the nozzle needle 20 in the valve-closing direction to close the spray hole 12b. This stops the spraying of the fuel. When the high-pressure fuel, as accumulated in the pressure control chambers 16c and 18c, is discharged so that the pressure therein drops, the nozzle needle is opened, thereby initiating the spraying of the fuel from the spray hole. Therefore, the time the internal pressure in the pressure control chambers 16c and 18c changes coincides with that the fuel is sprayed form the spray hole.

Accordingly, in this embodiment, the diaphragm 18n is connected indirectly to the pressure control chambers 16c and 18c through the groove 18a to achieve the measurement of a change in displacement of the diaphragm 18n using the pressure sensor 18f (i.e., displacement sensing means), thereby ensuring the accuracy in measuring the time when the fuel is sprayed actually from the spray hole 12b. For instance, the quantity of fuel having been sprayed actually from each injector in the common rail system may be known by calculating a change in pressure of the high-pressure fuel in the injector body and the time of such a pressure change. In this embodiment, a change in pressure in the pressure control chambers 16c and 18c is measured, thus ensuring the accuracy in measuring the time of the pressure change as well as the degree of the pressure change itself (i.e., an absolute value of the pressure or the amount of the change in pressure) with less time lag.

The pressure sensing body 81A may be, like in the sixth embodiment, made of Kovar that is an Fi—Ni—Co alloy, but is made of a metallic glass material in this embodiment. The metallic glass material is a vitrified amorphous metallic material which has no crystal structure and is low in Young's modulus and thus is useful in improving the sensitivity of measuring the pressure. For instance, a Fe-based metallic glass such as {Fe(Al,Ga)—(P,C,B,Si,Ge)}, an Ni-based metallic glass such as {Ni—(Zr,Hf,Nb)—B}, a Ti-based metallic glass such as {Ti—Zr—Ni—Cu}, or a Zr-based metallic glass such as Zr—Al-TM (TM:VI~VIII group transition metal).

The orifice member 6 is preferably made of a high-hardness material because the high-pressure fuel flows therethrough at high speeds while hitting the valve ball 41 many times. Specifically, the material of the orifice member 16 is preferably higher in hardness than that of the pressure sensing member 81A.

In this embodiment, the groove 18a is formed at a location in the inner wall of the pressure control chambers 16c and 18c which is different (i.e., away) from that of the inner orifice 16b and the outer orifice 16a. In other words, the groove 18a is formed on the pressure sensing member 81A side away from a high-pressure fuel flow path extending from the inner orifice 16b to the outer orifice 16a. The flow of the high-pressure fuel within the inner orifice 16b and the outer orifice 16a or near openings thereof is high in speed, thus resulting in a time lag until a change in pressure is in the steady state.

Instead of the groove 18a of FIG. 20(c), a hole (not shown), like in the modification illustrated in FIG. 9(e), may be formed which is so inclined as to extend from the pressure control chamber 18c of the pressure sensing member 81A to the pressure sensing chamber 18b.

The above structure of the embodiment enables the pressure sensing portion to be disposed inside the injector and posses the following beneficial effects, like in the sixth embodiment.

The diaphragm 18n made of a thin wall is provided in the branch path diverging from the fuel supply path 11b, thus facilitating the ease of formation of the diaphragm 18n as compared with when the diaphragm 18n is made directly in any portion of an injector outer wall near a fuel flow path extending therein. This results in ease of controlling the thickness of the diaphragm 18n and an increase in accuracy in measuring the pressure.

The diaphragm 18n is made by a thinnest portion of the branch path, thus resulting in an increase in deformation thereof arising from a change in the pressure.

The pressure sensing body 81A which is separate from the injector body (i.e., the lower body 11 and the valve body 17) has the diaphragms 18n, the holes, or the groove, thus facilitating the ease of machining the diaphragm 18n. This results in ease of controlling the thickness of the diaphragm 18n to improve the accuracy in measuring the pressure of fuel.

The pressure sensing member 81A including the diaphragm 18n is stacked on the orifice member 16 constituting the part of the pressure control chambers 8c and 16c, thereby avoiding an increase in diameter or radial size of the injector body.

The pressure sensing member 81A is made of a plate extending perpendicular to the axial direction of the injector body, thus avoiding an increase in dimension in the radial direction or thickness-wise direction of the injector body when the pressure sensing portion is installed inside the injector body.

The branch path diverges from the path extending from the fuel supply path 11b to the pressure control chambers 16c and 18c, thus eliminating the need for a special tributary for connecting the branch path to the fuel supply path 11b, which avoids an increase in dimension in the radial direction or thickness-wise direction of the injector body when the pressure sensing portion is installed inside the injector body.

The diaphragm 18n is located at a depth that is at least greater than the thickness of the strain sensing device below the surface of the pressure sensing member 81A, thereby avoiding the exertion of the stress on the strain sensing device when the pressure sensing member 81A is assembled in the injector body, which enables the pressure sensing portion to be disposed in the injector body.

The injector body has formed therein the wire path, thus facilitating ease of layout of the wires. The connector 50 has installed therein the terminal pins 51a into which the signal to the coil 61 of the solenoid-operated valve device 7 (actuator) is inputted and the terminal pin 51b from which the signal from the pressure sensor 18f (displacement sensing means) is outputted, thus permitting steps for connecting with the external to be performed simultaneously.

Tenth Embodiment

Figure 21:
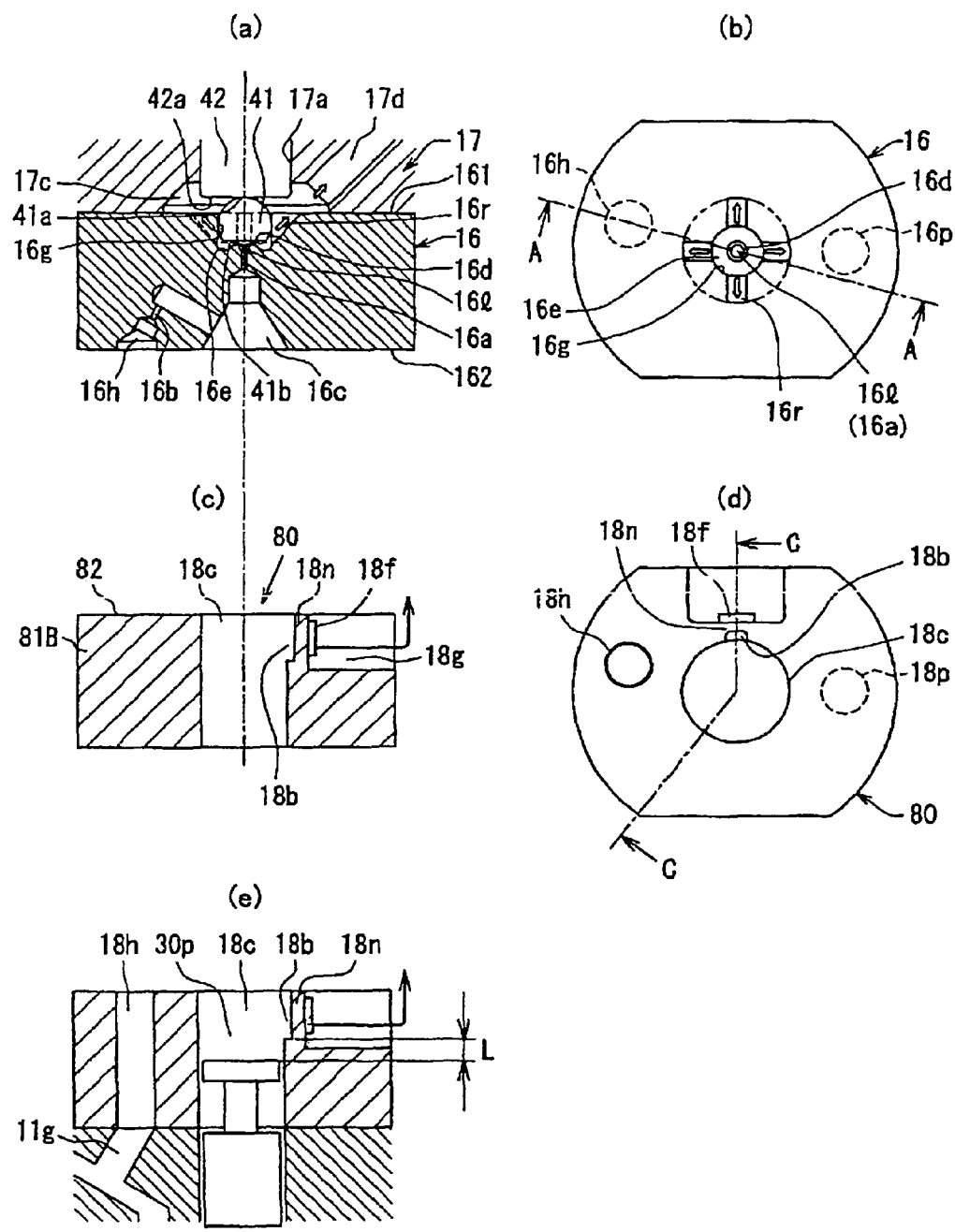
FIG. 21(a) a partial sectional view which shows highlights of an orifice member according to the tenth embodiment.
FIG. 21(b) is a plan view of FIG. 21(a)
FIG. 21(c) is a partial sectional view which shows highlights of a pressure sensing member.
FIG. 21(d) is a plan view of FIG. 21(c)
FIG. 21(e) is a sectional view which shows a positional relation between a control piston and a pressure sensing member when being installed in an injector body.

The tenth embodiment of the invention will be described below. FIGS. 21(a) and 21(b) are a partial sectional view and a plane view which show highlights of a fluid control valve of this embodiment. FIGS. 21(c) and 21(d) are a partial sectional view and a plane view which show highlights of a pressure sensing member. FIG. 21(e) a sectional view which shows a positional relation between a control piston and the pressure sensing member when being installed in an injector body. The same reference numbers are attached to the same or similar parts to those in the sixth to ninth embodiments, and explanation thereof in detail will be omitted here.

In the tenth embodiment, instead of the pressure sensing member 81A used in the ninth embodiment, the pressure sensing member 81B, as illustrated in FIGS. 21(c) and 21(d), is used. Other arrangements, functions, and beneficial effects including the orifice member 16 of this embodiment, as illustrated in FIGS. 21(a) and 21(b), are the same as those in the sixth embodiment.

The pressure sensing member 81B of this embodiment is, as shown in FIGS. 21(c) and 21(d), made as being separate from the injector body. The pressure sensing member 81B is made by a metallic plate (second member) disposed substantially perpendicular to the axial direction of the injector 2 and stacked on the orifice member 16 in the lower body 11 to be retained integrally with the lower body 11.

Also, in this embodiment, the pressure sensing member 81B has the flat surface 82 placed in direct surface contact with the flat surface 162 of the orifice member 16 in the liquid-tight fashion. The pressure sensing member 81B and the orifice member 16 are substantially identical in contour thereof and attached to each other so that the inlet 16h, the through hole 16p, and the pressure control chamber 16c of the orifice member 16 may coincide with the sensing portion communication path 18h, the through hole 18p, and the pressure control chamber 18c formed in the pressure sensing member 81B, respectively. The orifice member-far side of the sensing portion communication path 18h opens at a location corresponding to the fuel supply branch path 11g diverging from the fuel supply path 11b.

The pressure sensing member 81B of this embodiment, unlike the pressure sensing member 81A of the ninth embodiment, has the diaphragm 18n made of a thin wall provided directly in the pressure control chamber 18c. Specifically, the diaphragm (i.e., the thin wall) 18n is formed between the recess (i.e., a pressure sensing chamber) 18b formed directly in an inner wall of the pressure control chamber 18c and the depression 18g oriented from the outer wall of the pressure sensing member 81B to the pressure control chamber 18c. On the bottom surface of the depression 18b of the diaphragm 18n which is opposite the pressure control chamber 18c, the semiconductor pressure sensor 18f, as illustrated in FIG. 10, is affixed integrally.

The depth of the depression 18b is at least greater than the thickness of the pressure sensor 18f. The depression 18g is greater in diameter than the recess 18b in the pressure control chamber 18c. The thickness of the diaphragm 18n is determined by controlling the depth of the recess 18b and the depression 18g during the formation thereof.

In this embodiment, the diaphragm 18n is, as described above, made of the thin-walled portion of the inner wall defining the pressure control chamber 18c, thereby possessing the same effects as those in the tenth embodiment. Specifically, it is possible for the pressure sensor 18f to measure a change in pressure in the pressure control chamber 18c without any time lag.

Also, in this embodiment, as illustrated in FIG. 21(e), the outer end wall 30p is so disposed that it lies flush with the lower end of the recess 18b or is located at a distance L away from the lower end of the recess 18b toward the spray hole 12b when the spray hole 12b is opened. This causes the pressure of the high-pressure fuel introduced into the pressure control chamber 18c when the spray hole 12b is opened is exerted on the recess 18b formed in the inner wall of the pressure control chamber 18c without any problem, thereby ensuring the accuracy in measuring the pressure of the high-pressure fuel in the pressure control chamber 18c using the pressure sensor 18f.

Also, in this embodiment, the thin-walled portion working as the diaphragm 18n is formed in the inner wall of the pressure control chambers 16c and 18c. The pressure sensor 18f senses the displacement of the diaphragm 18n, thereby ensuring the accuracy in finding the time the fuel has been sprayed actually from the spray hole 12b.

In this embodiment, the diaphragm 18n is defined by the portion of the inner wall of the pressure control chambers 16c and 18c. The location of the diaphragm 18n is away from the inner orifice 16b and the outer orifice 16a, thereby minimizing the adverse effects of a high-speed flow of the high-pressure fuel within the inner orifice 16b and the outer orifice 16a or near openings thereof, thus enabling a change in the pressure in a region where the flow in the pressure control chambers 16c and 18c is in the steady state.

Other operations and effects are the same as in the tenth embodiment, and explanation thereof in detail will be omitted here. Also, in this embodiment, the pressure sensing member 81B may be made of a metallic glass.

In this embodiment, the high-pressure path (the fluid path) through which the high-pressure fuel flows to the spray hole 12b are made up of the fuel induction path 11c, the fuel supply path 11b, and the fuel feeding path 12d. The branch path diverging from the high-pressure path (i.e., the fluid path) to introduce the high-pressure fuel to the pressure sensing portion 80 is made up of the fuel supply branch path 11g, the sensing portion communication path 18h, the inlet 16h, and the inner orifice 16b. Specifically, the branch path of this embodiment is a path which diverges from the fluid induction portion 21 that is the inlet to which the high-pressure fuel is introduced and directs the fuel to the pressure control chamber 16c.

Eleventh Embodiment

Figure 22:
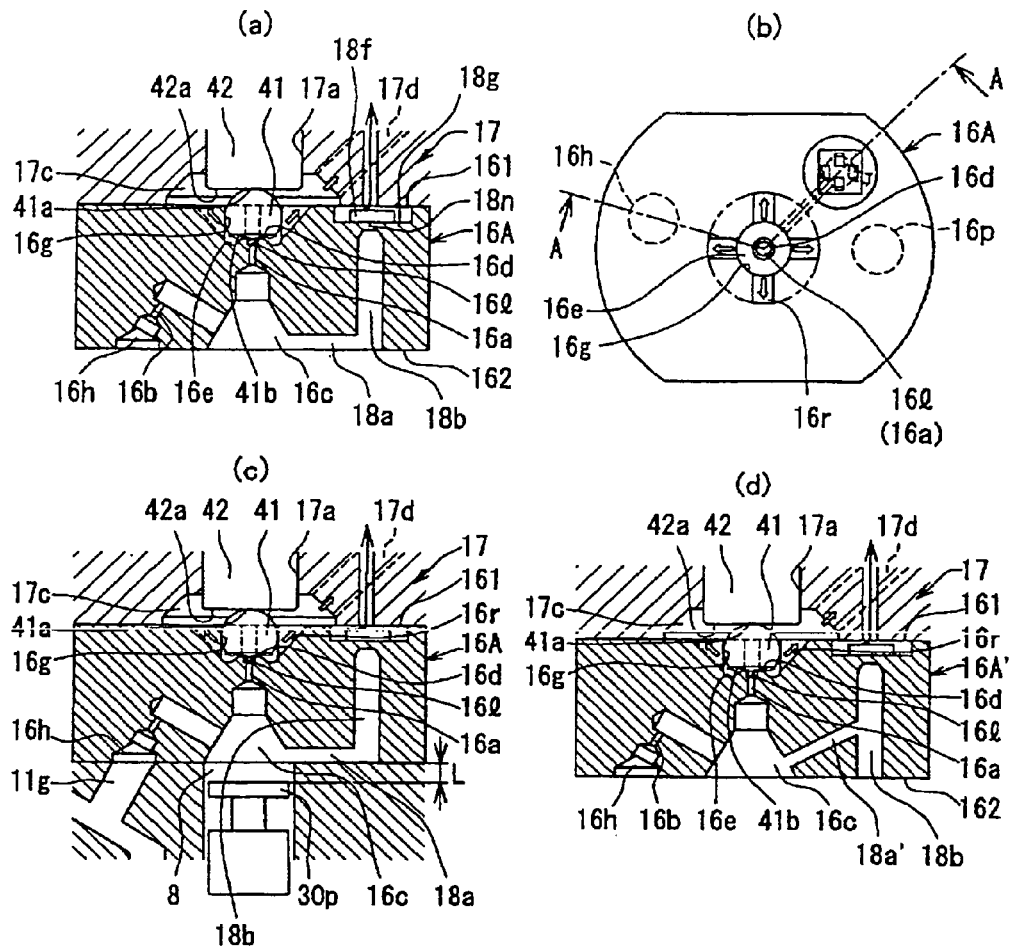
FIG. 22(a) is a partial sectional view which shows highlights of an orifice member (pressure sensing member) of an injector for a fuel injection device according to the eleventh embodiment.
FIG. 22(b) is a plan view of FIG. 22(a)
FIG. 22(c) is a sectional view which shows a positional relation between a control piston and a pressure sensing member when being installed in an injector body.
FIG. 22(d) is a sectional view which shows a modification of a pressure sensing member.

The eleventh embodiment of the invention will be described below. FIGS. 22(a) and 22(b) are a partial sectional view and a plane view which show highlights of a fluid control valve (i.e., the pressure sensing member) of an injector for a fuel injection system in the eleventh embodiment. FIG. 22(c) is a sectional view which shows a positional relation between a control piston and the pressure sensing member when being installed in an injector body. The same reference numbers are attached to the same or similar parts to those in the sixth to tenth embodiments, and explanation thereof in detail will be omitted here.

In the sixth to tenth embodiments, the pressure sensing portions 80, 85, and 87 working to measure the pressure of the high-pressure fuel are provided in the pressure sensing members 81, 81A, 81B, and 86 which are separate from the orifice member 16. In contrast to this, this embodiment has the structure functioning as the pressure sensing portion 80 installed in the orifice member 16A.

The specific structure of the orifice member 16A of this embodiment will be described with reference to drawings. The orifice member 16A of this embodiment is, as illustrated in FIGS. 22(a) and 22(b), made of a metallic plate oriented substantially perpendicular to the axial direction of the injector 2. The orifice member 16A is formed as being separate from the lower body 11 and the nozzle body 12 defining the injector body. After formed, the orifice member 16A is installed and retained in the lower body 11 integrally.

The orifice member 16A, like the orifice member 16 of the sixth embodiment, has the inlet 16h, the inner orifice 16b, the outer orifice 16a, the pressure control chamber 16c, the valve seat 16d, and the fuel leakage grooves 16r formed therein. Their operations are the same as in the orifice member 16 of the sixth embodiment.

However, in this embodiment, the orifice member 16A is equipped with the groove 18a which connects the pressure sensing chamber 18b and the pressure control chamber 16c and which is formed on the flat surface 162, like the pressure sensing chamber 18b defined by the groove or hole formed in the flat surface 162 of the orifice member 16A on the valve 41-far side.

The depression 18g for installation of the semiconductor pressure sensor 18f is formed at a location in the valve body side end surface 161 of the orifice member 16A which corresponds to the location of the pressure sensing chamber 18b. In this embodiment, a portion of the orifice member 16A between the pressure sensing chamber 18b and the depression 18g on which the pressure sensor 18f is installed defines the diaphragm 18n which deforms in response to the high-pressure fuel. As illustrated in FIG. 25(a), the valve body 17 has formed therein a wire path through which electric wires that are signal lines extend from the pressure sensor 18f to the connector 50. The wire path has an opening exposed to the depression 18f on which the pressure sensor 18f is fabricated.

The surface of the diaphragm 18n (i.e., the bottom of the depression 18g) which is far from the pressure sensing chamber 18b is located at a depth that is at least greater than the thickness of the pressure sensor 18f below the valve body-side end surface of the orifice member 16A and is greater in diameter than the pressure sensing chamber 18b-side surface thereof. The thickness of the diaphragm 18n is determined during the production thereof by controlling the depth of both grooves sandwiching the diaphragm 18n.

The orifice 16A has the groove 18a formed in the flat surface 162 on the valve 41-far side thereof at a depth greater than that of the pressure sensing chamber 18b. The groove 18a communicates between the pressure control chamber 16c and the pressure sensing chamber 18b. The orifice member 16A of this embodiment is placed in surface-contact with the lower body 11, not the pressure sensing member, so that the groove 18a defines a combined path (a branch path below) whose wall is a portion of the upper end surface of the lower body 11. This causes the high-pressure fuel, as entering the pressure control chamber 16c through the groove 18a (i.e., the branch path) to flow into the pressure sensing chamber 18b.

When the orifice member 16A is laid to overlap the lower body 11, the inlet 16h, the through hole 16p, the pressure control chamber 16c coincide with the fuel supply path 11g diverging from the fuel supply path 11b, a bottomed hole (not shown), and the pressure control chamber 8 of the lower body 11, respectively. The inlet 16h and the inner orifice 16b of the orifice member 16A define a portion of the path extending from the fuel supply path 11b to the pressure control chamber 16c.

The adoption of the above structure in this embodiment provides the same operations and effects as those in the tenth embodiment. Particularly, in this embodiment, the orifice 16A is designed to perform the function of the pressure sensing portion, thus eliminating the need for the pressure sensing portion.

Also, in this embodiment, as illustrated in FIG. 22(c), the outer end wall (upper end) 30p is so disposed that it lies flush with the lower end of the groove 18a or is located at a distance L away from the lower end of the groove 18a toward the spray hole 12b when the spray hole 12b is opened. This causes the groove 18a not to be blocked (partially) by the control piston 30 when the spray hole 12b is opened, so that the high-pressure fuel which is substantially identical in pressure level with the high-pressure fuel introduced into the pressure control chamber 16c to flow into the pressure sensing chamber 18b at all times, thereby ensuring the accuracy in measuring the pressure of the high-pressure fuel in the pressure control chamber 16c using the pressure sensor 18f without any time lag and in finding the time the fuel has been sprayed actually from the spray hole 12b.

Also, in this embodiment, the groove 18a (i.e., the branch path) is formed in the inner wall of the pressure control chamber 16c at a location away from the inner orifice 16b and the outer orifice 16a, thereby enabling the pressure sensor 18f to monitor a change in the pressure in a region where the flow in the pressure control chamber 16c is in the steady state. Other operations and effects are the same as those in the tenth embodiment, and explanation thereof in detail will be omitted here.

Also, in this embodiment, instead of the groove 18a, the hole 18a', as illustrated in FIG. 22(d), may alternatively be formed which is so inclined as to extend from the pressure control chamber 16c to the pressure sensing chamber 18b.

Twelfth Embodiment

Figure 23:
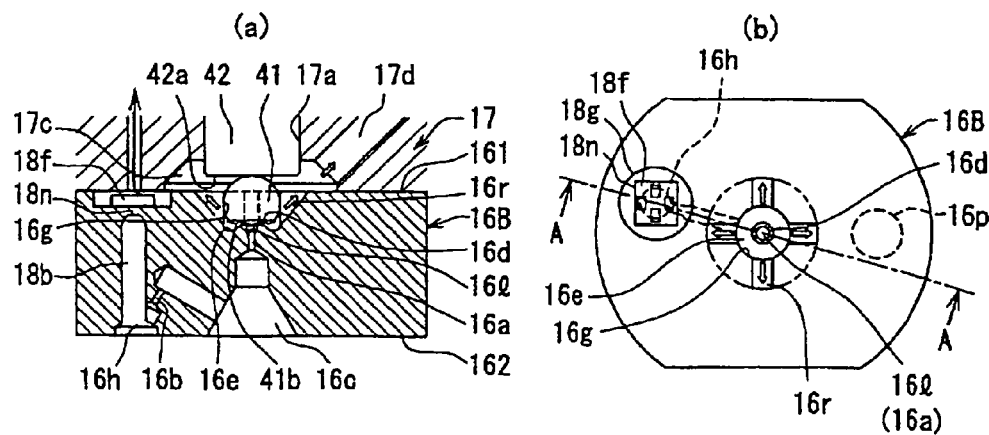
FIG. 23(a) is a partial sectional view which shows highlights of an orifice member (pressure sensing member) of an injector for a fuel injection device according to the twelfth embodiment.
FIG. 23(b) is a plan view of FIG. 23(a)

The twelfth embodiment of the invention will be described below. FIGS. 23(a) and 23(b) are a partial sectional view and a plane view which show highlights of a fluid control valve (i.e., the pressure sensing member) of an injector for a fuel injection system in the twelfth embodiment. The same reference numbers are attached to the same or similar parts to those in the sixth to eleventh embodiments, and explanation thereof in detail will be omitted here.

The orifice member 16B of this embodiment is, like the orifice member 16A, designed to have the structure functioning as the pressure sensing portion 80. The lower body 11 has only the orifice member 16B installed therein without having a separate pressure sensing member.

The orifice member 16B of this embodiment is different from the orifice member 16A of the eleventh embodiment in location where the pressure sensing chamber 18b is formed. Other arrangements are identical with the orifice member 16A of the eleventh embodiment. The following discussion will refer to only such a difference.

The orifice member 16B of this embodiment is, as can be seen FIGS. 23(a) and 23(b), designed to have the pressure sensing chamber 18b which diverges from a fluid path extending from the inlet 16h opening at the flat surface 162 to introduce the fuel thereinto to the pressure control chamber 16c through the inner orifice 16b. Like this, the pressure control chamber 18b may be used as a branch path to introduce the high-pressure fuel thereinto before entering the pressure sensing chamber 18b as well as the introduction of the high-pressure fuel into the pressure sensing chamber 18b after entering the pressure control chamber 16c, like in the eleventh embodiment. In either case, a special tributary needs not be provided as the branch path connecting with the fluid path extending between the inlet 16h and the pressure control chamber 16c or with the pressure control chamber 16c, thereby avoiding an increase in dimension of the injector body in the radial direction, i.e., the diameter thereof. The other operations and effects are the same as those in the eleventh embodiment, and explanation thereof in detail will be omitted here.

In this embodiment, the high-pressure path (the fluid path) through which the high-pressure fuel is directed to the spray hole 12b are defined by the fuel induction path 11c, the fuel supply path 11b, and the fuel feeding path 12d. The branch path diverging from the high-pressure path (the fluid path) to introduce the high-pressure fuel to the pressure sensing portion 80 is made up of the fuel supply branch path 11g, the sensing portion communication path 18h, and the inlet 16h. Specifically, the branch path of this embodiment is the path which diverges from the path extending from the fluid induction portion 21 that is an inlet into which the high-pressure fuel enters to the spray hole 12b and which directs the fuel to the pressure sensing chamber 18b.

The pressure sensing portions 80, 85, 87 of the sixth to tenth embodiments have been described as being forms different from each other, but however, they may be installed in a single injector. Both or either of the orifice members 16A and 16B of the eleventh and twelfth embodiments having the structure functioning as the pressure sensing portion 80 may also be used.

In the above case, as an example, they may be employed redundantly in order to assure the mutual reliability of the pressure sensors 18f. As another example, it is possible to use signals from the sensors to control the quantity of fuel to be sprayed finely. Specifically, after the fuel is sprayed, the pressure in the fuel supply path 11b drops microscopically from the spray hole 12b-side thereof. Subsequently, pulsation caused by such a pressure drop is transmitted to the fluid induction portion 21. Immediately after the spray hole 12b is closed, so that the spraying of fuel terminates, the pressure of fuel rises from the spray hole 12b-side, so that pulsation arising from such a pressure rise is transmitted toward the fluid induction portion 21. Specifically, it is possible to use a time difference between the changes in pressure on upstream and downstream sides of the fuel induction portion 21 of the fuel supply path 11b to control the quantity of fuel to be sprayed finely.

A single injector equipped with a plurality of pressure sensing portions which may be used for the above purposes will be described in the following thirteenth to nineteenth embodiments.

Thirteenth Embodiment

Figure 24:
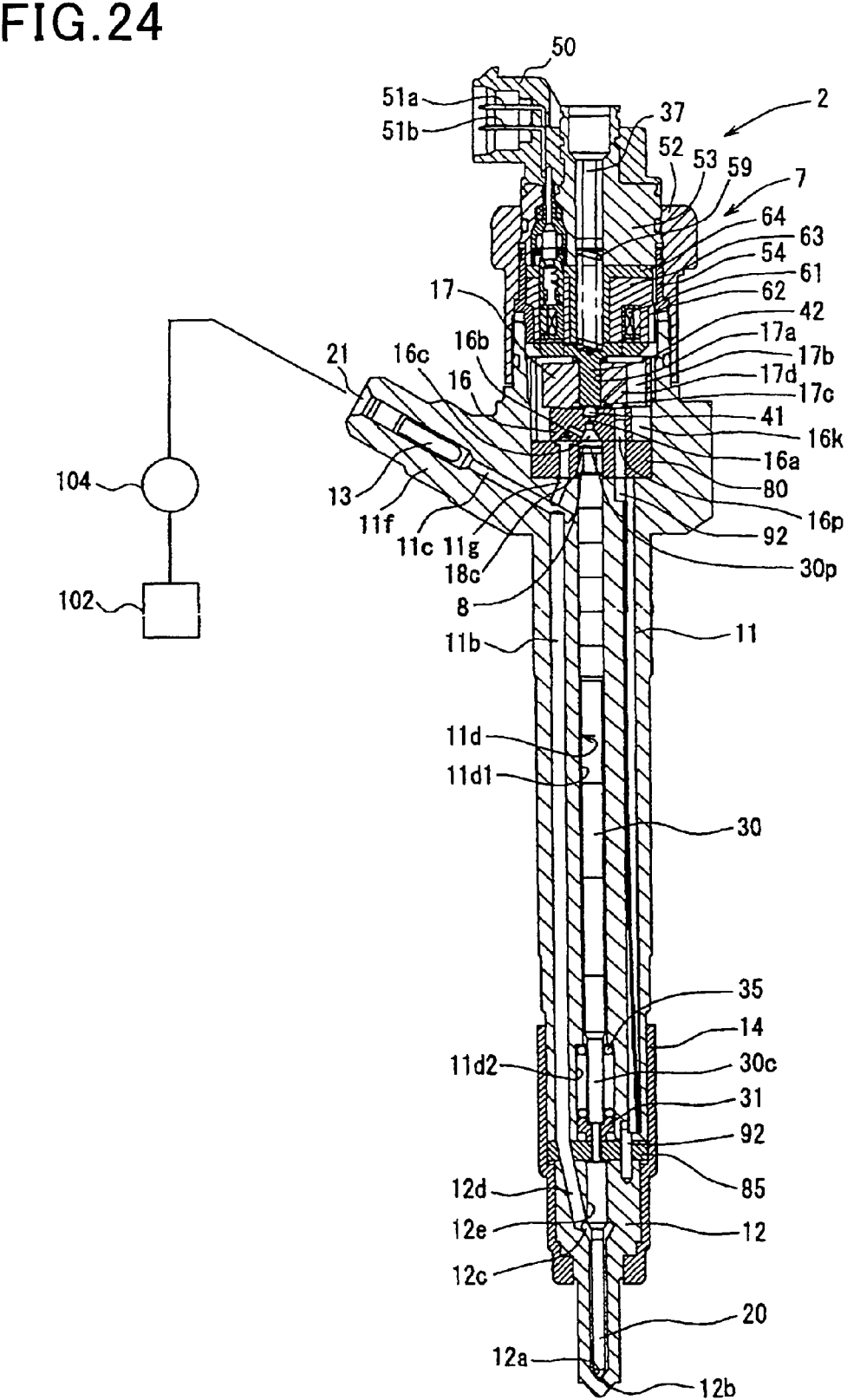
FIG. 24 is a sectional view of an injector according to the thirteenth embodiment.

FIG. 24 is a sectional view which shows the injector 2 in the third embodiment of the invention. The same reference numbers are attached to the same or similar parts to those in the sixth to twelfth embodiments, and explanation thereof in detail will be omitted here.

This embodiment has the pressure sensing portion 80 of the sixth embodiment and the pressure sensing portion 85 of the seventh embodiment. The pressure sensing member 81 equipped with the pressure sensing portion 80 is the same one, as illustrated in FIGS. 9(c) and 9(d). The pressure sensing member 86 equipped with the pressure sensing portion 85 is the same one, as illustrated in FIGS. 13(a) to 13(c).

This embodiment is different from the sixth and seventh embodiments in that the terminal pins 51b of the connector 50 are implemented by the terminal pins 51b1 for the pressure sensing portion 80 and the terminal pins 51b2 for the pressure sensing portion 85 (which are not shown) in order to output both signals from the pressure sensing portion 80 and the pressure sensing portion 85.

In this embodiment, the pressure sensing portion 80 is disposed near the fuel induction portion 21. The pressure sensing portion 85 is disposed close to the spray hole 12b. The times when pressures of the high-pressure fuel are to be measured by the pressure sensing portions 80 and 85 are, therefore, different from each other, thereby enabling the pressure sensing portions 80 and 85 to output a plurality of signals indicating changes in internal pressure thereof having occurred at different times.

Fourteenth Embodiment

Figure 25:
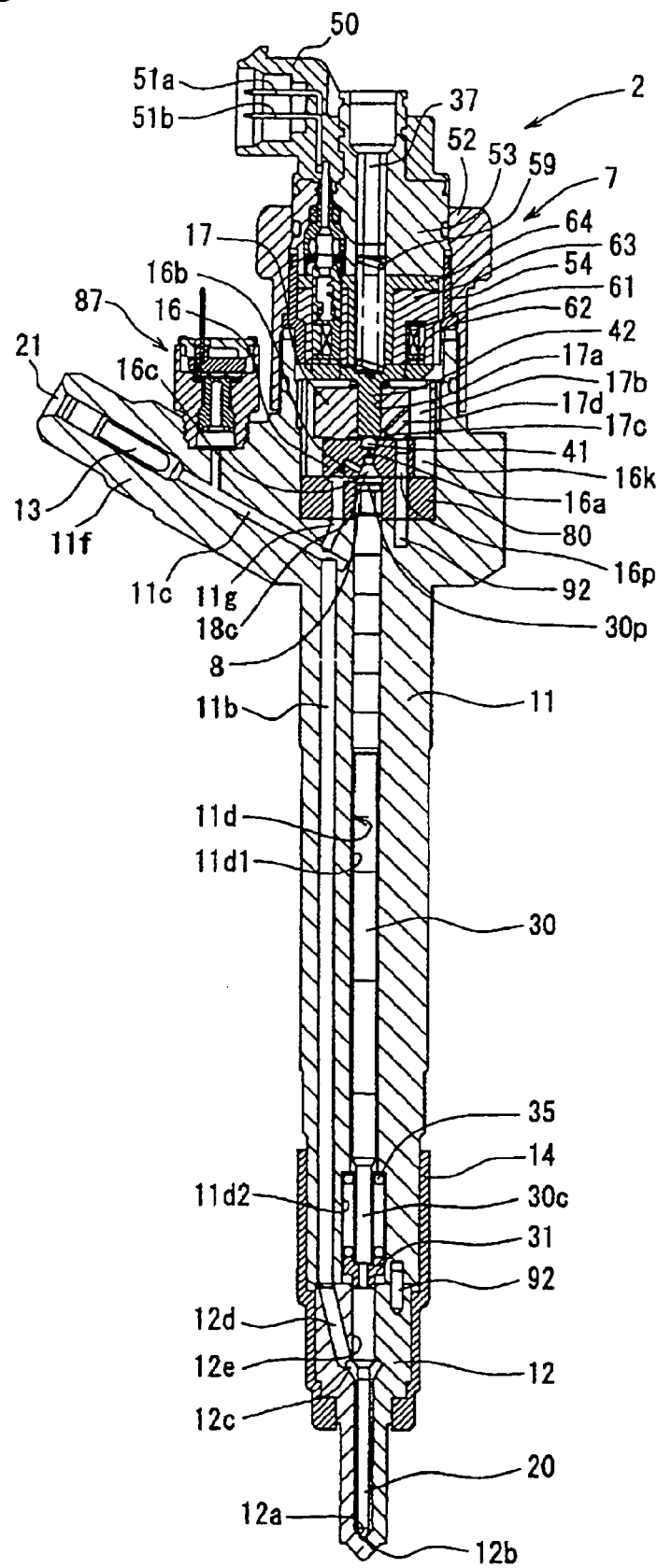
FIG. 25 is a sectional view of an injector according to the fourteenth embodiment.

FIG. 25 is a sectional view which shows the injector 2 according to the fourteenth embodiment of the invention. The same reference numbers are attached to the same or similar parts to those in the sixth to thirteenth embodiments, and explanation thereof in detail will be omitted here.

This embodiment has the pressure sensing portion 80 of the sixth embodiment and the pressure sensing portion 87 of the eighth embodiment. The pressure sensing member 81 equipped with the pressure sensing portion 80 is the same one, as illustrated in FIGS. 9(c) and 9(d). The pressure sensing member 87 is the same one, as illustrated in FIGS. 17 to 19.

Also, in this embodiment, the terminal pins 51b of the connector 50 are implemented by the terminal pins 51b1 for the pressure sensing portion 80 and the terminal pins 51b3 for the pressure sensing portion 87 (which are not shown) in order to output both signals from the pressure sensing portion 80 and the pressure sensing portion 87.

Fifteenth Embodiment

Figure 26:
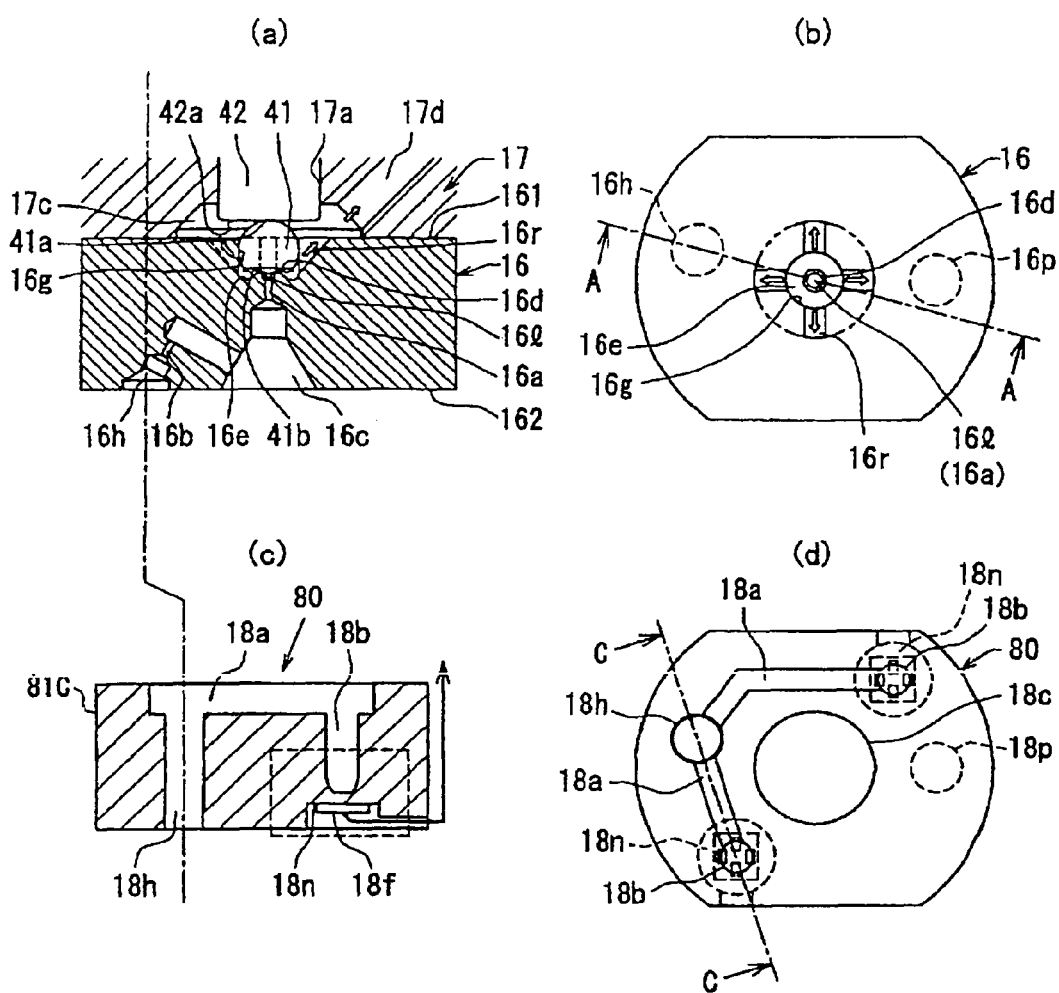
FIG. 26(a) is a partial sectional view which shows highlights of an orifice member according to the fifteenth embodiment.
FIG. 26(b) is a plan view of FIG. 26(a)
FIG. 26(c) is a partially sectional view which shows highlights of a pressure sensing member.
FIG. 26(d) is a plan view of FIG. 26(c)

The fifteenth embodiment of the invention will be described below. FIGS. 26(a) and 26(b) are a partial sectional view and a plane view which show highlights of a fluid control valve in this embodiment. FIGS. 26(c) and 26(d) are a partial sectional view and a plane view which show highlights of the pressure sensing member 81C. The same reference numbers are attached to the same or similar parts to those in the sixth to fourteenth embodiments, and explanation thereof in detail will be omitted here.

This embodiment is so designed that the pressure sensing member 81 used in the sixth embodiment is, as illustrated in FIGS. 26(c) and 26(d), equipped with a plurality (two in this embodiment) of pressure sensing portions 80 (i.e., grooves, diaphragms, and pressure sensors) (first and second pressure sensing means). Other arrangements, operations, and effects including those of the orifice member 16 of this embodiment, as illustrated in FIGS. 26(a) and 26(b), are the same as those in the sixth embodiment.

The pressure sensing member 81C has formed therein two discrete grooves 18a (which will be referred to as first and second grooves below) communicating with the sensing portion communication path 18h. The first groove 18a communicates with the corresponding first pressure sensing chamber 18b to transmit its change in pressure to the first pressure sensor 18f through the first diaphragm. Similarly, the second groove 18a communicates with the corresponding second pressure sensing chambers 18b to transmit its change in pressure to the second pressure sensor 18f through the second diaphragm.

The two grooves 18n are, as illustrated in FIG. 26(d), preferably opposed diametrically with respect to the sensing portion communication path 18h in order to increase the freedom of design thereof. The two grooves 18n are preferably designed to have the same length and depth in order to ensure the uniformity of outputs from the two pressure sensors 18f. The grooves 18a may alternatively be so formed as to extend on the same side of the sensing portion communication path 18h. This permits the wires of the pressure sensors 18f to extend from the same side surface of the pressure sensing member 81 and facilitates the layout of the wires.

Sixteenth Embodiment

Figure 27:
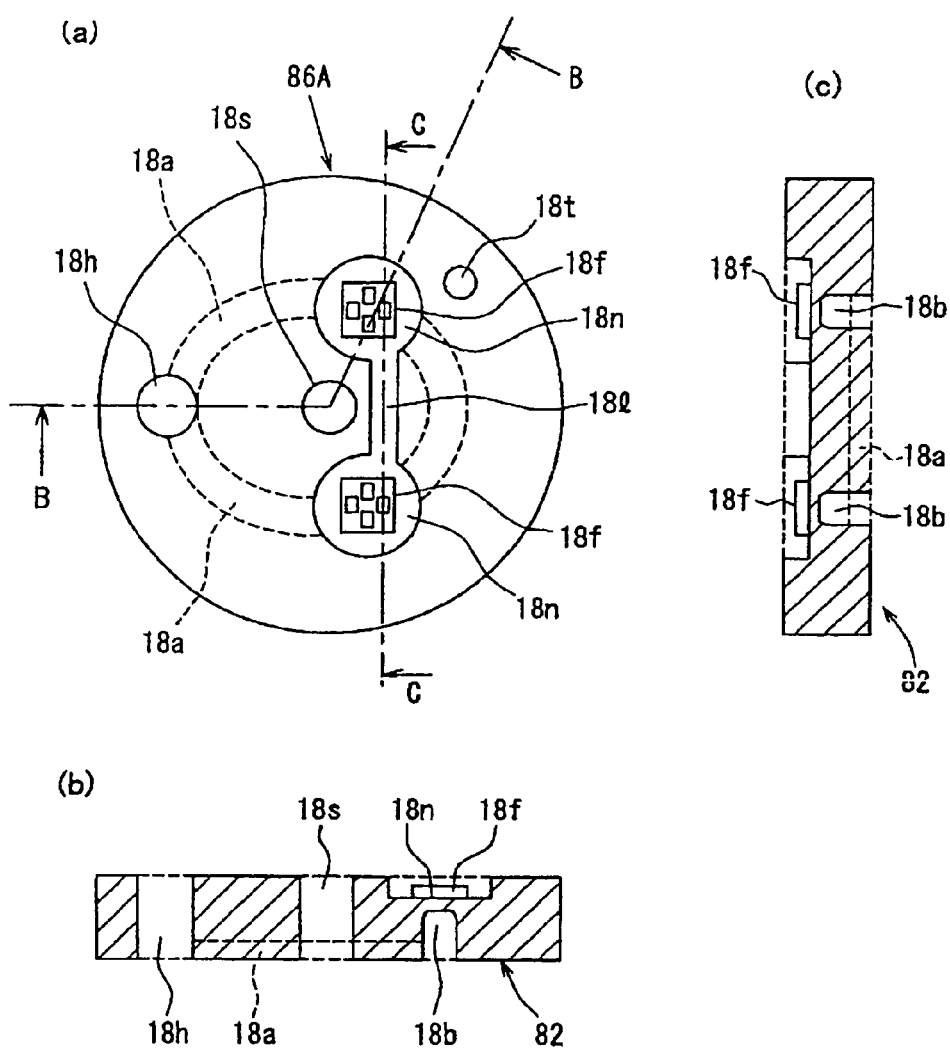
FIG. 27(a) a partial sectional view which shows highlights of a pressure sensing member according to the sixteenth embodiment.
FIG. 27(b) is a B-B sectional view of FIG. 27(a)
FIG. 27(c) is a C-C sectional view of FIG. 27(a)

The sixteenth embodiment of the invention will be described below. FIGS. 27(a) to 27(c) are a plan view and partial sectional views which show highlights of the pressure sensing member 86A of this embodiment. The same reference numbers are attached to the same or similar parts to those in the sixth to fifteenth embodiments, and explanation thereof in detail will be omitted here.

The sixteenth embodiment is so designed that the pressure sensing member 86 used in the seventh embodiment is, as illustrated in FIGS. 27(a) to 27(c), equipped with a plurality (two in this embodiment) of pressure sensing portions 85 (i.e., grooves, diaphragms, and pressure sensors) (first and second pressure sensing means). Other arrangements, operations, and effects including those of the orifice member 16 of this embodiment are the same as those in the seventh embodiment.

The pressure sensing member 86A has formed therein two discrete grooves 18a (which will be referred to as first and second grooves below) communicating with the sensing portion communication path 18h. The first groove 18a communicates with the corresponding first pressure sensing chamber 18b to transmit its change in pressure to the first pressure sensor 18f through the first diaphragm 18n. Similarly, the second groove 18a communicates with the corresponding second pressure sensing chambers 18b to transmit its change in pressure to the second pressure sensor 18f through the second diaphragm 18n.

The two grooves 18n are, as illustrated in FIG. 27(a), preferably opposed diametrically with respect to the sensing portion communication path 18h in order to increase the freedom of design thereof. The two grooves 18n are, like in the fifteenth embodiment, preferably designed to have the same length and depth in order to ensure the uniformity of outputs from the two pressure sensors 18f.

The two chambers of the pressure sensing member 86A on the side where the pressure sensors 18f are disposed are connected to each other through the connecting groove 18l. This facilitates the ease of layout of electric wires from the pressure sensors 18f through the connecting groove 18l.

Seventeenth Embodiment

Figure 28:
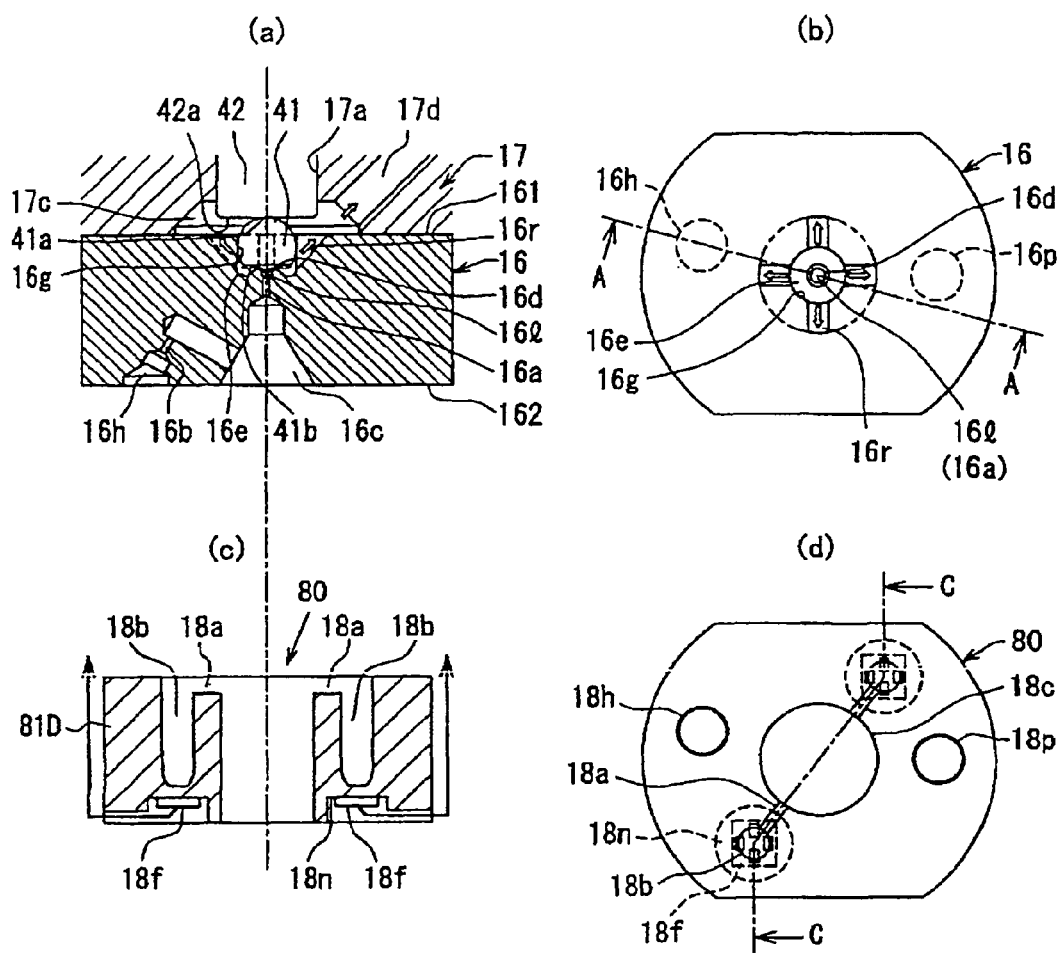
FIG. 28(a) is a partial sectional view which shows highlights of an orifice member according to the seventeenth embodiment.
FIG. 28(b) is a plan view of FIG. 28(a)
FIG. 28(c) is a partially sectional view which shows highlights of a pressure sensing member.
FIG. 28(d) is a plan view of FIG. 28(c)

The seventeenth embodiment of the invention will be described below. FIGS. 28(a) and 28(b) are a partial sectional view and a plan view which show highlights of a fluid control valve of this embodiment. FIGS. 28(c) and 28(d) are a partial sectional view and a plan view which show highlights of the pressure sensing member 81D. The same reference numbers are attached to the same or similar parts to those in the sixth to sixteenth embodiments, and explanation thereof in detail will be omitted here.

The seventeenth embodiment is so designed that the pressure sensing member 81A used in the ninth embodiment is, as illustrated in FIGS. 28(c) and 28(d), equipped with a plurality (two in this embodiment) of pressure sensing portions 80 (i.e., grooves, diaphragms, and pressure sensors) (first and second pressure sensing means). Other arrangements, operations, and effects including those of the orifice member 16 of this embodiment are the same as those in the ninth embodiment.

The pressure sensing member 81D has formed therein two discrete grooves 18a (which will be referred to as first and second grooves below) communicating with the pressure control chamber 18c. The first groove 18a communicates with the corresponding first pressure sensing chamber 18b to transmit its change in pressure to the first pressure sensor 18f through the first diaphragm 18n. Similarly, the second groove 18a communicates with the corresponding second pressure sensing chambers 18b to transmit its change in pressure to the second pressure sensor 18f through the second diaphragm 18n.

The two grooves 18n are preferably opposed diametrically with respect to the pressure control chamber 18c order to increase the freedom of design thereof.

The grooves 18a may alternatively be so formed as to extend on the same side of the pressure control chamber 18c (not shown). This permits the wires of the pressure sensors 18f to extend from the same side surface of the pressure sensing member 81D and facilitates the layout of the wires.

In this embodiment, the grooves 18a define paths along with the flat surface 162 of the orifice member 16, but however, the pressure sensing member 81D may be turned upside down. In this case, paths are defined between the grooves 18a and the flat surface (not shown) of the lower body 11. The first and second pressure sensors 18f are disposed on the orifice member 16-side.

Eighteenth Embodiment

Figure 29:
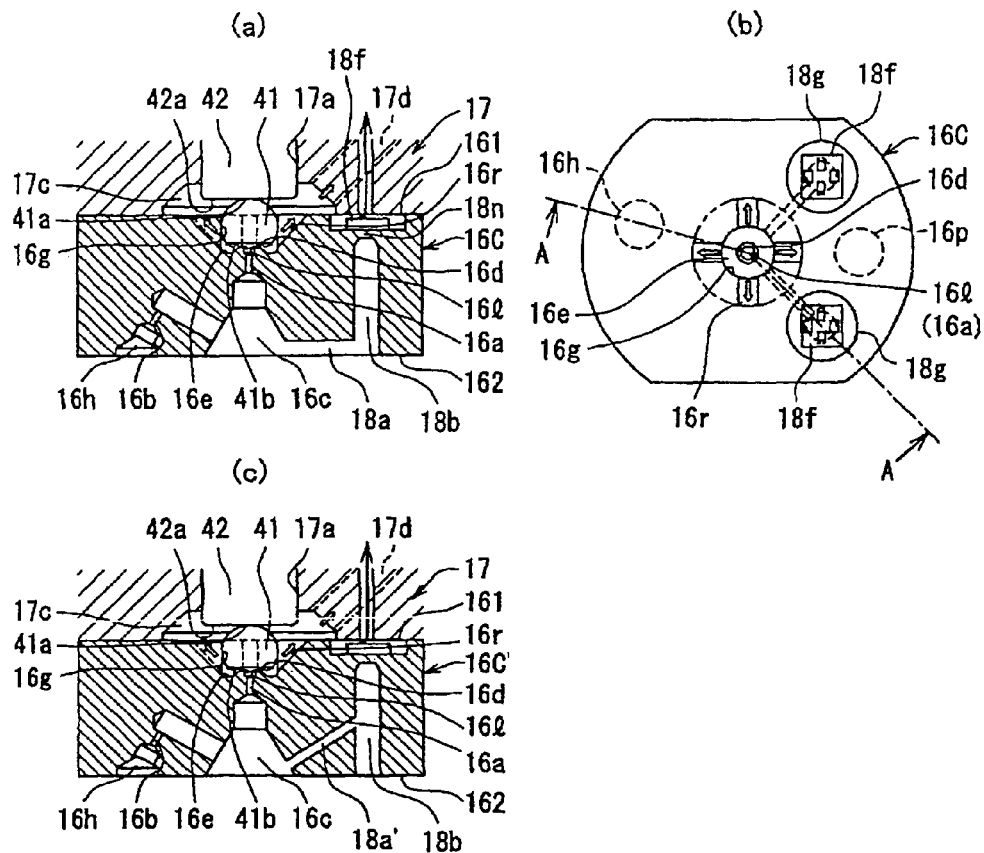
FIG. 29(a) is a partially sectional view which shows highlights of an orifice member (pressure sensing member) according to the eighteenth embodiment.
FIG. 29(b) is a plan view of FIG. 29(a)
FIG. 29(c) is a sectional view of a modification of the orifice member of FIG. 29(a)

The eighteenth embodiment of the invention will be described below. FIGS. 29(a) and 29(b) are a partial sectional view and a plan view which show highlights of a fluid control valve (i.e., an orifice member) 16C of this embodiment. The same reference numbers are attached to the same or similar parts to those in the sixth to seventeenth embodiments, and explanation thereof in detail will be omitted here.

The eighteenth embodiment is so designed that the orifice member 16A having the structure of the pressure sensing portion 80 used in the eleventh embodiment is, as illustrated in FIGS. 29(a) and 29(b), equipped with a plurality (two in this embodiment) of pressure sensing portions 80 (i.e., grooves, diaphragms, and pressure sensors) (first and second pressure sensing means). Other arrangements, operations, and effects are the same as those in the eleventh embodiment.

The orifice member 16C has formed therein two discrete grooves 18a (which will be referred to as first and second grooves below) communicating with the pressure control chamber 16c. The first groove 18a communicates with the corresponding first pressure sensing chamber 18b to transmit its change in pressure to the first pressure sensor 18f through the first diaphragm 18n. Similarly, the second groove 18a communicates with the corresponding second pressure sensing chambers 18b to transmit its change in pressure to the second pressure sensor 18f through the second diaphragm 18n.

The two grooves 18n are, as illustrated in FIG. 29(b), preferably opposed diametrically with respect to the pressure control chamber 16c order to increase the freedom of design thereof.

The grooves 18a may alternatively be so formed as to extend on the same side of the pressure control chamber 16c (not shown). This permits the wires of the pressure sensors to extend from the same side surface of the orifice member 16C and facilitates the layout of the wires.

Also, in this embodiment, instead of the groove 18a, a hole 18', as illustrated in FIG. 29(c), may be formed which is so inclined as to extend from the pressure control chamber 16c to the pressure sensing chamber 18b.

Nineteenth Embodiment

Figure 30:
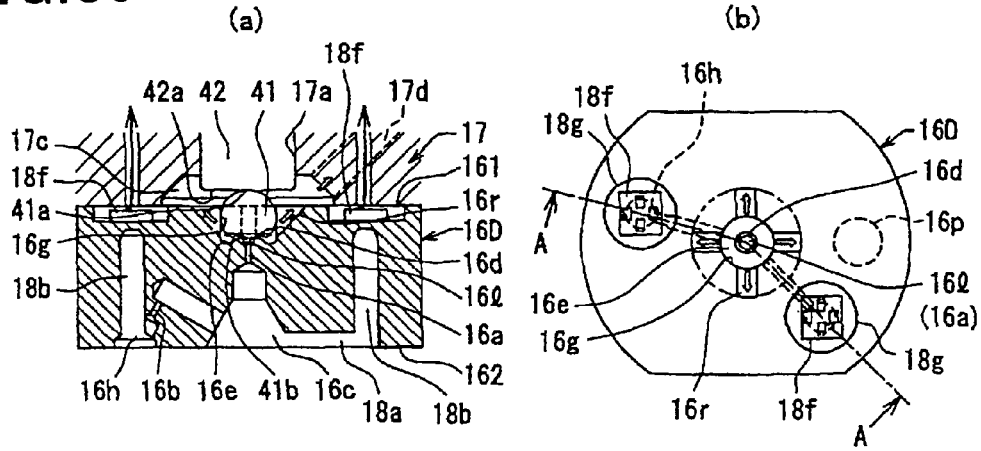
FIG. 30(a) is a partial sectional view which shows highlights of an orifice member (pressure sensing member) according to the nineteenth embodiment.
FIG. 30(b) is a plan view of FIG. 30(a).

The nineteenth embodiment of the invention will be described below. FIGS. 30(a) and 30(b) are a partial sectional view and a plan view which show highlights of a fluid control valve (i.e., an orifice member) 16D of this embodiment. The same reference numbers are attached to the same or similar parts to those in the sixth to eighteenth embodiments, and explanation thereof in detail will be omitted here.

The nineteenth embodiment is so designed as to have both the pressure sensing portions of the eleventh and twelfth embodiments. Specifically, the orifice member 16D of this embodiment has formed therein the first pressure sensing chamber 18b communicating with the pressure control chamber 16c through the groove 18a and the second pressure sensing chamber 18b diverging from a fluid path extending from the inlet 16h to which the fuel is inputted to the pressure control chamber 16c through the inner orifice 16b. The first and second diaphragms 18n and the first and second pressure sensors 18f are disposed at locations corresponding to the first and second pressure sensing chambers 18b.

This embodiment has disposed between the first and second pressure sensing chambers 18b the inner orifice 16b which is smaller in diameter than the branch path, thereby causing times when the pressure changes in the first and second pressure sensing chambers 18b to be shifted from each other. Other arrangements, operations, and effects are the same as those in the eleventh and twelfth embodiments.

Other Embodiments

Each of the above embodiments may be modified as follows. The invention is not limited to the contents of the embodiments. The features of the structures of the embodiments may be combined in various ways.

In the first to fifth embodiments, the molded resin 60z functions as a thermal insulator for the circuit parts 54z against the heat from the injector body 4z and the stem 51z, but instead rubber or ceramic may alternatively be used as the thermal insulator. A foamed resin having many cells formed therein may also be used to enhance the thermal insulation.

The injector body 4z and the stem 51z are metal-touch sealed, but the metal tough sealing structure may be omitted. A gasket may be disposed between the body 4z and the stem 51z to seal therebetween.

In the first to fifth embodiments, the sensor terminals 55z and the drive terminals 56z are unified by the molded resin 60z, but however, they may alternatively be retained by separate resin molds. In this case, it is advisable that the two resin molds be retained in the connector housing 70z in order to minimize required connectors.

In the first to fifth embodiments, the strain gauge 52z is used to measure the amount of strain of the stem 51z, but another type sensing device such as a piezoelectric device may be used.

In the first to fifth embodiments, the insulating substrate 53z on which the circuit component parts 54z are fabricated is placed flush with the stain gauge 52z, but they may be laid overlap each other in the axial direction J1z.

As to the location of installation of the fuel pressure sensor 50z in the injector body 4z, the fuel pressure sensor 50z is disposed in a portion of the body 4z which is located above the insertion hole E3z of the cylinder head E2z, but may be disposed inside the insertion hole E3z of the cylinder head E2z.

In the first to fifth embodiments, the invention is used with the injector for diesel engines, but may be used with direct injection gasoline engines which inject the fuel directly into the combustion chamber E1.

For example, in the sixth and the seventh embodiments, the invention is used with the solenoid-operated injector, but the injector equipped with the piezo-actuator may use either or both the pressure sensing portion 80 of the sixth embodiment and the pressure sensing member 85 of the seventh embodiment. Conversely, the structure in which the pressure sensing portion 87 is installed in the coupling 11f may be used with the solenoid-operated injector.

As already described in the thirteenth to nineteenth embodiments, in the case where the pressure sensing portions 80, 85, and 87 are used simultaneously, the first pressure sensing portion may be designed to produce an output signal whose level changes with a change in pressure of the high-pressure fuel more greatly than that of the second pressure portion. This causes two types of output signals to be produced which are different in sensitivity. Such a structure is useful, especially for the case where the first and second pressure sensing portions, like in the fourteenth to eighteenth embodiments, work to measure the substantially same pressure.

Specifically, the first diaphragm constituting the first pressure sensing portion is designed to be of a circular shape greater in diameter than the second diaphragm constituting the second pressure sensing portion. This results in a difference in sensitivity between the first and second pressure sensing portions. Alternatively, the first diaphragm constituting the first pressure sensing portion may be designed to be of a circular shape smaller in thickness than the second diaphragm constituting the second pressure sensing portion. This also results in a difference in sensitivity between the first and second pressure sensing portions.

As to an Invention Group Extracted from the Above Embodiments

The following invention group (i.e., the inventions 1 to 16) is extracted from the respective embodiments (i.e., the sixth to nineteenth embodiments). The features of these inventions will be described while showing effects as needed.

⟨Invention 1⟩

The invention 1 is characterized in that it comprises a fluid path to which high-pressure fluid is supplied externally, a spray hole which connects with said fluid path to spray at least a portion of the high-pressure fluid, a pressure control chamber to which a portion of the high-pressure fluid is supplied from the fluid path and which produces force urging a nozzle needle opening or closing the spray hole in a valve-closing direction, a diaphragm which is to strain or deform at least partially when subjected to pressure of the high-pressure fluid, and displacement sensing means for sensing a displacement of the diaphragm.

The diaphragm is connected directly or indirectly to the pressure control chamber, thus eliminating the need for a special tributary for connecting the diaphragm to the fluid path. This, therefore, avoids an increase in dimension in the radial direction of the injector body when the pressure sensing portion is installed inside the injector body.

The portion of the high-pressure fluid is supplied into the pressure control chamber and stored therein, so that the force will be produced in the pressure control chamber to urge the nozzle needle in the valve-closing direction to close the spray hole. This causes the spraying to be stopped. Alternatively, when the high-pressure fluid is discharged from the pressure control chamber, the force produced in the pressure control chamber drops to open the nozzle needle, thereby initiating the spraying from the spray hole. Specifically, the time the internal pressure in the pressure control chamber changes substantially coincides with that the fluid is sprayed form the spray hole. In this invention, the diaphragm is connected directly or indirectly to the pressure control chamber. The displacement sensing portion senses a displacement of the diaphragm, thus enabling the time the fluid is sprayed actually from the spray hole to be measured accurately.

⟨Invention 2⟩

The invention 2 depending from the invention 1 has a branch path communicating with the pressure control chamber. The diaphragm is made of a thin-walled portion communicating with the branch path. This eliminates the need for a special tributary for connecting the branch path to the fluid path, which avoids an increase in dimension in the radial direction of the injector body when the pressure sensing portion is installed inside the injector body.

⟨Invention 3⟩

The invention 3 depending from the invention 2 is characterized in that it comprises an injector body which has said fluid path and said spray hole formed therein, and a separate member which is formed to be separate from said injector body and disposed inside said injector body, and in that said separate member has formed therein the branch path communicating with the pressure control chamber and the thin walled portion communicating with the branch path. The branch path and the thin-walled portion communicating with the pressure control chamber are in the separate member formed to be separate from the injector body, thus facilitating the ease of machining or forming the diaphragm. This results in ease of controlling the thickness of the diaphragm as compared with the effects of the invention 1.

⟨Invention 4⟩

The invention 4 depending from the invention 3 is characterized in that said separate member includes an inner orifice into which said high-pressure fluid is introduced, a pressure control chamber space which communicates with the inner orifice and forms a portion of said pressure control chamber, and an outer orifice which communicates with said pressure control chamber space and discharges the high-pressure fluid to a low-pressure path and in that the branch path communicates with the pressure control chamber space in the separate member, and the diaphragm connects with the branch path and is formed inside the separate member. The branch path and the diaphragm communicating with the pressure control chamber are in the separate member formed to be separate from the injector body, thus facilitating the ease of machining or forming the diaphragm. This results in ease of controlling the thickness of the diaphragm as compared with the effects of the invention 1 and improves the pressure sensing accuracy.

⟨Invention 5⟩

The invention 5 depending from the invention 4 is characterized in that said branch path connects with said pressure control chamber space at a portion different from the inner orifice and the outer orifice. The high-pressure fluid flows at a high speed in the inner orifice and the outer orifice, thus resulting in a time lag until a change in the pressure will be in a steady state. However, the invention has the above structure, thus enabling a change in the pressure to be measured in a range where the flow in the pressure control chamber is in the steady state.

⟨Invention 6⟩

The invention 6 depending from the invention 4 or 5 is characterized in that said separate member include a first member which has said inner orifice, said pressure control chamber space, and the outer orifice and a second member which is stacked directly or indirectly on the first member within the injector body, has said connection path and said branch path, and establishes a connection of the branch path with a portion of the diaphragm which is other than the connection path.

The presence of the thin-walled portion in the second member formed to be separate from the injector body facilitates the ease of machining or forming the diaphragm. This results in the ease of controlling the thickness of the diaphragm and improves the pressure measuring accuracy. The stack of the second member including the diaphragm on the first member forming a portion of the pressure control chamber avoids an increase in dimension in the radial direction of the injector body.

⟨Invention 7⟩

The invention 7 depending from the invention 4 or 5 is characterized in that said second member is made of a plate member having a given thickness, said displacement sensing means has a strain sensing device disposed on one of surfaces of the diaphragm of said second member which is farther from the other surface to which the high-pressure fluid is introduced, and in that said diaphragm is located at a depth of at least a thickness of said strain sensing device beneath an outer surface of said second member.

The diaphragm is located at a depth of at least the thickness of said strain sensing device beneath the outer surface of said second member, thereby avoiding the exertion of stress on the strain sensing device when the second member is mounted in the injector body, which facilitate the ease of installation of the pressure sensing portion in the second member.

⟨Invention 8⟩

Like the invention 8 depending from any one of the inventions 3 to 7, the diaphragm may be made of a thin-walled portion of an inner wall defining the pressure control chamber. This enables a change in pressure in the pressure control chamber to be measured without any time lag.

⟨Invention 9⟩

The invention 9 depending from the invention 2 is characterized in that it comprises an injector body which has said fluid path and said spray hole formed therein and a separate member which is formed to be separate from said injector body and disposed inside said injector body, and in that the separate member has the pressure control chamber therein which has a thin-walled portion thinner than the other portion of the separate member. This enables a change in pressure in the pressure control chamber to be measured without any time lag.

⟨Invention 10⟩

The invention 10 depending from the invention 9 is characterized in that said separate member includes an inner orifice into which said high-pressure fluid is introduced, a pressure control chamber space which communicates with the inner orifice and forms a portion of said pressure control chamber, an outer orifice which communicates with said pressure control chamber space and discharges the high-pressure fluid to a low-pressure path, and said thin-walled portion formed in a portion of the pressure control chamber space.

The presence of the thin-walled portion in the portion of the pressure control chamber space in the separate member formed to be separate from the injector body facilitates the ease of machining or forming the diaphragm. This results in the ease of controlling the thickness of the diaphragm as compared with the effects of the invention 1, which improves the pressure measuring accuracy.

⟨Invention 11⟩

The invention 11 depending from the invention 10 is characterized in that the diaphragm is formed in a portion of the pressure control chamber space which is different from the inner orifice and the outer orifice. The high-pressure fluid flows at a high speed in the inner orifice and the outer orifice, thus resulting in a time lag until a change in the pressure will be in a steady state. However, the invention enables a change in the pressure to be measured in a range where the flow in the pressure control chamber is in the steady state.

⟨Invention 12⟩

The invention 12 depending from any one of the inventions 9 to 11 is characterized in that the separate member is made of a plate member having a given thickness, said displacement sensing means has a strain sensing device disposed on one of surfaces of the diaphragm of said separate member which is farther from the other surface to which the high-pressure fluid is introduced, and in that said diaphragm is located at a depth of at least a thickness of said strain sensing device beneath an outer surface of said separate member.

The diaphragm is located at a depth of at least the thickness of said strain sensing device beneath the outer surface of said second member, thereby avoiding the exertion of stress on the strain sensing device when the second member is mounted in the injector body, which facilitate the ease of installation of the pressure sensing portion in the second member.

⟨Invention 13⟩

The invention 13 depending from any one of the inventions 2 to 12 is characterized in that the separate member is made of a plate member disposed perpendicular to the axial direction of the injector body.

The separate member is made of a plate member disposed perpendicular to the axial direction of the injector body, thus avoiding an increase in dimension in the radial direction of the injector body when the pressure sensing portion is installed inside the injector body.

⟨Invention 14⟩

The invention 14 depending from any one of the inventions 3 to 13 is characterized in that it comprises a control piston which transmits force to said nozzle needle to urge said nozzle needle in the valve-closing direction, and in that the control piston is exposed at an upper end thereof to the pressure control chamber within the injector body, so that it is subjected to pressure produced in the pressure control chamber, and the upper end is disposed at a given distance L to a spray hole-side from an opening portion of the branch path when the spray hole is opened.

When the upper end of the control piston is located farther from the spray hole than the branch path when the spray hole is opened, the control piston may cover the branch path. In such an event, it is possible for the displacement sensing means to measure a change in pressure in the pressure control chamber only after the pressure in the pressure control chamber rises to move the control piston in the valve-closing direction, so that the branch path is opened. This results in a loss of time required to measure the pressure. The invention, however, has the above structure to keep the branch path communicating with the pressure control chamber at all times when the spray hole is opened.

⟨Invention 15⟩

Like in the invention 15 depending from any one of the inventions 1 to 3, it is preferable that the pressure control chamber has an inner orifice into which a portion of the high-pressure fluid is introduced form the fluid path, a pressure control chamber space which communicates with the inner orifice, and an outer orifice which communicates with said pressure control chamber space and discharges the high-pressure fluid to a low-pressure path, and the diaphragm communicates with the pressure control chamber space.

⟨Invention 16⟩

The invention 16 is characterized in that it comprises a fluid path to which high-pressure fluid is supplied externally, a spray hole which connects with said fluid path and sprays at least a portion of the high-pressure fluid, a branch path which diverges from said fluid path, a diaphragm which connects with said branch path and has at least a portion which strains and deform when subjected to pressure of said high-pressure fluid, displacement sensing means for sensing a displacement of said diaphragm, a second diaphragm which connects with the branch path and has at least a portion which strains and deforms when subjected to pressure of said high-pressure fluid, and displacement sensing means for sensing a displacement of said second diaphragm.

The second diaphragm made of a thin-walled portion is in the branch path diverging from the fluid path, thus facilitating the ease of machining or forming the second diaphragm as compared with when the diaphragm is formed directly in an outer wall of the injector near the fluid path. This also results in ease of controlling the thickness of the second diaphragm and improves the pressure measuring accuracy. It is also possible to measure the pressure in a plurality of channels, thus enabling output signals from the first and second pressure sensing means, as in the invention 33, to be outputted redundantly.

The invention claimed is:
1. A fuel injection valve which is to be installed in an internal combustion engine to spray fuel from a spray hole, characterized in that it comprises:
a body in which a high-pressure path is formed through which high-pressure fuel flows to said spray hole and has disposed therein an opening/closing mechanism for driving a valve to open or close said spray hole;
an elastic body which is installed in said body and has at least a portion which strains and deforms when subjected to pressure of said high-pressure fluid which is changed by spraying of the fluid from the spray hole; and
a sensing device which is installed on said elastic body and works to convert a degree of strain occurring at said elastic body into an electric signal and output it as a measured pressure value;
wherein a portion of said elastic body on which said sensing device is installed is made axisymmetrically.

2. A fuel injection valve as set forth in claim 1, characterized in that material of said elastic body is material whose coefficient of thermal expansion is smaller than that of said body.

3. A fuel injection valve as set forth in claim 1, characterized in that said elastic body includes a cylindrical portion which has formed in one end thereof an inlet through which the high-pressure fuel is introduced into the cylindrical portion and a disc-shaped diaphragm which closes another end of said cylindrical portion.

4. A fuel injection valve as set forth in claim 1, characterized in that said body is formed to be substantially cylindrical, and said elastic body is installed on an axis of a portion of said high-pressure path which extends in a radial direction of said body or an axis of a portion of said high-pressure path which extends in an axial direction of said body.

5. A fuel injection valve as set forth in claim 1, characterized in that said body is formed to be substantially cylindrical, a recess is formed in an outer surface of said body in which said elastic body is to be inserted and disposed, and said body is so constructed as that said elastic body is insertable into said recess from outside an axial direction or a radial direction of said body.

6. A fuel injection valve as set forth in claim 1, characterized in that said elastic body is formed to have one end built in said body and another end located outside said body, and said sensing device is installed on the another end of said elastic body.

7. A fuel injection valve as set forth in claim 1, characterized in that it further comprises an insulating substrate connected to said sensing device through a wire and on which a circuit part is mounted which amplifies an electric signal outputted from said sensing device, and a mount surface on which said sensing device is disposed, and wherein said insulating substrate lies in flush with said mount surface.

8. A fuel injection valve as set forth in claim 1, characterized in that materials of said body and said elastic body are both metallic, said body has an annular sealing surface formed thereon, said elastic body has an annular sealing surface formed thereon, and said body and said elastic body are metal-touch sealed at the sealing surfaces.

9. A fuel injection device characterized in that it comprises:
a fluid path to which high-pressure fluid is supplied externally;
a spray hole which connects with said fluid path and sprays at least a portion of the high-pressure fluid;
a branch path which diverges from said fluid path;
a diaphragm which connects with said branch path and has at least a portion which strains and deforms when subjected to pressure of said high-pressure fluid which is changed by spraying of the fluid from the spray hole;
displacement sensing means for sensing a displacement of said diaphragm;
an injector body which has said fluid path and said spray hole formed therein; and
a separate member which is formed to be separate from said injector body and disposed inside said injector body, and
in that said separate member has formed therein a hole or a groove which communicates with said fluid path to form at least a portion of said branch path and a thin-walled portion which communicates with said hole or said groove to form said diaphragm.

10. A fuel injection device as set forth in claim 9, characterized in that said separate member is a plate member disposed substantially perpendicular to an axial direction of the injector body.

11. A fuel injection device as set forth in claim 9, characterized in that it further comprises;
a nozzle needle which opens or closes said spray hole;
an actuator which controls movement of said nozzle needle in an axial direction of the injector body;
a pressure control chamber which is supplied with a portion of said high-pressure fluid from said fluid path, the high-pressure fluid being loaded into or discharged from said pressure control chamber by action of said actuator, pressure of the high-pressure fluid loaded in said pressure control chamber acting on said nozzle needle to urge it to a valve-closing direction, and
in that said branch path connects at a portion thereof with a path from said fluid path to said pressure control chamber or with said pressure control chamber and at another portion thereof with said diaphragm.

12. A fuel injection device as set forth in claim 11, characterized in that it further comprises a spring member which urges said nozzle needle in the valve-closing direction, and in that said pressure control chamber works to urge said nozzle needle in the valve-closing direction along with an urging force of said spring member.

13. A fuel injection device as set forth in claim 11, characterized in that said separate member includes an inner orifice into which said high-pressure fluid is introduced, a pressure control chamber space which communicates with the inner orifice and forms a portion of said pressure control chamber, an outer orifice which communicates with said pressure control chamber space and discharges the high-pressure fluid to a low-pressure path, and a connection path which connects between said fluid path and the inner orifice, and in that said branch path diverges from said connection path in said separate member, and said diaphragm connects with said branch path at a portion other than said connection path and is formed in said separate member.

14. A fuel injection device as set forth in claim 13, characterized in that said separate member include a first member which has said inner orifice, said pressure control chamber space, and the outer orifice and a second member which is stacked directly or indirectly on the first member within the injector body, has said connection path and said branch path, and establishes a connection of the branch path with a portion of the diaphragm which is other than the connection path.

15. A fuel injection device as set forth in claim 13, characterized in that said second member is made of a plate member having a given thickness, said displacement sensing means has a strain sensing device disposed on one of surfaces of the diaphragm of said second member which is opposite the other surface to which the high-pressure fluid is introduced, and in that said diaphragm is located at a depth of at least a thickness of said strain sensing device beneath an outer surface of said second member.

16. A fuel injection device as set forth in claim 9, characterized in that it further comprises a nozzle needle which opens or closes the spray hole and a control piston which transmits force to said nozzle needle to urge said nozzle needle in the valve-closing direction, and in that said injector body includes a nozzle body in which said nozzle needle is disposed and a lower body in which said control piston is disposed, and said separate member is stacked between said lower body and said nozzle body to measure the pressure of the high-pressure fluid near said nozzle body.

17. A fuel injection device as set forth in claim 16 characterized in that said separate member is made of a metallic member stacked between said lower body and said nozzle body and is equipped with the connection path connecting between said fluid path and said spray hole, said branch path diverging from said connection path, and a metallic diaphragm that is the diaphragm which connects with said branch path and is disposed in an area different from said connection path.

18. A fuel injection device as set forth in claim 16, characterized in that said separate member is made of a plate member having a given thickness, and said displacement sensing means has a strain sensing device disposed on one of surfaces of the diaphragm of said separate member which is opposite the other surface to which the high-pressure fluid is introduced, and in that said diaphragm is located at a depth of at least a thickness of said strain sensing device beneath an outer surface of said separate member.

19. A fuel injection device as set forth in claim 9, characterized in that said injector body has a wire path which extends from a portion where said separate member is disposed to a portion where said actuator is disposed and stores therein a wire for said displacement sensing means.

20. A fuel injection device as set forth in claim 9, characterized in that said branch path connects with said fluid path at a turned angle of 90° or more to a flow of the fluid in said fluid path.

21. A fuel injection device as set forth in claim 9, characterized in that it further comprises an opening connecting with said branch path and a cylindrical stem with another end closed to constitute said diaphragm, and in that said branch path has an orifice which is disposed between said fluid path and said cylindrical stem and whose diameter is smaller than said opening.

22. A fuel injection device as set forth in claim 9, characterized in that said injector body has an injector main body which has formed therein a first fluid path to which the high-pressure fluid is supplied externally and a coupling which protrudes from said injector main body at a given angle to an axial direction of said injector main body and a second fluid path connecting between an fluid inlet port and said first fluid path, and in that said branch path is equipped with a path which diverges from said second fluid path and extends parallel to an axial direction of said injector.

23. A fuel injection device as set forth in claim 9, characterized in that said diaphragm is the thinnest portion of a path wall forming said branch path.

24. A fuel injection device as set forth in claim 9, characterized in that said displacement sensing means has a semiconductor type pressure sensor affixed integrally to one of surfaces of said diaphragm which is farther from said branch path.

25. A fuel injection device as set forth in claim 9, characterized in that it comprises a second diaphragm which connects with said branch path and is at least partially to strain and deform when subjected to pressure of the high-pressure fluid, and second displacement sensing means for sensing a displacement of said second diaphragm.

* * * * *